US012807046B2

(12) United States Patent
Hidaka et al.

(10) Patent No.: US 12,807,046 B2
(45) Date of Patent: Nov. 24, 2026

(54) VEHICLE

(71) Applicant: KAWASAKI MOTORS, LTD., Akashi (JP)

(72) Inventors: Kota Hidaka, Akashi (JP); Daisuke Saeki, Akashi (JP); Yusuke Nakashima, Akashi (JP); Bradley Kathol, Lincoln, NE (US)

(73) Assignee: KAWASAKI MOTORS, LTD., Akashi (JP)

(*) Notice: Subject to any disclaimer, the term of this patent is extended or adjusted under 35 U.S.C. 154(b) by 212 days.

(21) Appl. No.: 18/668,284

(22) Filed: May 20, 2024

(65) Prior Publication Data

US 2024/0300389 A1 Sep. 12, 2024

Related U.S. Application Data

(63) Continuation-in-part of application No. 18/462,463, filed on Sep. 7, 2023.

(Continued)

(51) Int. Cl.

| | |
|---|---|
| ***B60N 2/20*** | (2006.01) |
| ***B60N 2/01*** | (2006.01) |
| ***B60N 2/30*** | (2006.01) |
| ***B60P 3/42*** | (2006.01) |
| *B60N 2/015* | (2006.01) |
| *B60N 2/02* | (2006.01) |
| *B60Q 1/30* | (2006.01) |
| *B62D 25/04* | (2006.01) |

(52) U.S. Cl.

CPC ............ *B60N 2/206* (2013.01); *B60N 2/012* (2013.01); *B60N 2/015* (2013.01); *B60N 2002/0212* (2013.01); *B60N 2/3013* (2013.01); *B60P 3/423* (2013.01); *B60Q 1/30* (2013.01); *B62D 25/04* (2013.01)

(58) Field of Classification Search

CPC .......... B62D 47/00; B60N 2/243; B60N 2/38; B60N 2/005; B60N 2/206; B60N 2/3004; B60N 2/3009; B60N 2/3013; B60N 2/3015; B60N 2/36; B60N 2002/363; B60P 3/423; B60R 21/13; B60R 2011/0018; B60R 2021/0074; B60R 2021/132; B60R 2021/137

See application file for complete search history.

(56) References Cited

U.S. PATENT DOCUMENTS 7,264,298 B2 9/2007 Cover
7,416,238 B2 8/2008 Houston (Continued)

*Primary Examiner* — Gregory A Blankenship
(74) *Attorney, Agent, or Firm* — XSENSUS LLP

(57) ABSTRACT

A vehicle according to an embodiment may include: a vehicle body including a main frame, a floor panel directly or indirectly fixed to the main frame and provided above the main frame, a front seat base and a rear seat base which are directly or indirectly fixed to the main frame and protruded above the floor panel; a front seat including a front seat bottom attached to the front seat base and a front seat back; a rear seat including a rear seat bottom attached to the rear seat base and a rear seat back; and left and right rear pillars directly or indirectly fixed to the main frame and extending upwardly. The rear pillars are provided at positions overlapping widthwise end portions of the rear seat back in view of a front-rear direction of the vehicle.

19 Claims, 42 Drawing Sheets

Related U.S. Application Data

(60) Provisional application No. 63/428,402, filed on Nov. 28, 2022.

(56) References Cited

U.S. PATENT DOCUMENTS

| | | | | |
|---|---|---|---|---|
| 8,136,859 | B2 | 3/2012 | Morita et al. | |
| 8,322,772 | B1 * | 12/2012 | Gilbeck | B60N 2/3013 296/37.16 |
| 8,387,734 | B2 | 3/2013 | Krosschell et al. | |
| 8,567,846 | B1 * | 10/2013 | Stevens | B60N 2/36 296/65.09 |
| 8,998,283 | B1 * | 4/2015 | Yamamoto | B60R 5/04 280/756 |
| 9,764,767 | B2 | 9/2017 | Proulx et al. | |
| 10,363,843 | B2 | 7/2019 | Kawakami et al. | |
| 2004/0160081 | A1 | 8/2004 | Horsford et al. | |
| 2006/0244281 | A1 | 11/2006 | Cover | |
| 2007/0176454 | A1 * | 8/2007 | Houston | B60N 2/3065 296/63 |
| 2007/0228711 | A1 * | 10/2007 | Hanson | B60N 2/38 296/68.1 |
| 2009/0184534 | A1 * | 7/2009 | Smith | B60N 2/06 296/64 |
| 2009/0184536 | A1 | 7/2009 | Kubota et al. | |
| 2010/0045087 | A1 | 2/2010 | Pyun et al. | |
| 2010/0225082 | A1 | 9/2010 | Krosschell et al. | |
| 2010/0314191 | A1 * | 12/2010 | Deckard | B60N 2/38 180/312 |
| 2011/0148146 | A1 * | 6/2011 | Takaya | B60N 2/36 296/183.1 |
| 2011/0156420 | A1 * | 6/2011 | Yasui | B60N 2/7011 296/183.1 |
| 2011/0169289 | A1 | 7/2011 | Arnold et al. | |
| 2011/0187178 | A1 | 8/2011 | King | |
| 2013/0168994 | A1 * | 7/2013 | Yamamoto | B60P 3/423 296/100.06 |
| 2014/0217767 | A1 * | 8/2014 | Heit | B60N 2/522 296/65.16 |
| 2014/0292027 | A1 | 10/2014 | Uchiyama et al. | |
| 2015/0084321 | A1 * | 3/2015 | Hirooka | B60P 3/423 280/756 |
| 2015/0274120 | A1 * | 10/2015 | Hayashi | B60N 2/01 280/771 |
| 2015/0343900 | A1 * | 12/2015 | Schlangen | B62D 25/084 180/247 |
| 2016/0090057 | A1 * | 3/2016 | Hirooka | B60N 2/3031 296/190.03 |
| 2016/0176315 | A1 | 6/2016 | Moore et al. | |
| 2017/0247058 | A1 * | 8/2017 | Hokes | B60R 21/02 |
| 2018/0186329 | A1 * | 7/2018 | Tsumiyama | B60R 22/18 |
| 2019/0152358 | A1 * | 5/2019 | Kawakami | B60N 2/3013 |
| 2021/0078449 | A1 * | 3/2021 | Okabe | B60N 2/643 |
| 2022/0219574 | A1 * | 7/2022 | Hamamura | B60N 2/20 |
| 2023/0064416 | A1 * | 3/2023 | Rubanovich | B60N 2/3015 |
| 2023/0091826 | A1 * | 3/2023 | Endo | F16B 7/185 280/756 |
| 2023/0373368 | A1 | 11/2023 | Ubale | |
| 2024/0109607 | A1 * | 4/2024 | Pard | B62D 33/0273 |
| 2024/0174134 | A1 * | 5/2024 | Saeki | B60N 2/753 |
| 2024/0300389 | A1 * | 9/2024 | Hidaka | B60N 2/206 |
| 2024/0409020 | A1 * | 12/2024 | Hidaka | B60P 7/0807 |
| 2025/0162667 | A1 * | 5/2025 | Itou | B62D 23/005 |
| 2025/0269772 | A1 | 8/2025 | Gouldie | |
| 2025/0332968 | A1 | 10/2025 | Wei et al. | |
| 2025/0333120 | A1 * | 10/2025 | Bessho | B62D 33/0273 |

* cited by examiner

VEHICLE

CROSS REFERENCES TO RELATED APPLICATIONS

This application is a continuation in part of U.S. application Ser. No. 18/462,463, filed Sep. 7, 2023 (now U.S. Pat. No. 12,636,975), which claims priority from U.S. Provisional Application No. 63/428,402, filed Nov. 28, 2022, the entire contents of each are incorporated herein by reference.

BACKGROUND

The disclosure relates to a vehicle.

In a related art, there has been known a vehicle, such as PTV (Passenger Transport Vehicle), a cart like a golf cart, LSV (Low Speed Vehicle), and the like (see Patent Document 1: U.S. Patent Application Publication No. 2006/244281).

SUMMARY

In Patent Document 1, a vehicle is provided at a rear portion thereof with a golf back rack serving as a loading section. However, in such a vehicle, the loading section is relatively small and thus it may be desirable to enlarge a loading space in the vehicle.

An object of an embodiment of the disclosure is to provide a vehicle that is capable of expanding a loading space.

A first aspect of the disclosure is a vehicle that may include: a vehicle body including a main frame, a floor panel directly or indirectly fixed to the main frame and provided above the main frame, a front seat base and a rear seat base which are directly or indirectly fixed to the main frame and protruded above the floor panel; a rear seat including a rear seat bottom attached to the rear seat base and a rear seat back; and left and right rear pillars directly or indirectly fixed to the main frame and extending upwardly. The rear pillars are provided at positions overlapping widthwise end portions of the rear seat back in view of a front-rear direction of the vehicle.

According to the first aspect, the rear opening formed between the rear pillars becomes wider than that of a comparative structure in which a distance between the rear pillars is set narrow. Accordingly, by removing or moving the rear seat back away from the rear opening between the rear pillars, the wide rear opening can be used to load a luggage to a space above the rear seat base. Accordingly, the space above the rear seat base can used as a space for loading, which can expand the loading space in the vehicle.

A second aspect of the disclosure is a vehicle that may include: a vehicle body including a main frame, a floor panel directly or indirectly fixed to the main frame and provided above the main frame, a front seat base and a rear seat base which are directly or indirectly fixed to the main frame and protruded above the floor panel; a front seat including a front seat bottom attached to the front seat base and a front seat back; a rear seat including a rear seat bottom attached to the rear seat base and a rear seat back and a rear seat back functioning as a backrest of the rear seat; and left and right rear pillars directly or indirectly fixed to the main frame and extending upwardly. The rear pillars are provided at positions overlapping widthwise end portions of the rear seat back in view of a front-rear direction of the vehicle. The rear seat back is provided movable between a normal use position in which the rear seat back stands to function as the backrest of the rear seat and blocks at least a part of a rear opening formed between the left and right rear pillars and a retracted position in which the rear seat back opens the part of the rear opening.

According to the second aspect, by moving the rear seat from the normal position to the retracted position, the part of the rear opening between the rear pillars can be used to load a luggage to a space above the rear seat base. Accordingly, the space above the rear seat base can be used as the space for loading, which can expand the loading space in the vehicle.

DETAILED DESCRIPTION

Figure 1:
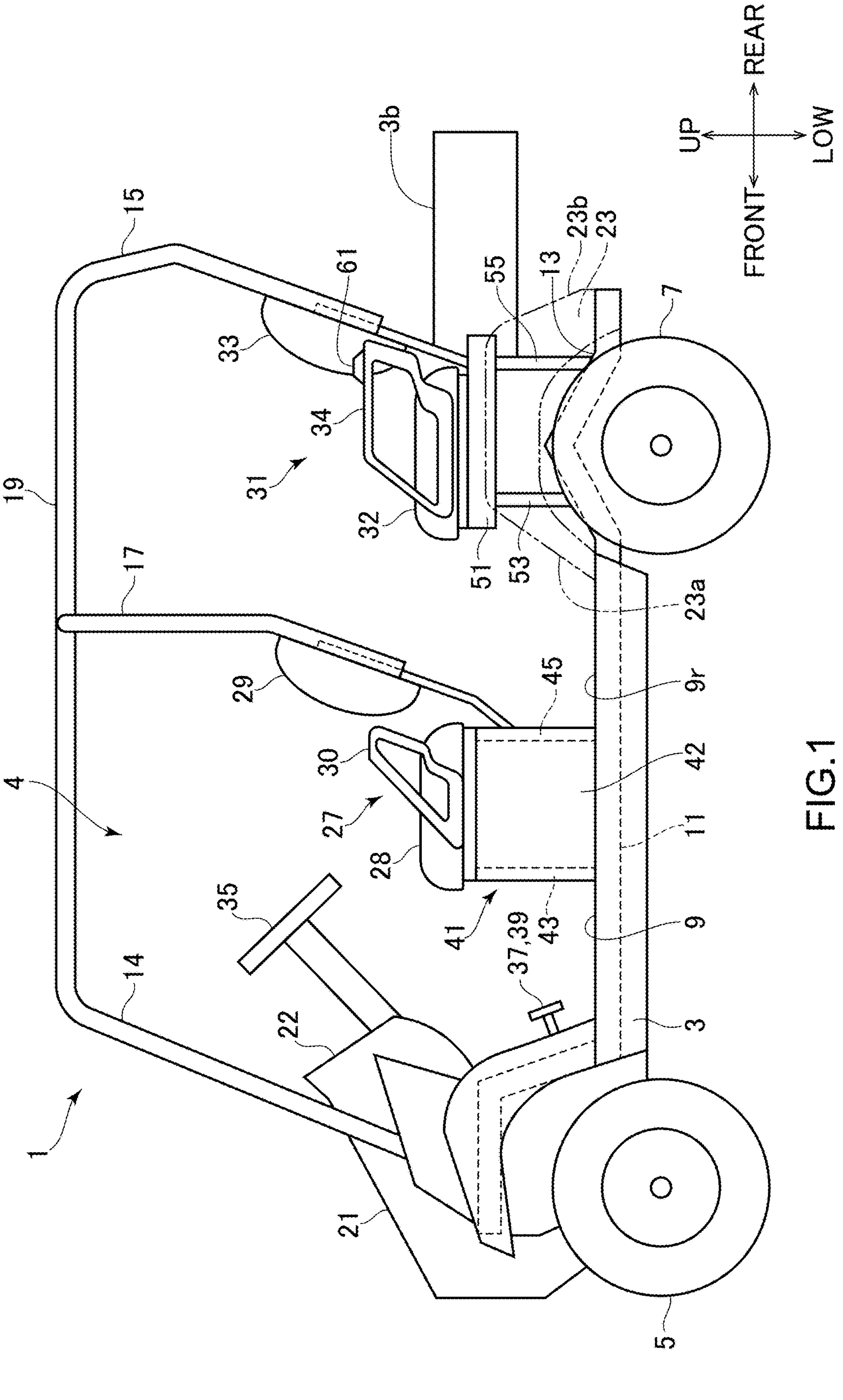
FIG. 1 is a side view of an electric cart as a vehicle according to a first embodiment.

Descriptions are provided hereinbelow for one or more embodiments based on the drawings. In the respective drawings referenced herein, the same constituents are designated by the same reference numerals and duplicate explanation concerning the same constituents is omitted. All of the drawings are provided to illustrate the respective examples only.

[Outline Structure of Entire Vehicle]

Figure 2:
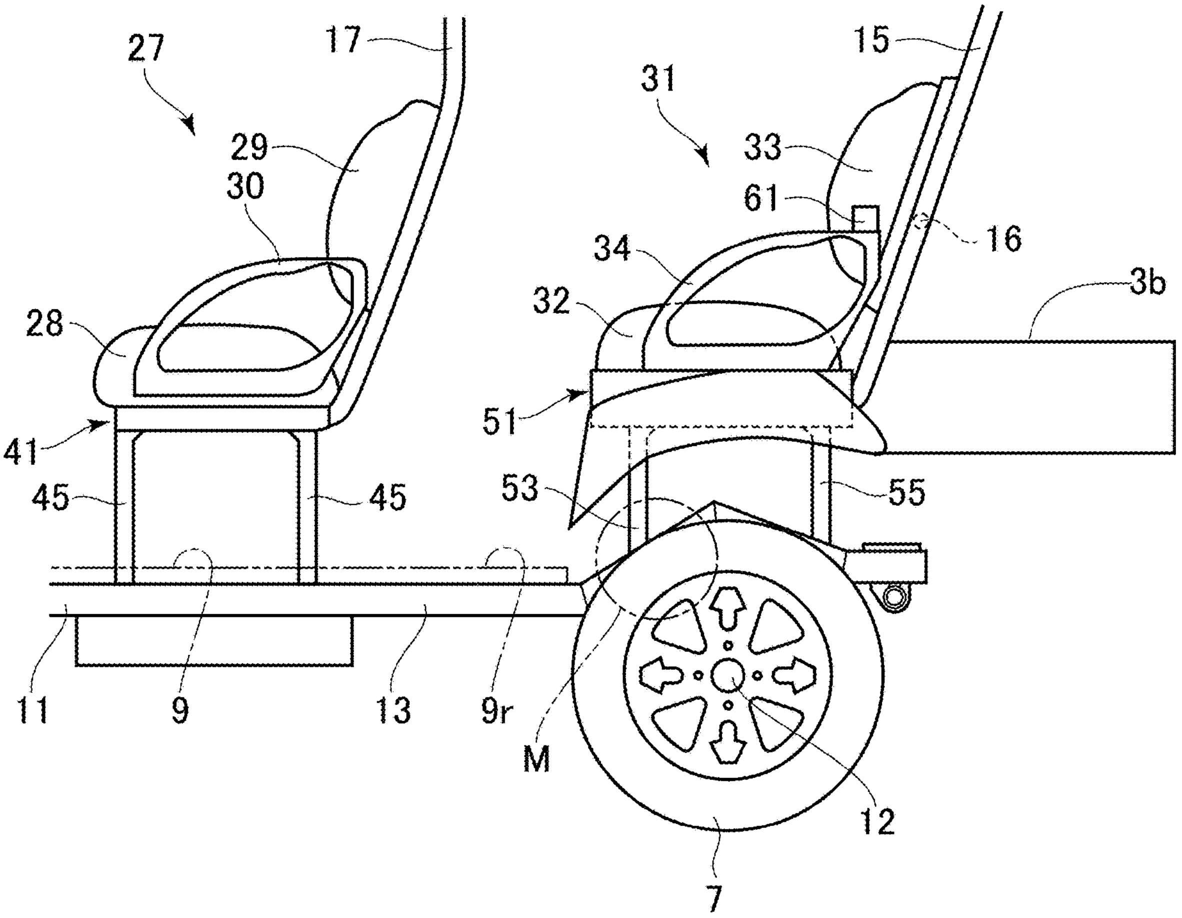
FIG. 2 is a schematic side view of the vicinity of a rear seat of the electric cart according to a first embodiment.

An overall schematic structure of an electric cart 1 as a vehicle according to a first embodiment is described below with reference to FIGS. 1 and 2. FIG. 1 is a side view of the electric cart 1 according to a first embodiment. FIG. 2 is a schematic side view of the vicinity of a rear seat 31 of the electric cart 1. Assume that directions in the disclosure matches directions viewed from a driver of the utility vehicle 1. The electric cart 1 according to a first embodiment is a passenger transport vehicle ("PTV"). The electric car 1 is configured to be transitionable between a normal state and a loading space expanded state in which a loading space in the vehicle is expanded from the normal state. More specifically, the electric cart 1 according to a first embodiment is configured to be transitionable between a seating state (the normal state) where the rear seat 31 is placed at a normal use position so as to be used as a seat and the loading space expanded state where the rear seat 31 is moved (transformed) to be used as a loading platform.

As illustrated in FIG. 1, the electric cart 1 according to a first embodiment includes two rows of seats, including a front seat 27 and the rear seat 31. The electric cart 1 includes a vehicle body 3, a pair of left and right front wheels 5 provided at a front portion of the vehicle body 3, and a pair of left and right rear wheels 7 provided at a rear portion of the vehicle body 3. The vehicle body 3 includes a vehicle body main frame 11 provided below a floor panel 9 of the vehicle body 3 such that the floor panel 9 is directly or indirectly fixed to the body main frame 11. Note that the floor panel 9 or the floor surface 9 is provided lower than the topmost position of the rear wheels 7. The main frame 11 includes, for example, left and right frame members 13 (see FIG. 2) extending in a front-rear direction (a longitudinal direction or a travel direction) of the vehicle body, and cross members (not illustrated) connecting the left and right frame members 13 at a front end portion, a rear end portion, and a central portion thereof. The front wheels 5 and the rear wheels 7 are rotatably attached to the main frame 11 via suspensions or the like. The driving force of an electric motor M (see FIG. 2) attached to the main frame 11 at the vicinity of the rear wheels 7 rotates the rear wheels 7 via a transmission (not illustrated) and a rear axle 12 (see FIG. 2). As a result, the electric cart 1 can travel forward or backward. Note that the electric motor M may be driven by batteries, fuel cells, or the like.

The vehicle body 3 includes a roll over protective structure (ROPS) to protect passengers on the vehicle 1. Specifically, the vehicle body 3 includes left and right front pillars 14 directly or indirectly connected (fixed) to the front end portion of the main frame 11 and extends upwardly, left and right rear pillars 15 directly or indirectly connected (fixed) to the rear end portion of the main frame 11 and extends upwardly, and left and right intermediate pillars 17 directly or indirectly connected (fixed) to the middle portion of the main frame 11 in the longitudinal direction or the travel direction of the vehicle and extends upwardly. Top beams 19 are connected to upper ends of the pillars 14, 15, and 17. That is, the vehicle 1 includes the ROPS composed of the pillars 14, 15, and 17 and the top beams 19. The vehicle 1 also includes a cargo bed **3*b* in the back of the vehicle body 3**.

A front cover 21 is provided at a front end portion of the vehicle body 3. A dashboard 22 serving as a front end of a passenger space 4 is provided behind the front cover 21. The dashboard 22 is provided with drink holders (not illustrated) and the like.

A rear cover 23 (indicated by double-dotted line in FIG. 1) is provided at a rear end portion of the vehicle body 3. A front portion of the rear cover 23 functions as a rear seat cover portion **23*a*, and a rear portion of the rear cover 23 functions as a rear cowl portion 23*b*. A storage 25 (see FIGS. 18-20) is provided at and recessed from a rear end portion of the rear cowl portion 23*b*. The storage 25** is exposed to the outside of the vehicle.

A front portion of the passenger space 4 is provided with the front seat 27 which is a bench-type seat serving as a first seat and a rear portion of the passenger space 4 is provided with the rear seat which is a bench-type seat serving as a second seat. The front seat 27 includes a left side seating area at a left side thereof that serves as a driver's seat. An operation unit including a steering wheel 35, an accelerator 37, a brake 39, a start switch, a changeover switch, and the like is provided in front of the left side seating area.

The front seat 27 includes a seat bottom 28 and a seat back (backrest) 29. The front seat bottom 28 is fixed to an upper surface of a front seat base 41, which is directly or indirectly fixed to the body main frame 11 and is projected upward from the floor 9. Frame members of the front seat base 41 includes left and right front seat posts 43 and left and right rear seat posts 45 as illustrated in FIG. 2. Each front seat post 43 and each rear seat post 45 are fixed to the main frame 11, extend upward from the main frame 11, and protrude above the floor 9. The frame members of the front seat base 41 also includes a front cross member (not illustrated) that connects upper ends of the left and right front seat posts 43, and a rear cross member (not illustrated) that connects upper ends of the left and right rear seat posts 45, and plural bars (not illustrated) each of which connects the front cross member and the rear cross member. The front seat bottom 28 is fixed to the upper end portion of the seat base 41 configured as described above. Note that the frame members of the front seat base 41 is covered with a cover 42 (front seat base cover) on a front surface, left and right side surfaces, and rear surface thereof.

The front seat back 29 is attached to the intermediate pillars 17 and positioned above the rear end portion of the front seat bottom 28.

The rear seat 31 is located in back of the front seat 27 across a rear seat passenger passage (floor surface **9*r* for the rear seat passengers). The rear seat 31 includes a seat bottom 32 and a seat back (backrest) 33. The rear seat bottom 32 is fixed to an upper surface of a rear seat base 51, which directly or indirectly fixed to the body main frame 11 and is projected upward from the floor 9. Further, the rear seat back 33 is supported by a rear cross bar 16 that connects middle portions of the left and right rear pillars 15 in the height direction. The seating surface of the rear seat 31, which is, an upper surface of the rear seat bottom 32, is located upper than the topmost point of the rear wheels 7. In a first embodiment, the rear seat 31 is located above the rear wheels 7 and the axle of the rear wheels 7. In other words, in the plan view, the rear seat 31 is at least partially overlapped with the rear wheels 7, and overlapped with the axle of the rear wheels 7. In the side view along the widthwise direction of the vehicle, such as being illustrated in FIG. 1, at least a part of the rear seat 31 is located above the rear wheels 7. In other words, in the side view along the vehicle widthwise direction, the position of the rear seat 31 in the front-rear direction is at least partially overlapped with the rear wheels 7. However, in a modification, in the side view along the widthwise direction of the vehicle, the rear seat 33 may be provided offset from the rear wheel 7** in the front-rear direction.

The frame members of the rear seat base 51 includes left and right front seat posts 53 and left and right rear seat posts 55 as illustrated in FIG. 2. Each of the front seat posts 53 and the rear seat posts 55 is fixed to the main frame 11 and protrudes upward from the main frame 11 so as to protrude above the floor 9. The frame members of rear seat base 51 also includes a front cross member (not illustrated) that connects upper ends of the left and right front seat posts 53, and a rear cross member (not illustrated) that connects upper ends of the left and right rear posts 55, plural (for example, four) bars (not illustrated) each of which connects the front cross member and the rear cross member, a panel member 59 (see FIGS. 7 and 8) fixed to the plurality of bars and constituting an upper surface **51*a* (see FIGS. 7 and 8) of the rear seat base 51. An upper surface of that panel member 59 is a horizontal flat surface extending in the longitudinal direction and the width direction of the vehicle. The rear seat bottom 32 is attached to the upper surface 51*a* of the rear seat base 51 configured as described above. Specifically, in the state where the rear seat 31 is used for seating passengers (that is, in the normal use state of the rear seat 33), the bottom surface of the rear seat bottom 32 is attached to the upper surface 51*a* of the rear seat base 51 in such a manner that a bottom surface 32*b* of the rear seat bottom 32 faces downward and overlaps the upper surface 51*a* of the rear seat base 51**.

Note that no doors are provided on the left and right sides of the vehicle body 3. In other words, in the cross section of the front seat 27 taken along the vehicle width direction, the outer end of the floor panel 9 is located on the outermost side of the vehicle body 3. Further, an upper surface (seating surface) of the rear seat bottom 32 is located higher than an upper surface (seating surface) of the front seat bottom 28.

[Expansion Structure of Loading Section]

Figure 3:
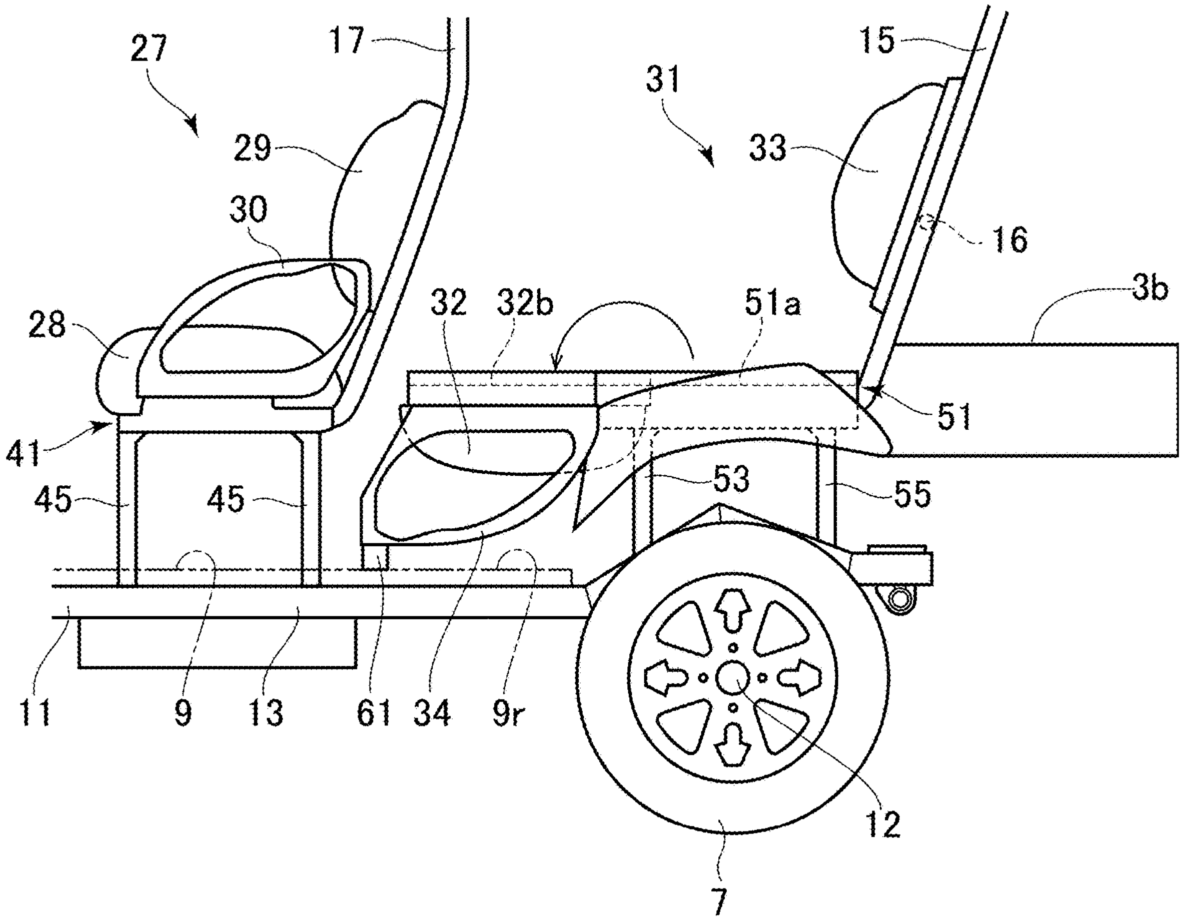
FIG. 3 is a schematic side view of the vicinity of the rear seat of the electric cart according to a first embodiment, illustrating a state in which a rear seat bottom of the electric cart is developed forward to thereby form a loading section.
Figure 4:
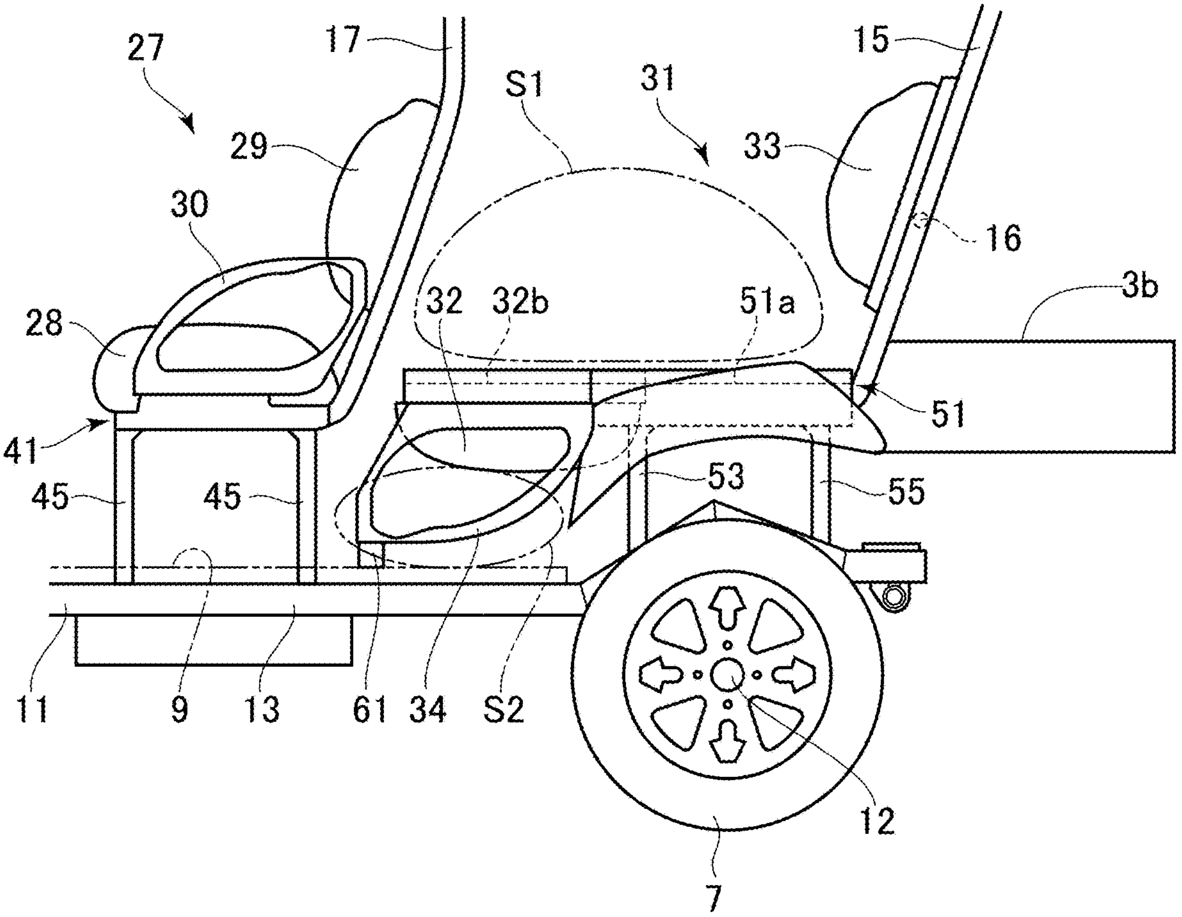
FIG. 4 is a diagram illustrating a loading space illustrated in FIG. 3 with a chain double-dashed line.
Figure 5:
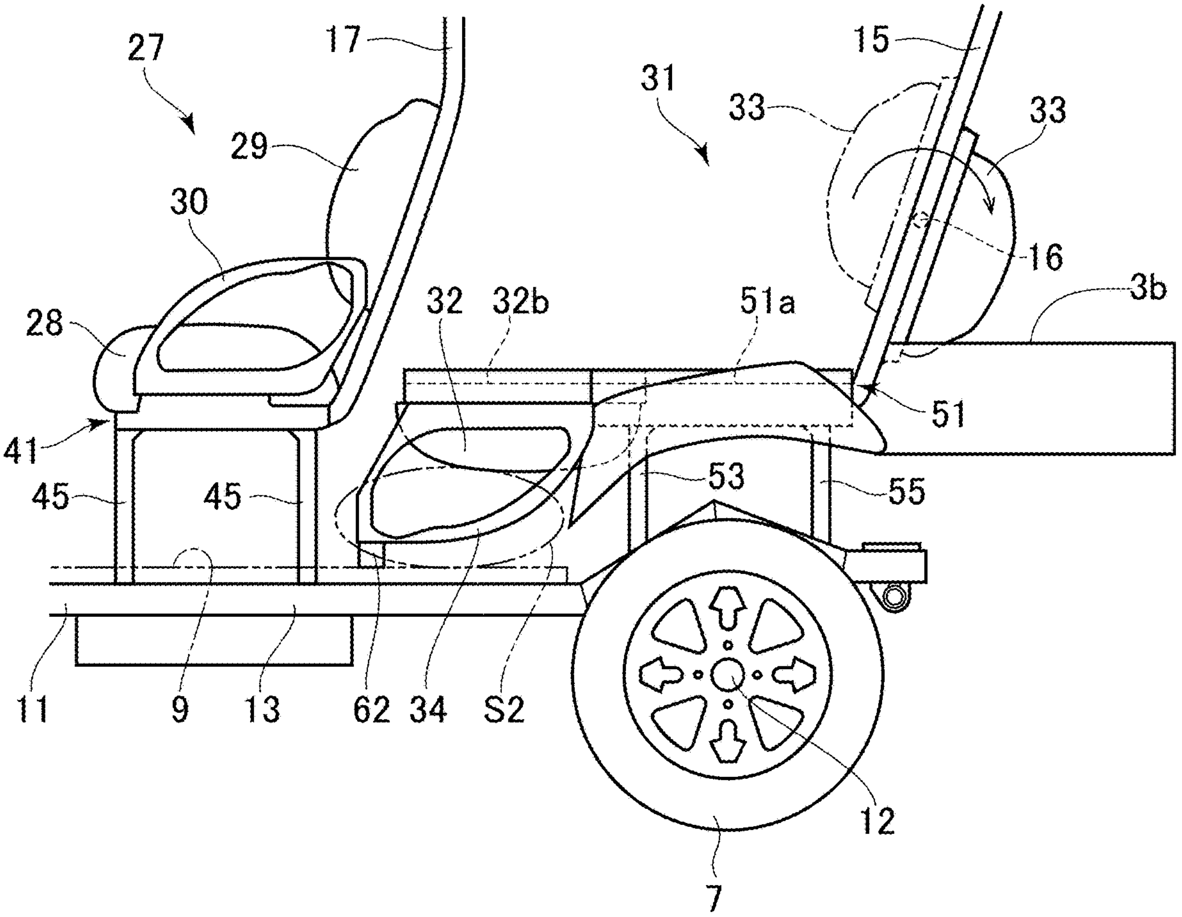
FIG. 5 is a schematic side view of the vicinity of the rear seat of the electric cart according to a first embodiment, illustrating a state in which the rear seat bottom of the electric cart is developed forward to thereby form the loading section and the rear seatback is developed rearward to thereby form a rear wall of the loading section.
Figure 6:
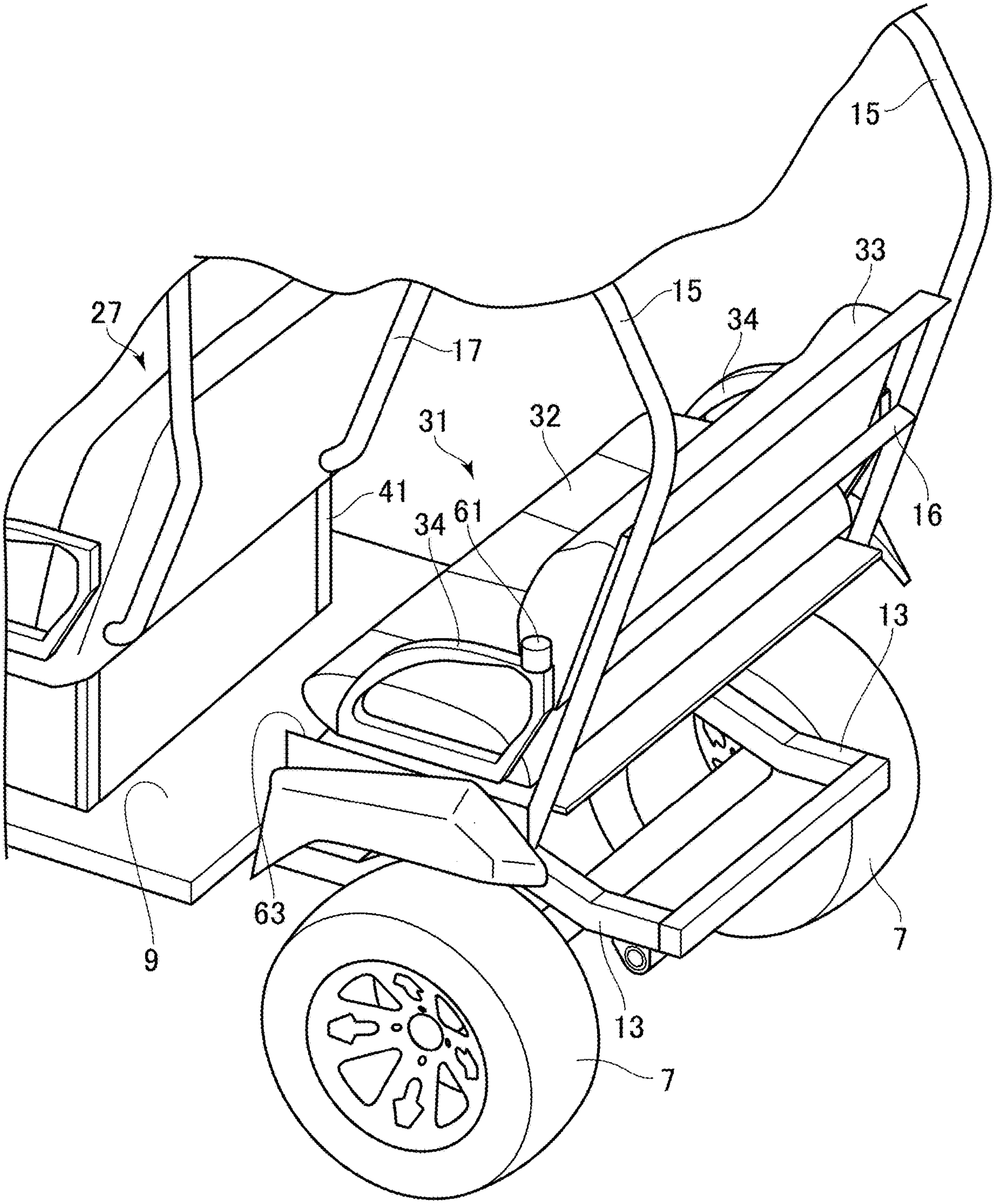
FIG. 6 is a schematic perspective view of a rear portion of the vehicle in a state illustrated in FIG. 2.
Figure 7:
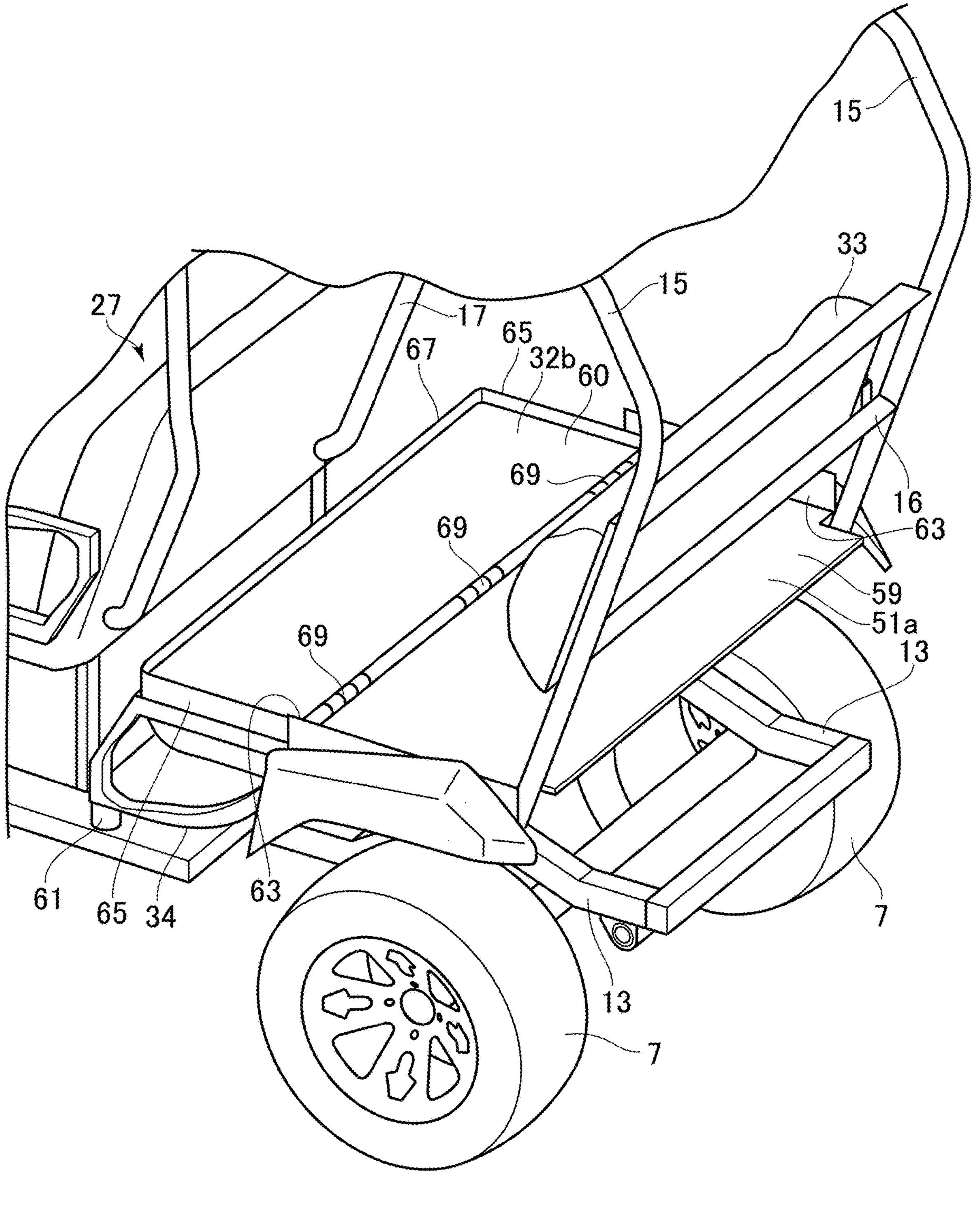
FIG. 7 is a schematic perspective view of the rear portion of the vehicle in a state illustrated in FIG. 3.
Figure 8:
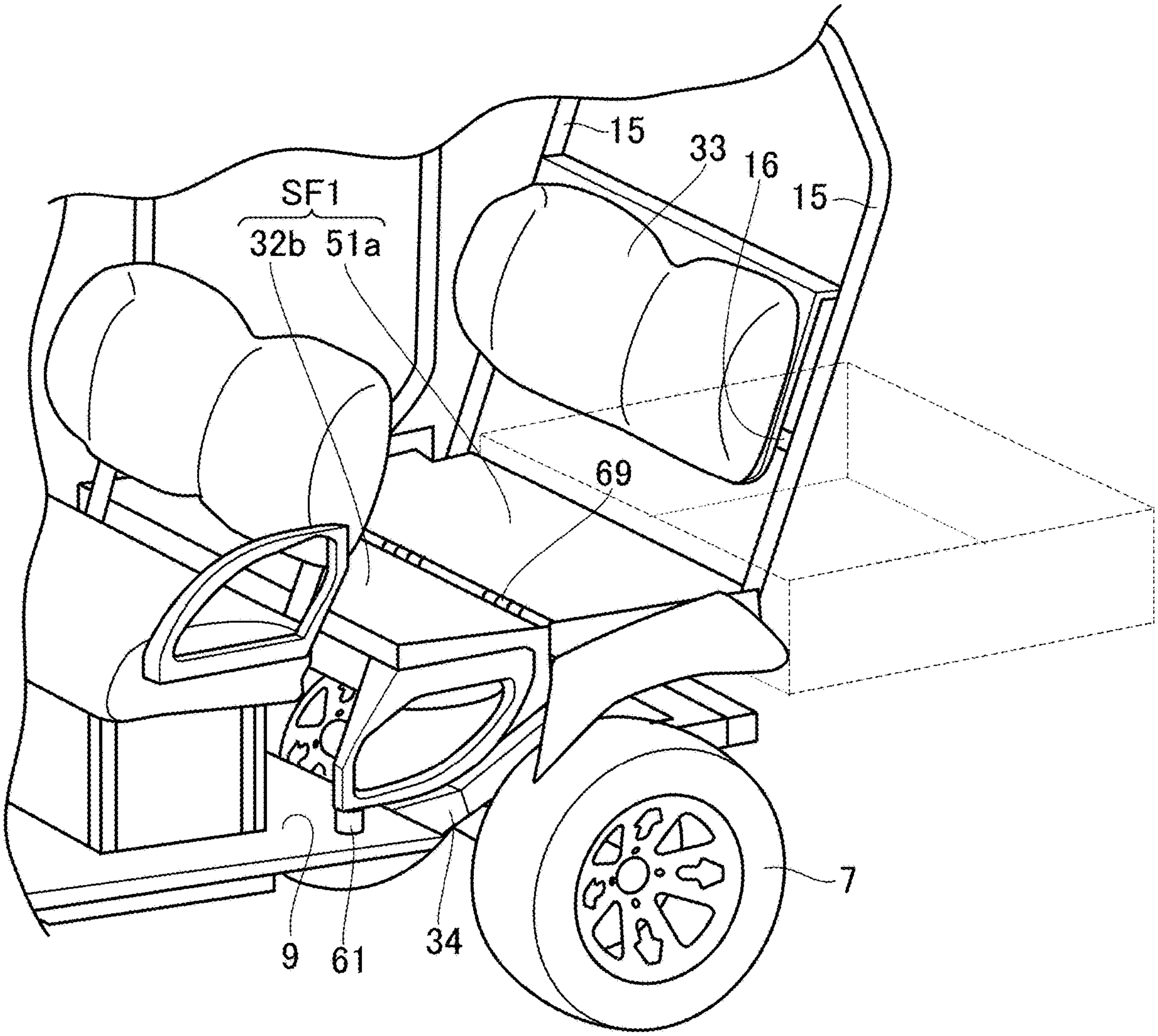
FIG. 8 is a schematic perspective view of the rear portion of the vehicle in the state illustrated in FIG. 3.
Figure 9:
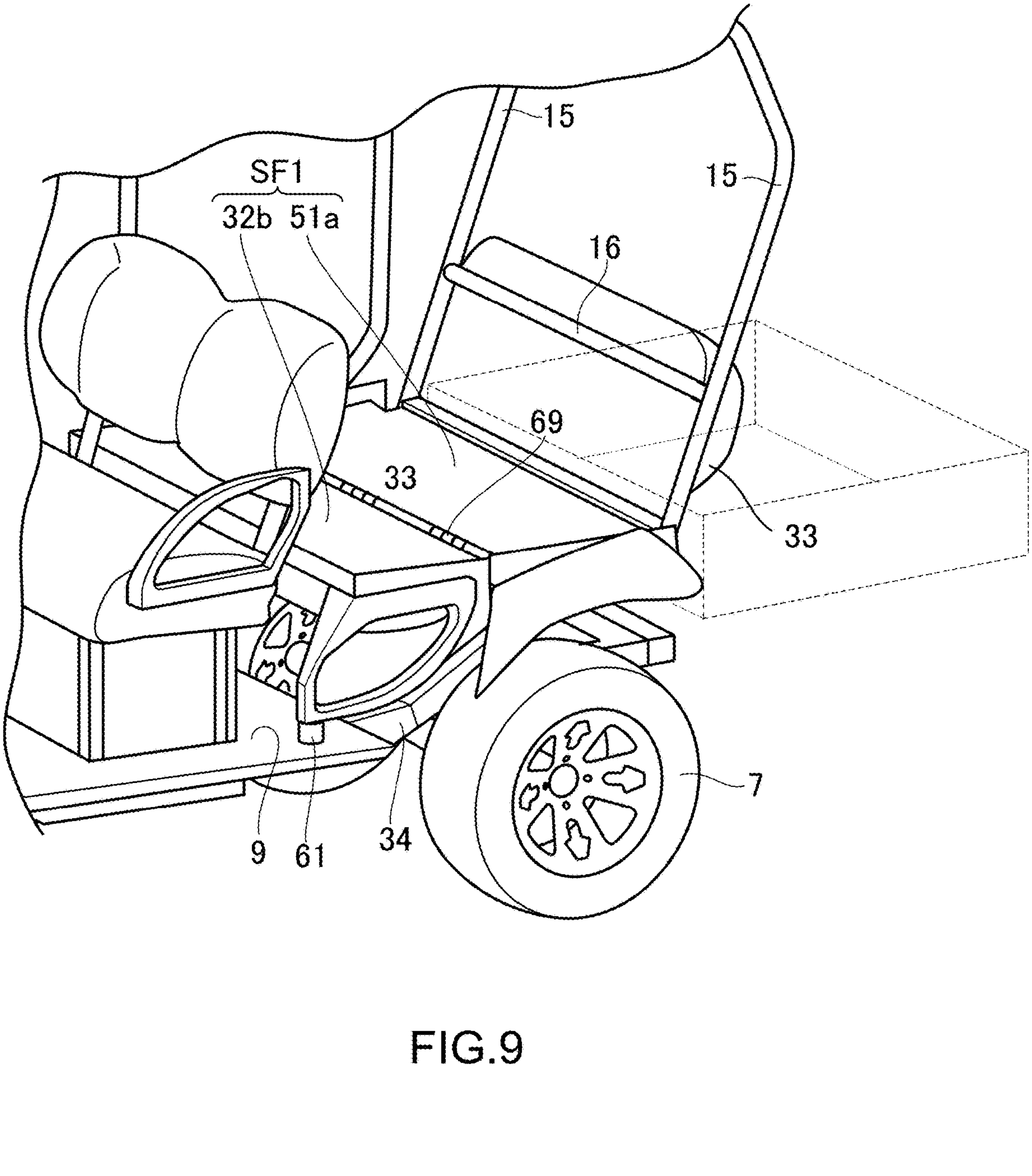
FIG. 9 is a schematic perspective view of the rear portion of the vehicle in a state illustrated in FIG. 5.

Next, an expansion structure of a loading section of the electric cart 1 is described with reference to FIGS. 2 to 9. FIGS. 2 to 5 are schematic side views of the vicinity of the rear seat 31 of the electric cart 1, wherein FIG. 2 illustrates a state in which the rear seat bottom 32 is positioned at a normal use position (a first position), and FIGS. 3 and 4 illustrate a state in which the rear seat bottom 32 is positioned at a developed position (a second position), and FIG. 5 illustrates a state where the rear seat bottom 32 is positioned at the developed position (the second position) and the rear seat back 33 is positioned at a developed position (a second position). FIG. 6 is a perspective view of the vicinity of the rear seat corresponding to FIG. 2, FIG. 7 is a perspective view of the vicinity of the rear seat corresponding to FIG. 3, FIG. 8 is another perspective view of the vicinity of the rear seat corresponding to FIG. 3, and FIG. 9 is a perspective view of the vicinity of the rear seat corresponding to the state of FIG. 5. In FIGS. 2 to 9, the front seat base cover 42, the rear cover 23, and other parts are omitted in order to explain the change in posture of the rear seat bottom 32 and the rear seat back 33.

In a first embodiment, the rear seat bottom 32 is supported by the vehicle body 3 (e.g., the rear seat base 51) in such a manner that the rear seat bottom 32 can be developed from the normal use position (the first position) illustrated in FIG. 2 to the developed position (the second position) illustrated in FIG. 3. In the normal use position (the first position) of the rear seat bottom 32 as illustrated in FIG. 2, the rear seat 31 can be used for seating a passenger(s), that is, the upper surface (the seating surface) of the sear seat bottom 32 faces upward and the bottom surface 32*b* of the rear seat bottom 32 faces downward and is opposed to and is overlapped with the upper surface 51*a* of the rear seat base 51. To the contrary, in the developed position (the second position of the rear seat bottom 32 as illustrated in FIG. 3, the bottom surface 32*b* of the rear seat bottom 32 faces upward and the arm rest 34 of the rear seat 31 is positioned lower than the bottom surface 32*b* of the rear seat bottom 32.

In a first embodiment, since the rear seat bottom 32 can be developed from the normal use position (the first position) illustrated in FIG. 2 to the developed position (the second position) illustrated in FIG. 3, the loading section (SF1) can be formed by developing (flipping over) the rear seat bottom 32 to the front side of the rear seat base 51 as illustrated in FIG. 3.

Specifically, as illustrated in FIG. 3, in the state where the rear seat bottom 32 is developed (flipped over) to the front side of the rear seat base 51, the bottom surface 32*b* of the rear seat bottom 32 faces upward and is positioned in front of the upper surface 51*a* of the rear seat base 51. In this state, the bottom surface 32*b* of the rear seat bottom 32 is substantially flush with the upper surface 51*a* of the rear seat base 51, and the bottom surface 32*b* of the rear seat bottom 32 and the upper surface 51*a* of the rear seat base 51 form the loading section (loading surface SF1).

More specifically, the front end of the upper surface 51*a* of the rear seat base 51 and the front end of the bottom surface 32*b* of the rear seat bottom 32 are connected by means of a hinge 69 (see FIG. 7) whose rotational axis extends in the vehicle widthwise direction, in such a manner that the rear seat bottom 32 is rotatably supported to the rear seat base 51. In the normal use position illustrated in FIGS. 2 and 6, the rear seat bottom 32 is fixed to the rear seat base 51 by a lock mechanism (not illustrated), but the lock mechanism can be released. When the lock mechanism is released, the rear seat bottom 32 can be moved about the hinge 69 from the normal use position illustrated in FIGS. 2 and 6 to the developed position (second position) illustrated in FIGS. 3 and 7.

Further, as illustrated in FIG. 4, when the rear seat bottom 32 is in the developed position (second position), a space S2 between the rear seat bottom 32 and the floor 9 can also be used as a loading space S2. Here, since armrests 34 are attached (fixed) to the left and right ends of the rear seat bottom 32 in a first embodiment, the armrests 34 are positioned on the left and right sides of the loading space S2 when the rear seat bottom 32 is at the developed position (FIGS. 3 and 4). Therefore, the armrests 34 attached to the left and right ends of the rear seat bottom 32 can prevent the luggage placed in the loading space S2 from falling off in the left-right direction of the vehicle.

Although not illustrated, in the state where the rear seat bottom 32 is in the developed position (second position) such as being illustrated in FIG. 3, a part of a front end portion of the rear seat bottom 32 in the development position (which is, a part of a rear end portion of the rear seat bottom 32 in the normal use position) is in contact with the vehicle body, so as to prevent a further rotation of the rear seat bottom 32 and prevent misalignment and displacement of the rear seat bottom 32 in the development position. It may be preferable that the contact part of the rear seat bottom 32 to come in contact with the vehicle body in the development position of the rear seat bottom 32 is provided at a portion of the rear seat bottom 32 that is located on the rear side than the frontmost point of the rear seat back 33 in the state where the rear seat bottom 32 is in the normal use position (the first position) and the rear seat back 33 is in the normal use position (the first position). It may be more preferable that the contact part of the rear seat bottom 32 to come in contact with the vehicle body in the development position of the rear seat bottom 32 is provided at a portion of the rear seat bottom 32 that is located at a position away in the rear direction from a backrest surface of the rear seat back 33 in the state where the rear seat bottom 32 is in the normal use position (the first position) and the rear seat back 33 is in the normal use position (the first position). Further, as illustrated in FIG. 2, the rear end portion of the upper edge of the armrest 34 is provided with a post 61 that is projected from the armrest 34 and has a cylindrical shape. Accordingly, as illustrated in FIGS. 3 and 4, in the developed position of the rear seat bottom 32, the posts 61 of the left and right armrests 34 of the rear seat bottom 32 function as contact portions 61 that contact the floor 9. As a result, the rear seat bottom 32 can be stably supported by the floor 9 when the rear seat bottom 32 is deployed to the developed position.

Also, the post 61 of the armrest 34 may become dirty due to contact with the floor panel 9. Therefore, the post 61 of the armrest 34 is provided at the position where it is difficult for the rear seat passenger to touch. In this example, the post 61 of the armrest 34 is provided at the rear end of the upper edge of the armrest 34 as described above.

Note that although the post 61 provided on the armrest 34 comes in contact with the floor 9 in this example, the armrest 34 may come in direct contact with the floor or the rear seat bottom 32 may be supported in the developed position (FIGS. 3 and 4) by contacting the armrest or the post with a portion of the vehicle body 3 other than the floor 9.

In a first embodiment, as illustrated in FIG. 7, the upper surface 51*a* of the rear seat base 51 is provided with flanges 63 projecting upward from the left and right edges thereof. Further, as illustrated in FIG. 7, in the state where the rear seat bottom 32 is in the developed position (in the state where the rear seat bottom 32 is flipped over), flanges 65 are provided at the left and right edges of the bottom surface 32*b* of the rear seat bottom 32 so as to protrude upward therefrom and a flange 67 is provided at the front edge of the bottom surface 32*b* of the rear seat bottom 32 so as to protrude upward therefrom. In other words, in the state where the rear seat bottom 32 is in the normal use position, the flanges 65 protrude downward from the left and right edges of the bottom surface 32*b* of the rear seat bottom 32 and the flange 67 protrudes downward from the rear edge of the bottom surface 32*b* of the rear seat bottom 32.

The flanges 63 of the upper surface 51*a* of the rear seat base 51 extend linearly in the front-rear direction of the vehicle along the left and right edges of the upper surface 51*a* of the rear seat base 51. The flanges 65 of the bottom surface 32*b* of the rear seat bottom 32 also extend linearly in the front-rear direction of the vehicle along the left and right edges of the bottom surface 32*b* of the rear seat bottom 32. The flange 67 of the bottom surface 32*b* of the rear seat bottom 32 extends linearly in the vehicle width direction along the front edge of the bottom surface 32*b* of the rear seat bottom 32 in the developed position of the rear seat bottom 32 (in the state where the rear seat bottom 32 is flipped over). That is, the flange portion 67 extends linearly in the vehicle width direction along the rear edge of the bottom surface 32*b* of the rear seat bottom 32 when the rear seat bottom 32 is in the normal use position.

With the flange 63 of the upper surface 51*a* of the rear seat base 51 and the flanges 65 and 67 of the bottom surface 32*b* of the rear seat bottom 32, the luggage placed on the loading surface SF1 can be prevented from falling from the loading surface SF1.

Further, in a first embodiment, the rear seat back 33 is rotatably supported by the vehicle body 3 (the rear crossbar 16 in this example) in such a manner that the rear seat back 33 is movable from a normal use position (a first position) illustrated in FIGS. 4 and 8 to a retracted position (a second position) illustrated in FIGS. 5 and 9. In the state where the rear seat back 33 is at the normal use position as illustrated in FIGS. 4 and 8, a cushion part or a backrest surface of the rear seat back 33 faces the front side so as to function as a backrest for a seated passenger(s). To the contrary, in the state where the rear seat back 33 is at the retracted position as illustrated in FIGS. 5 and 9, the cushion part or the backrest surface of the rear seat back 33 faces the rear side so as not to function as the backrest. The rear seat back 33 is fixed to the rear pillars 15 by a lock mechanism (not illustrated) in the normal use position (first position) illustrated in FIGS. 4 and 8. When the lock mechanism is released, the rear seat back 33 can be rotated about the rear crossbar 16 so as to be movable to the retracted position (second position) illustrated in FIG. 9. At the retracted position of the rear seat back 33, the rear seat back 33 functions as an upright wall along the rear end of the loading surface SF1. In other words, although a gap exists between the rear seat back 33 and the loading surface SF1 in the normal use position of the rear seat back 33, the rear seat back 33 is configured, at the retracted position of the rear seat back 33, to close the gap. Accordingly, positioning the rear seat back 33 to the retracted position (FIGS. 5 and 9) when a low-height luggage is placed on the loading surface SF1 prevents the luggage from dropping from the loading surface SF1 to the rear side of the vehicle. In addition, since the rear seat back 33 at the retracted position thereof (FIGS. 5 and 9) is located further away from the front seat 27 than the rear seat back 33 at the normal use position thereof (FIGS. 4 and 8), the loading space S1 can be expanded in the longitudinal direction or the travel direction of the vehicle.

Effects of First Embodiment

Effects of a first embodiment are described below.

According to the electric cart 1 of a first embodiment, the rear seat 31 includes the seat bottom 32 attached to the upper surface 51*a* of the rear seat base 51 projecting from the floor 9, and the rear seat bottom 32 is movably supported with respect to the vehicle body 3 (e.g., the rear seat base 51) in such a manner that the rear seat bottom 32 is movable (e.g., rotatable) between the normal use position (the first position) illustrated in FIG. 2 and the developed position (the second position) illustrated in FIG. 3, in which the rear seat bottom 32 faces upward in front of the upper surface 51*a* of the rear seat base 51 and is substantially flush with the upper surface 51*a* of the rear seat base 51.

Therefore, by moving the rear seat bottom 32 from the normal use position (FIG. 2) to the developed position (FIG. 3), the rear seat bottom 32 is located in front of the upper surface 51*a* of the rear seat base 51 with the bottom surface 32*b* of the rear seat bottom 32 facing upward. As a result, the loading surface SF1 is formed by the bottom surface 32*b* (FIG. 3) of the developed rear seat bottom 32 and the upper surface 51*a* of the rear seat base 51. Therefore, it is possible to form the loading section (loading surface SF1) in the relatively small passenger space 4.

Further, in a first embodiment, the rear seat bottom 32 is rotatably supported with respect to the rear seat base 51 via the hinge 69. Therefore, the rear seat bottom 32 can be movably supported from the normal use position (FIG. 2) to the developed position (FIG. 3) with such a relatively simple structure.

Further, in a first embodiment, the flanges 65 and 67 projecting in the direction intersecting (substantially orthogonal to) the bottom surface 32*b* are provided on at least a part of the peripheral edge of the bottom surface 32*b* of the rear seat bottom 32 (see FIG. 7). With this, when the rear seat bottom 32 is turned upside down to thereby use the bottom surface 32*b* of the rear seat bottom 32 as the loading section (the loading surface SF1), the flanges 65 and 67 are formed around the loading surface SF1. These flanges 65 and 67 can prevent the luggage from falling off the loading surface SF1.

Further, in a first embodiment, the armrests 34 are fixed to the left and right end portions of the rear seat bottom 32. Therefore, when the rear seat bottom 32 is deployed to the developed position, the armrests 34 are located on the left and right sides of the loading space S2 generated between the rear seat bottom 32 and the floor 9, unlike a case where the rear seat armrests are fixed to the rear seat base 51. Therefore, the armrests 34 fixed to the left and right end portions of the rear seat bottom 32 can prevent the luggage from dropping out of the loading space S2 in the left and right directions of the vehicle.

Further, in a first embodiment, the armrest 34 of the rear seat 31 includes the contact portion 61 that directly or indirectly contacts the floor 9 in the developed position of the rear seat bottom 32 (see FIGS. 3 and 7). With this, the load of the rear seat bottom 32 can be supported by the floor 9 via the armrest 34 in the developed position of the rear seat bottom 32.

Further, in a first embodiment, the contact portion 61 of each armrest 34 is provided at the rear end portion of the upper edge of the armrest 34 in the normal use position of the rear seat bottom 32. With this, the contact portion 61 of the armrest 34, which may come into contact with the floor 9 and become dirty, is located at the position where the passenger (user) does not usually touch in the normal use position of the rear seat bottom 32.

Further, in a first embodiment, the rear seat back 33 is movably supported with respect to the vehicle body 3 (e.g., the rear crossbar 16) and the rear seat back 33 is movable to the retracted position (the second position) in which the rear seat back 33 is positioned away from the front seat 27 than the rear seat back 33 in the normal use position (the first position) (see FIG. 5). Therefore, by retracting the rear seat back 33 to the retracted position (FIG. 5), the loading space S1 can be expanded compared to the state where the rear seat back 33 is in the normal use position (FIG. 4).

Further, in a first embodiment, the rear seat back 33 functions as the upright wall along the rear end of the loading surface SF1 when the rear seat back 33 is in the retracted position (FIG. 5). That is, in the retracted position of the rear seat back 33, the rear seat back 33 is located at a position where there was the gap between the rear seat back 33 and the loading surface SF1 in the normal use position of the rear seat back 33 (FIG. 4). With this, when a low-height luggage is placed on the loading surface SF1, the rear seat back 33 in the retracted position (FIG. 5) can prevent the luggage from falling to the rear of the vehicle.

Modifications of First Embodiment

Figure 10:
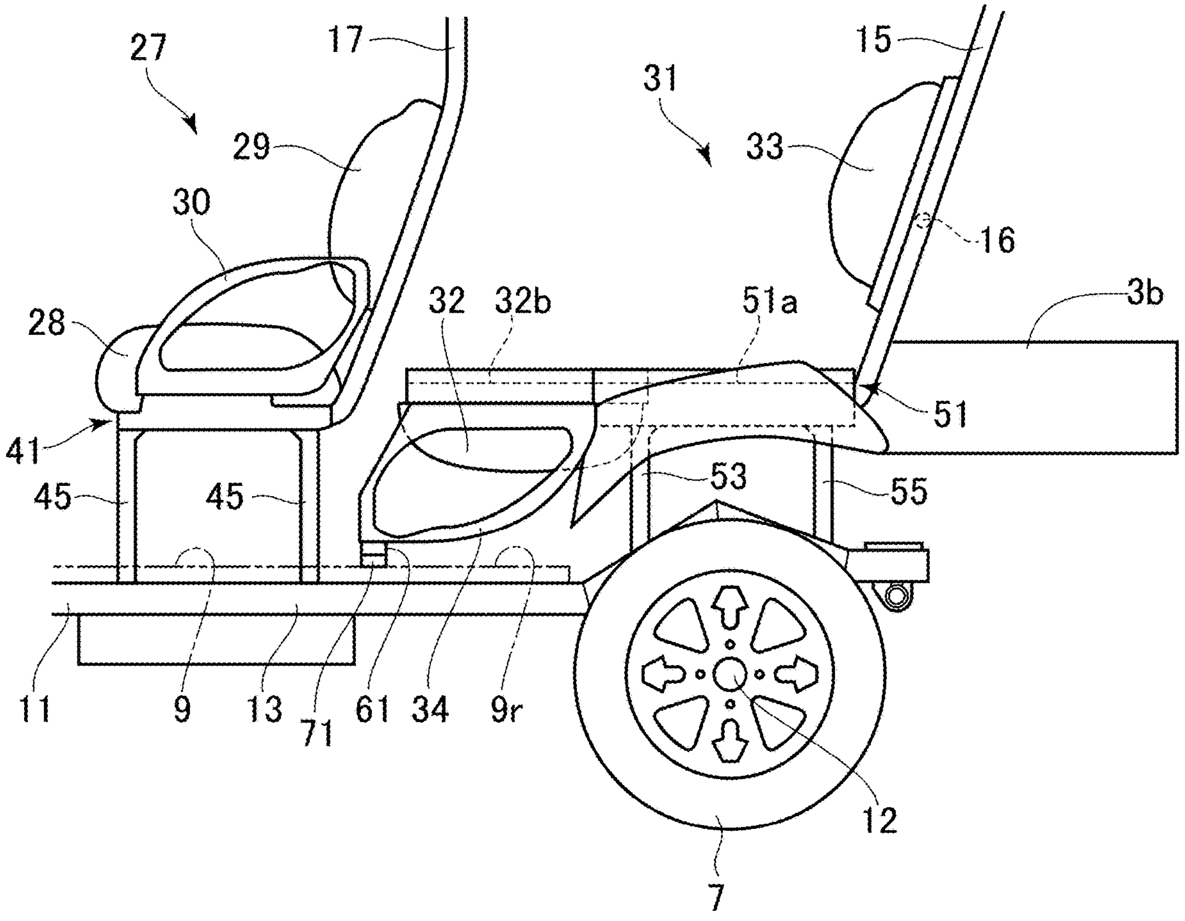
FIG. 10 is a schematic side view of the vicinity of a rear seat of an electric cart according to a first modification of a first embodiment.
Figure 11:
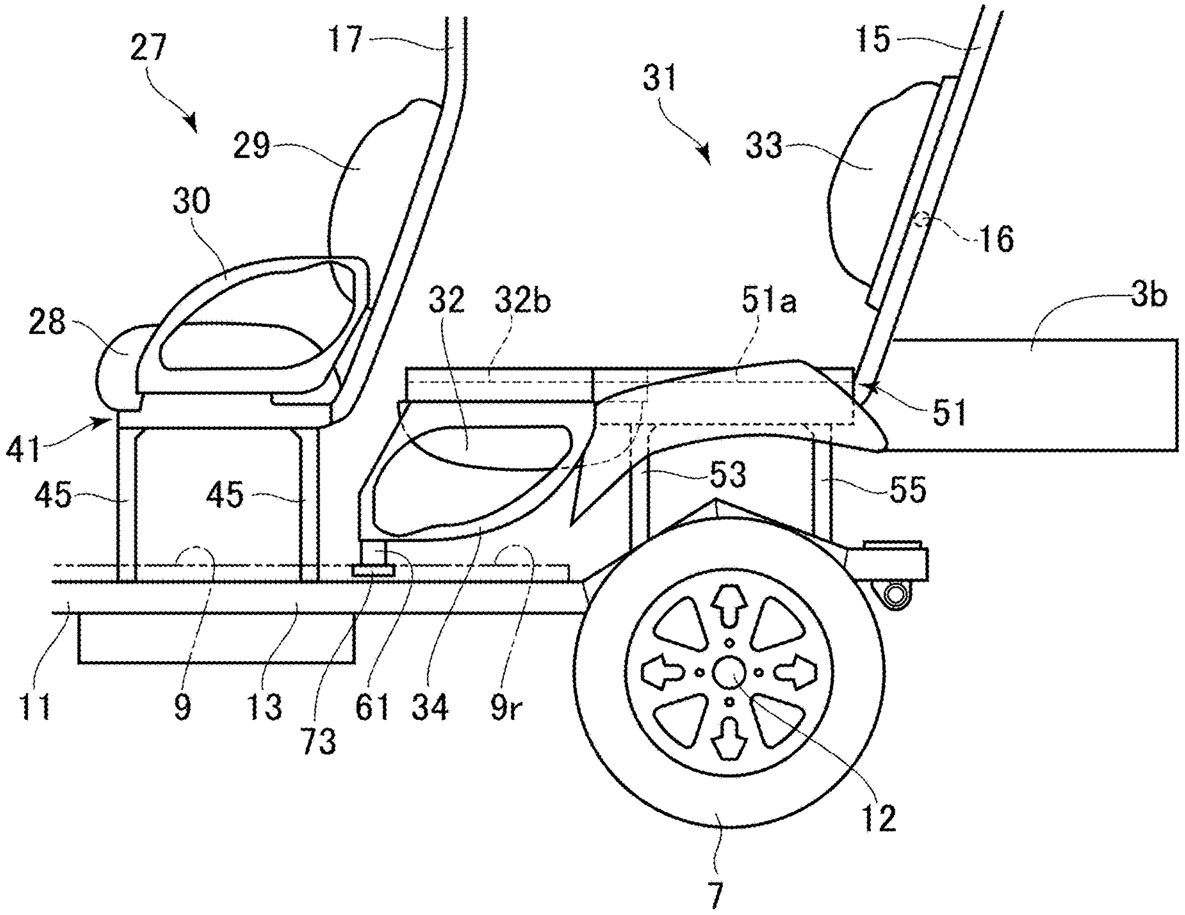
FIG. 11 is a schematic side view of the vicinity of a rear seat of an electric cart according to a second modification of a first embodiment.

FIG. 10 illustrates a first modification of a first embodiment, and FIG. 11 illustrates a second modification of a first embodiment. In a first modification illustrated in FIG. 10, a damper 71 as a cushioning material is attached to the tip of the post 61 as the contact portion of the armrest 34 fixed to the rear seat bottom 32. In a second modification illustrated in FIG. 11, a damper 73 as a cushioning material is embedded in a portion of the floor 9 that comes in contact with the tip of the post 61.

According to a first modification and a second modification, when the rear seat bottom 32 is moved from the normal use position (first position) to the developed position (second position), collision between the post 61 and the floor 9 can be softened. Moreover, the damper 71 or 73 can suppress rattling between the rear seat bottom 32 and the floor 9 at the developed position of the rear seat bottom 32.

In addition, the damper is provided on one of the contact portion 61 of the armrest 34 and the floor 9 in first and second modifications described above, but the damper may be provided on both.

Second Embodiment

Next, an electric cart 1 according to a second embodiment of the disclosure is described with reference to FIGS. 12 and 13.

A second embodiment differs from a first embodiment in the structure of the armrests 34 of the rear seat bottom 32 and differs from a first embodiment in the support structure for supporting the rear seat back 33.

Figure 12:
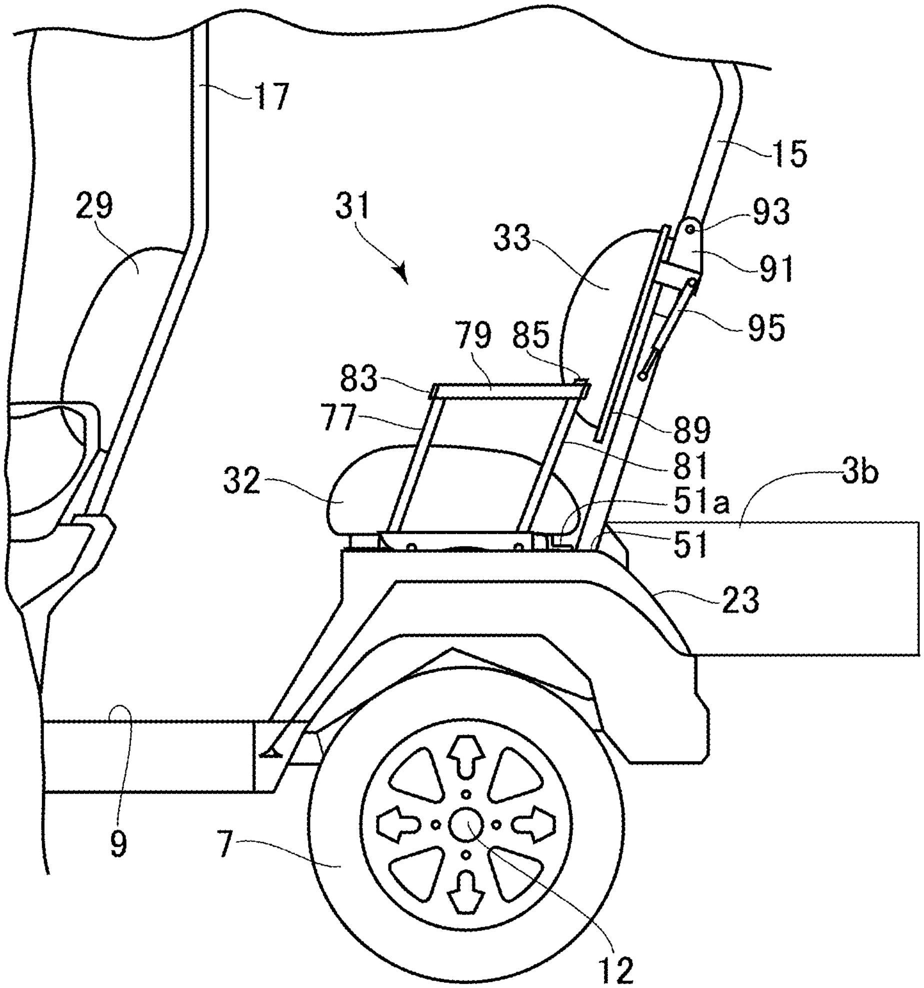
FIG. 12 is a schematic side view of the vicinity of a rear seat of an electric cart according to a second embodiment.

FIG. 12 is a schematic side view of the vicinity of a rear seat of the electric cart 1 according to a second embodiment, illustrating a state where a rear seat bottom 32 is in a normal use position (first position) and a rear seat back 33 is in a normal use position (first position). FIG. 13 is a schematic side view of the vicinity of the rear seat of the electric cart 1 according to a second embodiment, illustrating a state where the rear seat bottom 32 is in a developed position (second position) and the rear seat back 33 is in a retracted position (second position). Note that in the normal use position (first position) of the rear seat back 33 as illustrated in FIG. 12, the backrest surface and the cushion part of the rear seat back 33 faces the front side and is used as a backrest for a seated passenger(s). To the contrary, in the retracted position (second position) of the rear seat back 33 as illustrated in FIG. 13, the backrest surface and the cushion part of the rear seat back 33 faces upward and the back surface of the rear seat back 33 faces downward and extends substantially in the horizontal direction, such that the rear seat back 33 does not function as the backrest.

First, the structure of an armrest 34 of the rear seat bottom 32 according to a second embodiment is described. As illustrated in FIG. 12, the armrest 34 of the rear seat bottom 32 according to a second embodiment is formed in a quadrangular shape, more specifically, in a substantially parallelogram shape. The armrest 34 includes a front member 77, an upper member 79, and a rear member 81, each of which is formed linearly, in such a manner that the front member 77, the upper member 79, the rear member 81, and an armrest base 75 form the quadrangular (parallelogram) shape. The armrest base 75 is fixed to both left and right end portions of the bottom surface **32*b* of the rear seat bottom 32. The armrest base 75 extends substantially parallel to the bottom surface 32*b* of the rear seat bottom 32. An upper surface of the upper member 79 of the armrest 34 is provided substantially parallel to the bottom surface 32*b* of the rear seat bottom 32. The upper surface of the upper member 79 of the armrest 34 is substantially parallel to the floor 9 and parallel to the upper surface 51*a* (see FIG. 13) of the seat base 51 when the rear seat bottom 32 is in the normal use position illustrated in FIG. 12. A damper 83 is attached to the front surface of the front end portion of the upper member 79 of the armrest 34, and a damper 85 is attached to the upper surface of the rear end portion of the upper member 79 of the armrest 34**.

Figure 13:
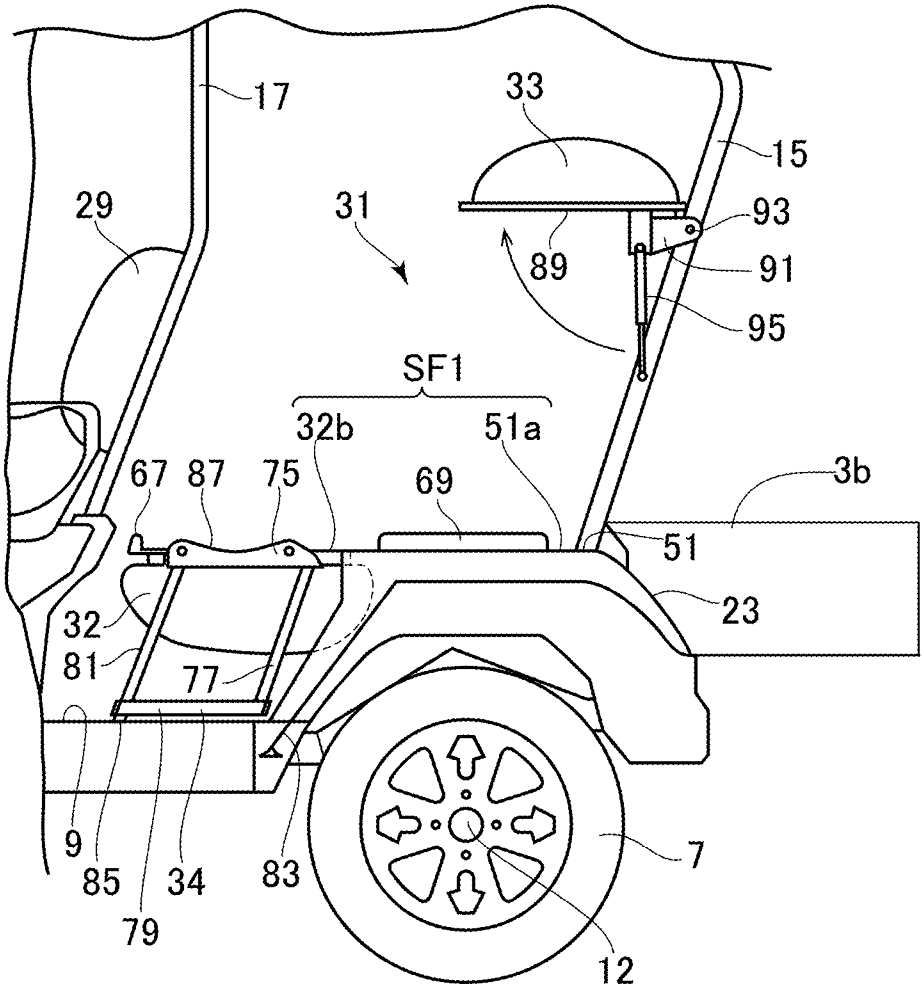
FIG. 13 is a schematic side view of the vicinity of the rear seat of the electric cart according to a second embodiment, illustrating a state in which a rear seat bottom is developed forward so as to form a loading section and a rear seat back is developed upwardly forward.

When the rear seat bottom 32 is turned over from the normal use position of the rear seat bottom 32 illustrated in FIG. 12 to the developed position of the rear seat bottom 32 illustrated in FIG. 13, the bottom surface **32*b* of the rear seat bottom 32 is substantially flush with the upper surface 51*a* of the rear seat base 51. With this, the loading surface SP1 is formed. In this state, the upper surface of the upper member 79 of the armrest 3 is in contact with or in the vicinity of the floor 9 with the upper surface of the upper member 79 of the armrest 34 being in parallel with the floor 9, the damper 85 attached to the upper member 79 is in contact with the floor 9, and the damper 83 attached to the upper member 79 is in contact with the front end portion of the rear cover 23**.

Further, the armrest base 75 includes a flange portion 87 (FIG. 13). In the developed position of the rear seat bottom 32 illustrated in FIG. 13, the flange portions 87 protrude from both ends, in the left and right directions of the vehicle, of the loading surface SF1. With this, the luggage placed on the loading surface SF1 can be prevented from falling off in the left and right directions of the vehicle.

Next, a support structure for supporting the rear seat back 33 according to a second embodiment is described with reference to FIGS. 12 and 13. In a second embodiment, the rear seat back 33 can be retracted from the normal use position (first position) illustrated in FIG. 12, in which the rear seat back 33 stands upright to function as the backrest of the rear seat 31 and blocks a part of a rear opening formed between the left and right rear pillars 15, to the retracted position (second position) illustrated in FIG. 13, in which the rear seat back 33 is moved away from the normal use position to open the blocked part of the rear opening. That is, the rear seat back 33 is supported by the rear pillars 15 in such a manner that the rear seat back 33 can be retracted toward a forwardly-upward side from the normal use position (FIG. 12).

A specific support structure for the rear seat back 33 is as follows. A base plate 89 is attached to the rear surface of the rear seat back 33. The upper end portion of the base plate 89 is provided with brackets 91 at positions corresponding to the left and right rear pillars 15. Each bracket 91 is rotatably attached to the rear pillar 15 by a pin 93. That is, the rear seat back 33 is supported by the vehicle body (the rear pillar 15) so as to be rotatable about the pin 93 functioning as a rotation axis. Further, a biasing device 95 including a compression spring is connected between the bracket 91 and the rear pillar 15. Therefore, when the rear seat back 33 is positioned on a side closer to the normal use position than a change point (not illustrated) that is located between the normal use position (FIG. 12) and the retracted position (FIG. 13), the biasing device 95 biases the rear seat back 33 toward the normal use position. With this, the rear seat back 33 comes into contact with a stopper (not illustrated) provided on the rear pillar 15 and stops at the normal use position. On the other hand, when the rear seat back 33 is positioned on a side closer to the retracted position than the change point (not illustrated), the biasing device 95 biases the rear seat back 33 toward the retracted position, and the rear seat back 33 stops at the retracted position.

With such a structure, when the user rotates the rear seat back 33 located at the normal use position from the normal use position (FIG. 12) toward the retracted position (FIG. 13) against the biasing force of the biasing device 95 and then the rear seat back 33 passes over the change point, the rear seat back 33 is moved to the retracted position (FIG. 13) by means of the biasing force of the biasing device 95 and stops at the retracted position. Therefore, in a second embodiment, as illustrated in FIG. 13, by retracting the rear seat back 33 to the retracted position higher than the normal use position, a relatively tall luggage can be put on the loading surface SF1 from the rear side of the electric cart 1. Further, in a case where the luggage to be placed on the loading surface SF1 is long in the longitudinal direction or the travel direction of the vehicle, the luggage can be placed on the loading surface SF1 with a part of which protrudes rearward from the loading surface SF1. Note that the lower end position of the rear seat back 33 in the retracted position of the rear seat back 33 illustrated in FIG. 13 is located upper than the lower end position of the rear seat back 33 in the normal use position of the rear seat back 33 illustrated in FIG. 12. Further, in the retracted position of the rear seat back 33 as illustrated in FIG. 13, the lower end 33*c* of the rear seat back 33 in the normal use position is located upper than the pivot axis 93 of the rear seat back 33. Further, in the retracted position of the rear seat back 33 as illustrated in FIG. 13, the back surface 33*d* of the rear seat back 33 is located upper than the pivot axis 93 of the rear seat back 33. Note that in a second embodiment, the rear seat back 33 is rotated from the normal use portion illustrated in FIG. 12 to the retracted position illustrated in FIG. 13 by about 90 degrees, however, the disclosure is not limited thereto. For example, in a modification, the rear seat back 33 may be rotated by more than 90 degrees. Also, in a second embodiment, in the state where the rear seat back 33 is in the retracted position illustrated in FIG. 13, the back surface of the rear seat back 33 extends substantially in the horizontal direction, however, the disclosure is not limited thereto. For example. In a modification, in the state where the rear seat back 33 is in the retracted position, the back surface of the rear seat back 33 may be inclined with respect to the horizontal direction.

Effects of Second Embodiment

Next, effects of a second embodiment are described. Note that descriptions of the same or similar effects based on the same or similar configurations as in a first embodiment may be omitted in order to avoid redundancy.

In a second embodiment, the rear seat back 33 is supported by the vehicle body (for example, the rear pillars 15) in such a manner that the rear seat back is movable between the normal use position (see FIG. 12) in which the rear seat back 33 is positioned above the rear end of the rear seat bottom 32 and functions as the backrest for the passenger seated on the rear seat bottom 32 and the retracted position (FIG. 13) above the normal use position (see FIG. 12). Accordingly, by retracting the rear seat back 33 to the retracted position (FIG. 13), which is higher than the normal use position (see FIG. 12), a relatively tall luggage can be put onto the loading surface SF1 from the rear side of the electric cart 1. Further, in a case where the luggage to be placed on the loading surface SF1 is long in the longitudinal direction or the travel direction of the vehicle, the luggage can be placed on the loading surface SF1 with a part of which protrudes rearward from the loading surface SF1.

Further, in a second embodiment, the rear seat back 33 is rotatably supported by the rear pillar 15 as a part of the vehicle body 3 so as to be movable between the normal use position (FIG. 12) and the retracted position (FIG. 13) above the normal use position. Accordingly, the rear seat back 33 can be movably supported between the normal use position (FIG. 12) and the retracted position (FIG. 13) with a simple structure without adding any other structures.

Further, in a second embodiment, a part of the vehicle body (the rear pillars 15) and the rear seat back 33 are connected with the biasing device 95, and the biasing device 95 is configured to bias the rear seat back 33 toward the normal use position (FIG. 12) when the rear seat back 33 is closer to the normal use position (FIG. 12) than the change point and to bias the rear seat back 33 toward the retracted position (FIG. 13) when the back 33 is closer to the retracted position (FIG. 13) than the change point. Accordingly, the rear seat back 33 can be stabilized at the normal use position (FIG. 12) or the retracted position (FIG. 13) with such a relatively simple structure.

Further, in a second embodiment, the armrests 34 of the rear seat 31 include the flange portions 87 protruding, in the direction substantially orthogonal to the bottom surface 32*b*, from the vicinity of both left and right end portions of the bottom surface 32*b* of the rear seat bottom 32. With this, when the rear seat bottom 32 is positioned at the developed position (FIG. 13) to form the loading surface SF1, the flange portions 87 of the armrests 34 exhibit the function of preventing the load from falling off. Therefore, the flange portions 87 having the fall-off prevention function are formed without providing flange portions on the left and right ends of the bottom surface 32*b* of the rear seat bottom 32.

[Modification of Support Structure for Rear Seat Back]

Figure 14:
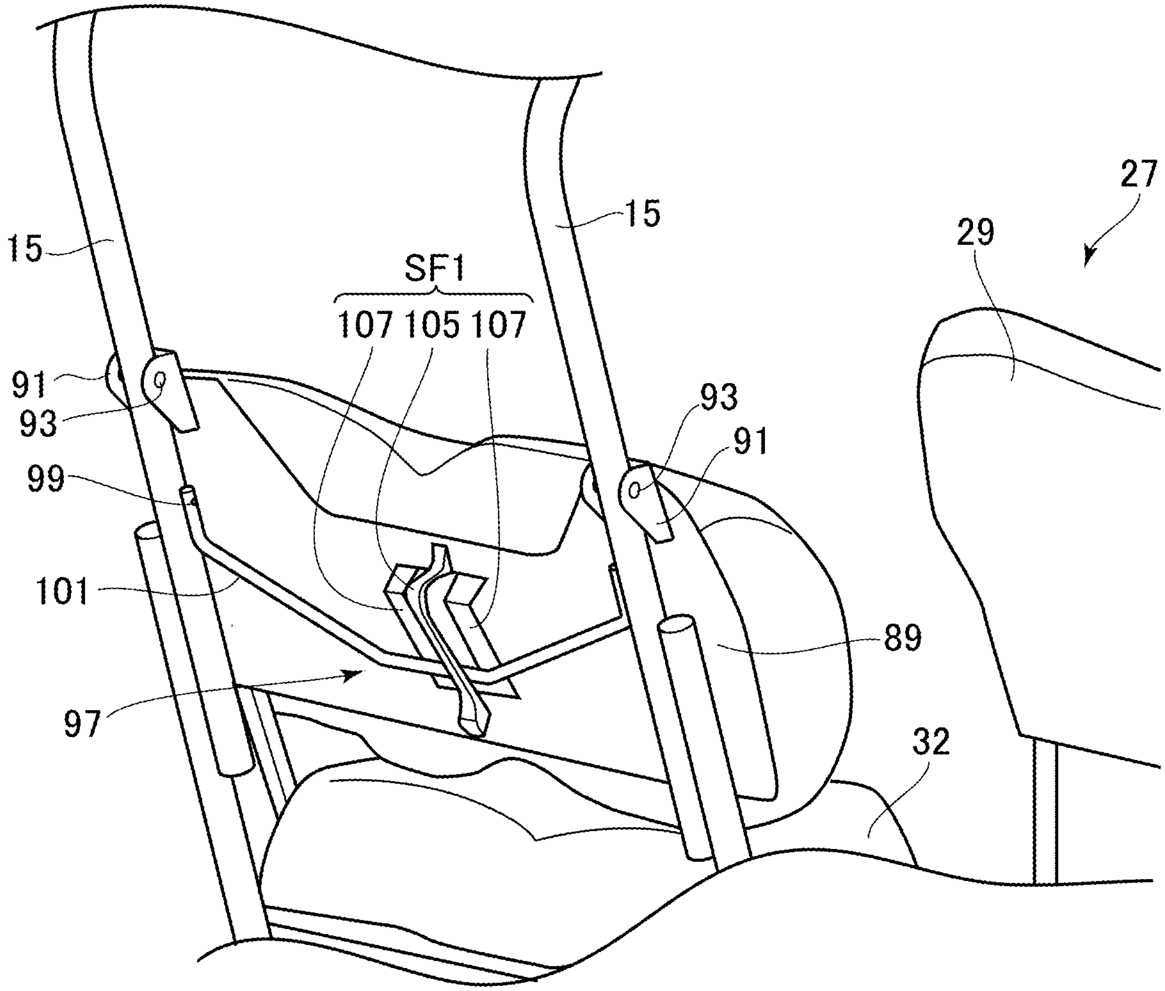
FIG. 14 is a schematic perspective view of a modification of a support structure for the rear seat back according to a second embodiment, illustrating the rear seat back in a normal use position thereof.
Figure 16:
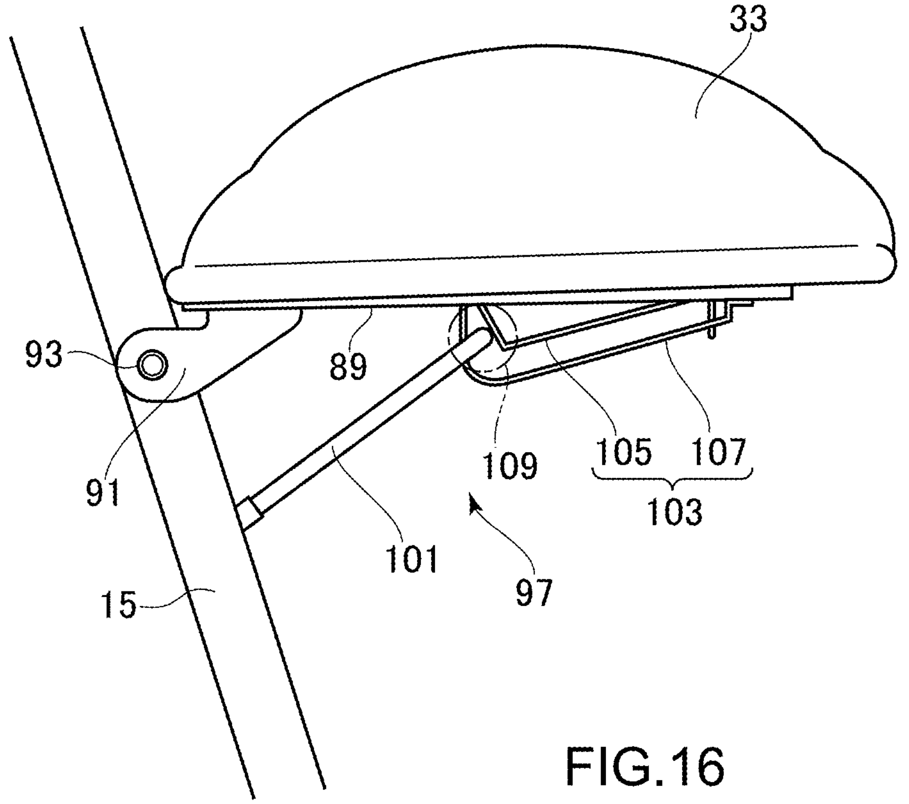
FIG. 16 is a schematic side view of the modification of the support structure for the rear seat back according to a second embodiment, illustrating the rear seat back in the retracted position thereof.
Figure 17:
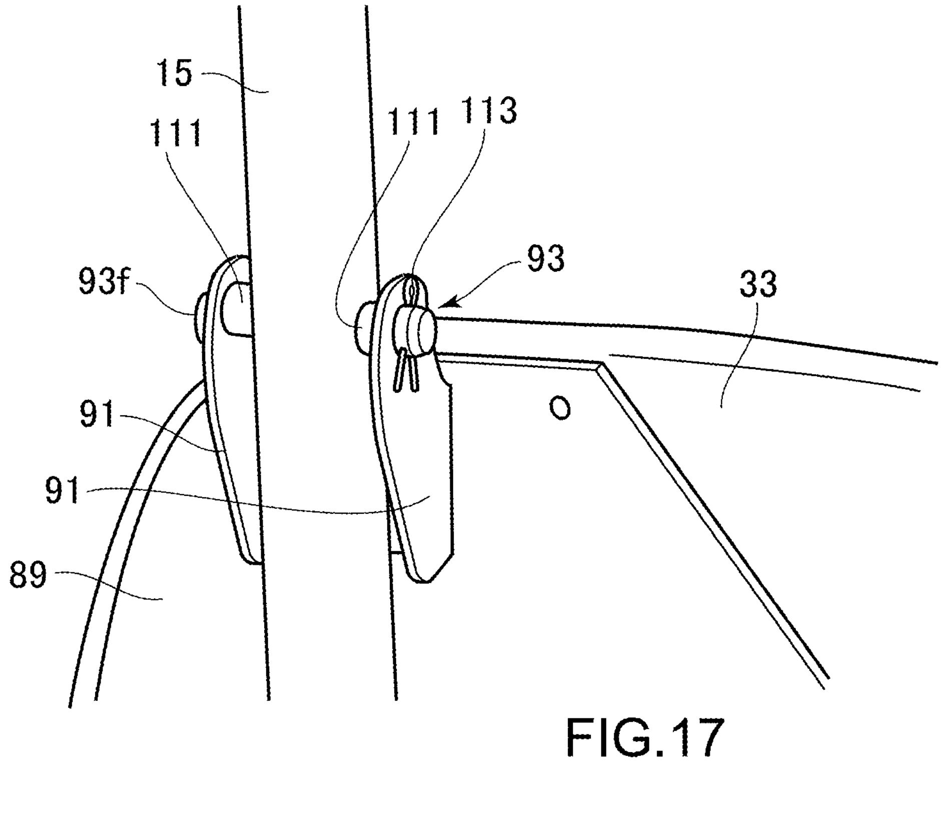
FIG. 17 is an enlarged perspective view of a part of the modification of the support structure for the rear seatback according to a second embodiment.

Next, a support structure for supporting the rear seat back 33 according to a modification of a second embodiment is described with reference to FIGS. 14 to 17. FIG. 14 is a perspective view illustrating the rear seat back 33 at the normal use position, FIG. 15 is a perspective view illustrating the rear seat back 33 at the retracted position, FIG. 16 is a side view illustrating the rear seat back 33 at the retracted position, and FIG. 17 is an enlarged perspective view of a part of the support structure for supporting the rear seat back.

A modification illustrated in FIGS. 14 to 17 differs from a second embodiment in that a holding mechanism 97 is provided instead of the biasing device 95 of a second embodiment. Specifically, as illustrated in FIG. 14, the holding mechanism 97 includes a rotary bar 101 held by the rear pillar 15 so as to be rotatable about a rotational shaft 99, a slide rail portion 103 that is fixed to the base plate 89 of the rear seat back 33 and configured to guide the rotary bar 101. The slide rail portion 103 includes a first guide plate 105 provided substantially in the center of the rear seat back 33 in the left-right direction, and a pair of second guide plates 107 provided on the left and right sides of the first guide plate 105. The rotary bar 101 supported by the rear pillar 15 is inserted in the slide rail portion 103 formed by the first guide plate 105 and the second guide plate 107.

Figure 15:
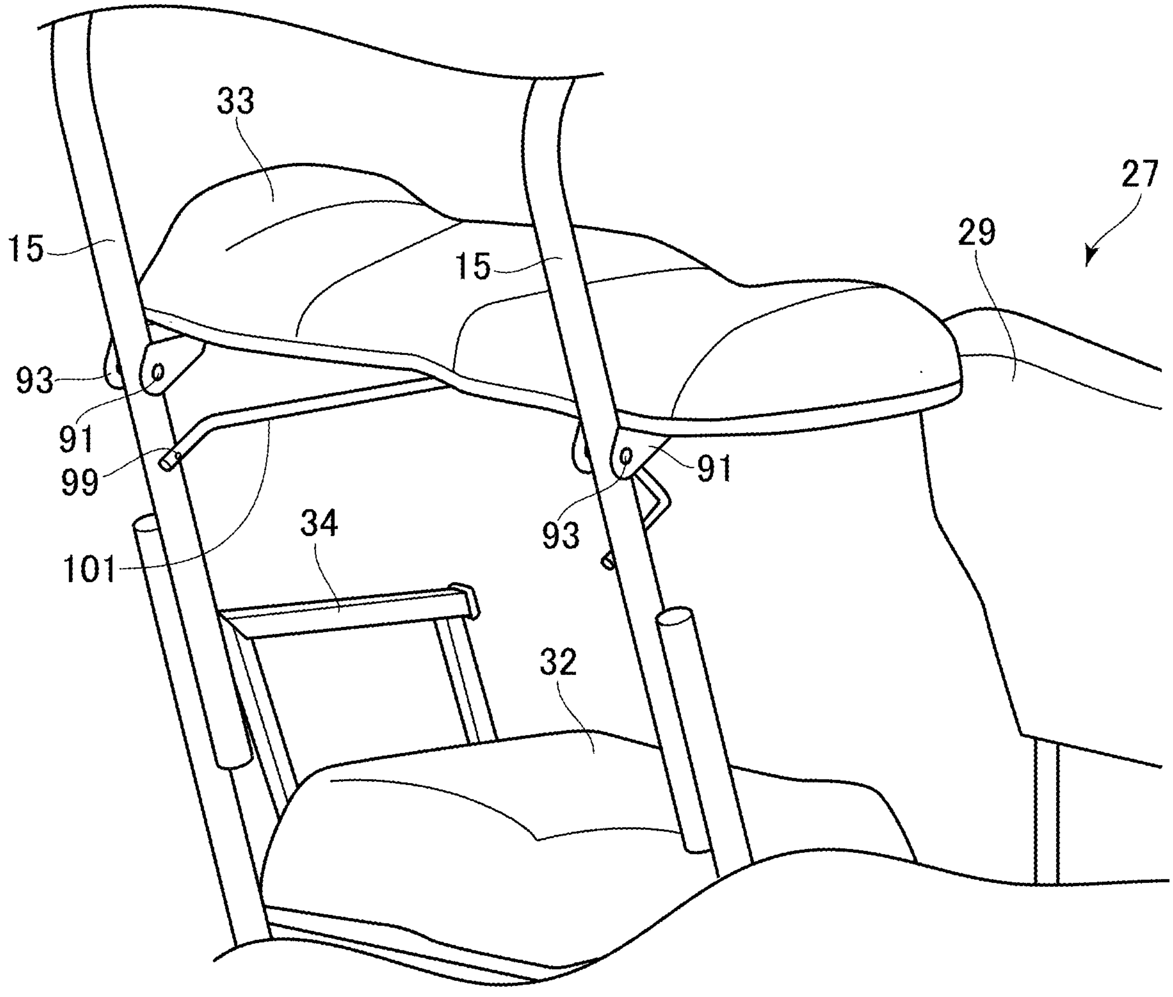
FIG. 15 is a schematic perspective view of the modification of the support structure for the rear seat back according to a second embodiment, illustrating the rear seat back in a retracted position thereof.

As illustrated in FIGS. 14 and 15, when the user rotates the rear seat back 33 from the normal use position (FIG. 14) to the retracted position (FIG. 15), or from the retracted position (FIG. 15) to the normal use position (FIG. 14), the rotary bar 101 moves in the slide rail portion 103 while rotating about the rotational shaft 99.

In the normal use position of the rear seat back 33 illustrated in FIG. 14, the base plate 89 of the rear seat back 33 abuts against stoppers (not illustrated) provided on the rear pillars 15, and thus the rear seat back 33 is stabilized in the normal use position (FIG. 14) due to the weight of the rear seat back 33.

On the other hand, in the retracted position of the rear seat back 33 illustrated in FIG. 15, the rotation bar 101 is held by a holding section 109 (see FIG. 16) defined by the curved end portion of the slide rail portion 103, to thereby stop rotation of the bar 101 and rotation of the rear seat back 33. With this, the rear seat back 33 is stabilized against the weight thereof at the retracted position of the rear seat back 33. In this modification, with such a structure, the rear seat back 33 can be retracted and stopped at the retracted position (FIG. 15) higher than the normal use position (FIG. 14).

Further, as illustrated in FIG. 17, the pin 93 functioning as the rotational axis 93 of the rear seat back 33 passes through a boss 111 projecting from the bracket 91 and a through hole (not illustrated) provided in the rear pillar 15. The pin 93 is prevented from coming off the boss 111 and the through hole, by means of a flange portion *93f* provided at one end of the pin 93 and a snap pin 113 inserted into a through hole provided at the other end of the pin 93.

With such a configuration, the rear seat back 33 can be removed from the rear pillar 15 by removing the snap pin 113 from the pin 93 and further removing the pin 93 from the rear pillar 15. Similarly, the rotational shaft 99 of the rotary bar 101 may also be attached to the rear pillar 15 with a snap pin (not illustrated) or the like, and the rotary bar 101 may also be removed from the rear pillar by removing the snap pin (not illustrated) or the like.

Thus, in the modification illustrated in FIGS. 14 to 17, the rear seat back 33 can be held at the retracted position by the holding mechanism 97.

[Modification of Loading Surface SF1]

Figure 18:
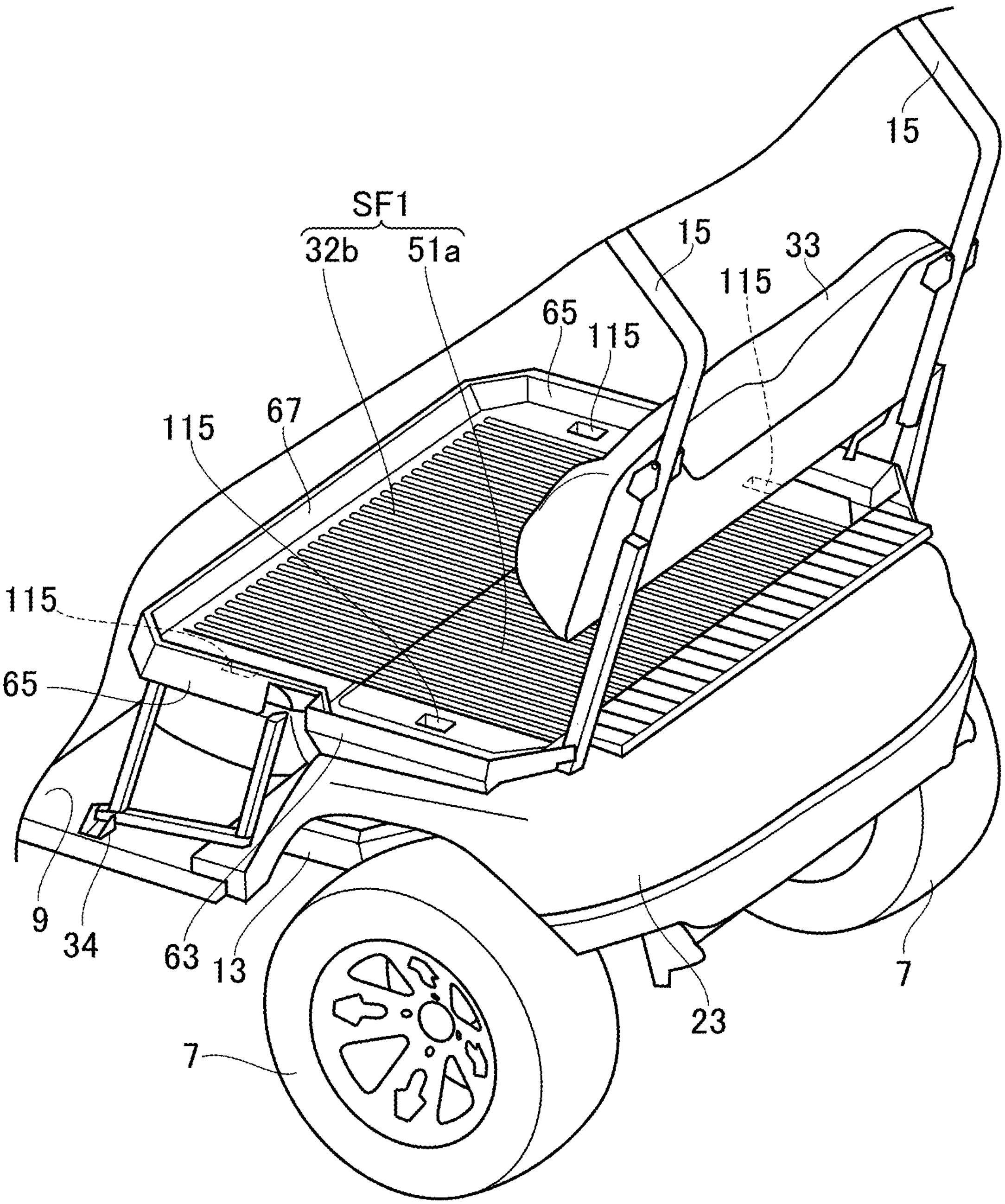
FIG. 18 is a schematic perspective view of the vicinity of the rear seat of the electric cart according to a modification of a second embodiment, illustrating a state in which the loading section is formed.
Figure 19:
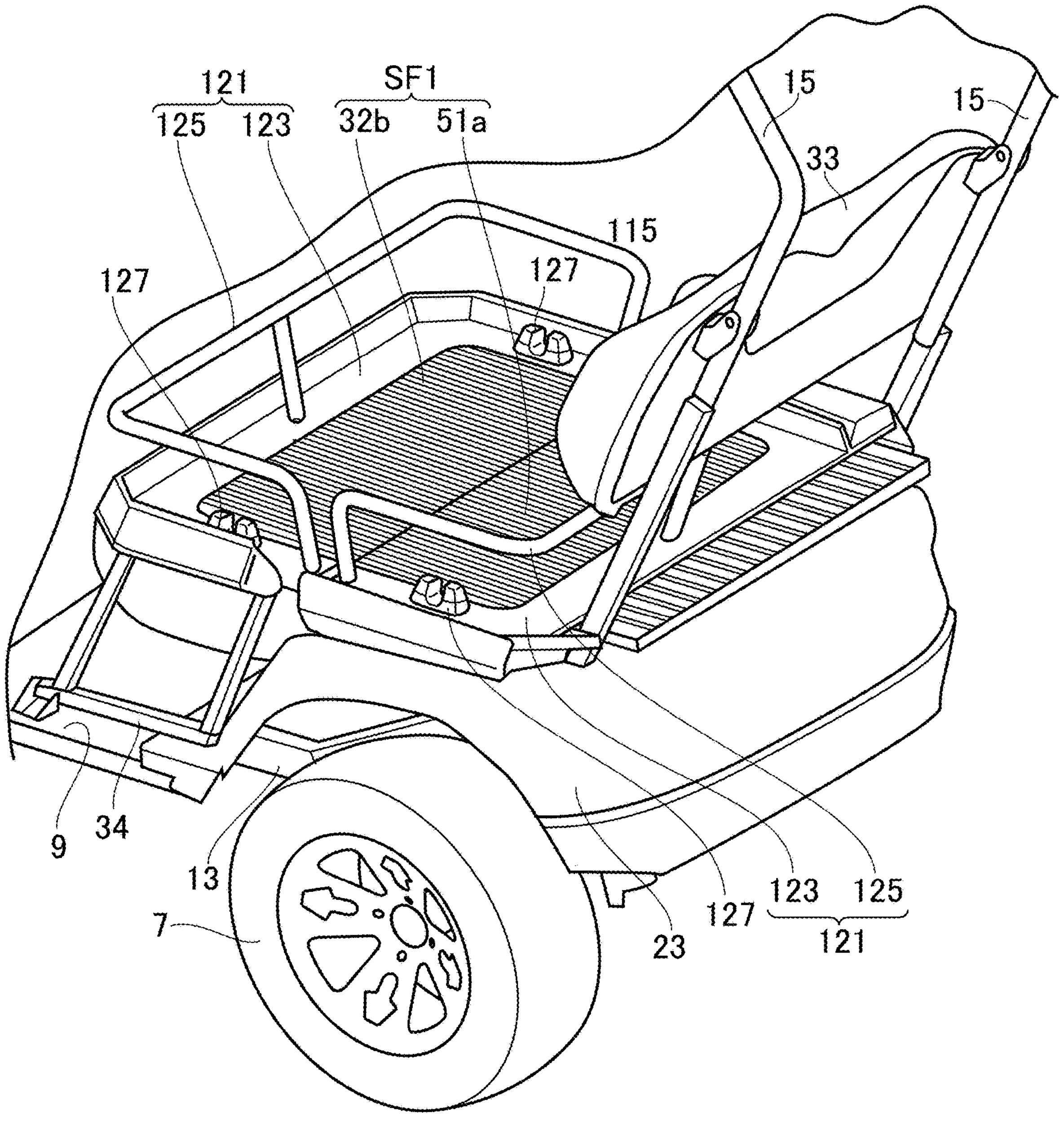
FIG. 19 is a schematic perspective view of the vicinity of the rear seat of the electric cart according to a modification of a second embodiment, illustrating a state in which a first accessory is attached to the formed loading section.
Figure 20:
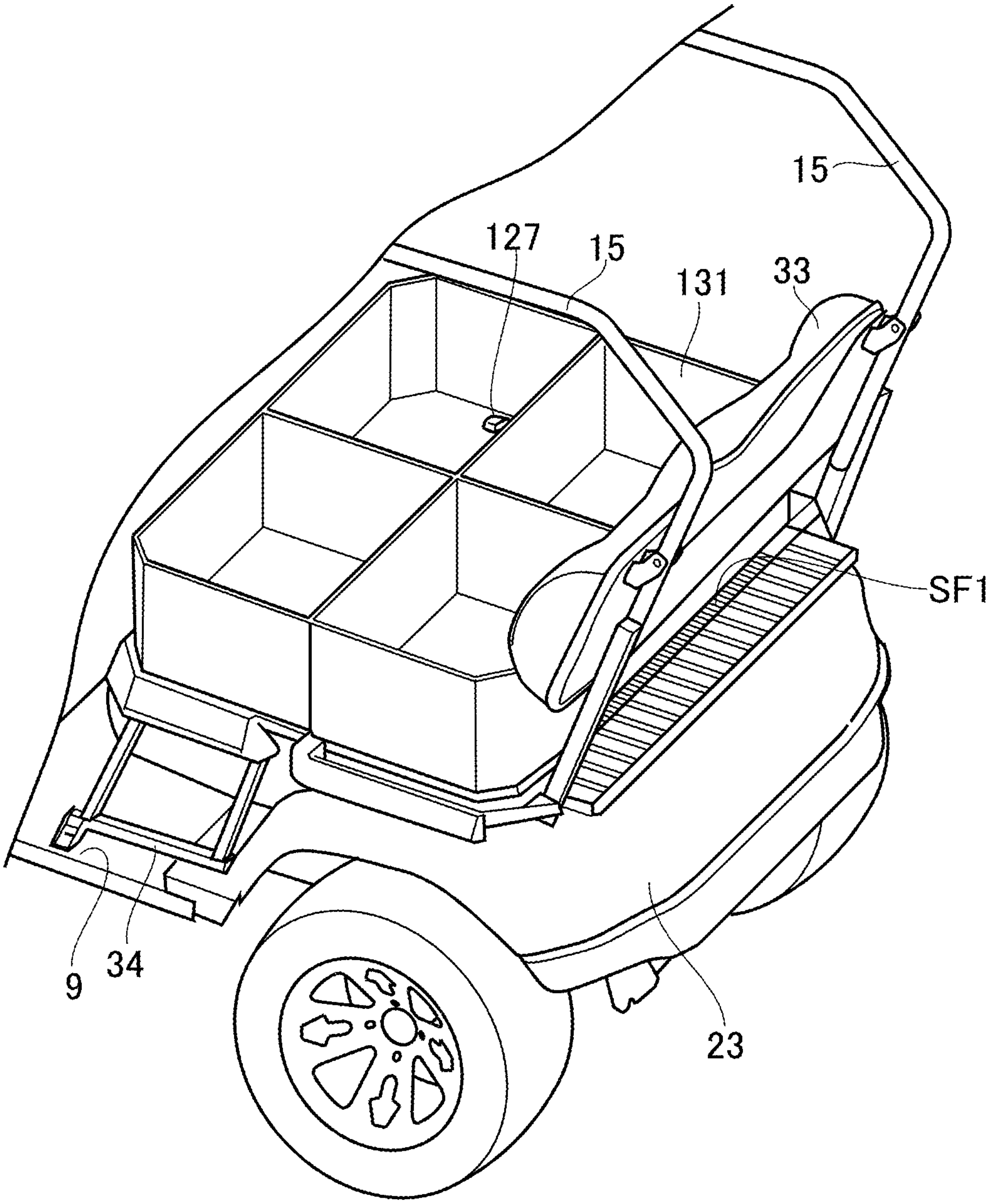
FIG. 20 is a schematic perspective view of the vicinity of the rear seat of the electric cart according to a modification of a second embodiment, illustrating a state in which a second accessory is attached to the formed loading section.

Next, a modification of the loading surface SF1 is described with reference to FIGS. 18 to 20. FIG. 18 is a perspective view of the vicinity of the rear seat 31, illustrating a state where the bottom surface *32b* of the rear seat bottom 32 and the upper surface *51a* of the rear seat base 51 form the loading surface SF1. FIG. 19 is a diagram illustrating a state where accessories are attached to the loading surface SF1 illustrated in FIG. 18. FIG. 20 is a diagram illustrating a state where another accessory is attached to the loading surface SF1 illustrated in FIG. 18.

In the modification illustrated in FIG. 18, a plurality of attachment holes 115 are provided on the loading surface SF1. The attachment holes 115 are provided in the vicinity of the outer peripheral edge of the loading surface SF1. In this example, the bottom surface *32b* of the rear seat bottom 32 is provided with a pair of attachment holes 115 at symmetrical positions in the left-right direction, and the upper surface *51a* of the rear seat base 51 is provided with a pair of attachment holes 115 at symmetrical positions in the left-right direction. That is, a total of four attachment holes 115 are provided. Also, the pair of attachment holes 115 provided in the bottom surface *32b* of the rear seat bottom 32 are provided at positions symmetrical to the pair of attachment holes 115 provided in the upper surface *51a* of the rear seat base 51 with respect to a boundary line between the bottom surface *32b* of the rear seat bottom 32 and the upper surface *51a* of the rear seat base 51.

Accessories 121 illustrated in FIG. 19, an accessory 131 illustrated in FIG. 20, or other accessories can be attached to the loading surface SF1 having such attachment holes 115.

For example, each of the two accessories 121 illustrated in FIG. 19 include a plate member 123 having a U-shape when viewed from above, and a pipe member 125 fixed to the plate member 123 and protruding from the plate member 123. The plate member 123 is provided with attachment holes at positions corresponding to the pair of attachment holes 115 in the bottom surface *32b* of the rear seat bottom 32 (or the pair of attachment holes 115 provided in the upper surface *51a* of the rear seat base 51). Therefore, the accessory 121 can be attached to the bottom surface *32b* of the rear seat bottom 32 (or the upper surface *51a* of the rear seat base 51), by aligning the attachment holes of the plate member 123 of the accessory 121 with the pair of attachment holes 115 in the bottom surface *32b* of the rear seat bottom 32 (or the pair of attachment holes 115 provided in the upper surface *51a* of the rear seat base 51) and then inserting fixtures 127 formed of, for example, elastic members, into the attachment holes.

By using such accessories 121, even a tall luggage can be reliably held on the loading surface SF1.

The accessory 131 illustrated in FIG. 20 is a box with an upper opening and including a plurality of partitions inside thereof. The box-shaped accessory 131 also includes attachment holes (not illustrated) on its bottom surface at positions corresponding to the four attachment holes 115 provided on the loading surface SF1. With this, similar to the accessories 121 illustrated in FIG. 19, the accessory 131 illustrated in FIG. 20 can be fixed to the loading surface SF1 using the fixtures 127.

As described above, in the modification of the loading surface SF1 illustrated in FIG. 18, the loading surface SF1 includes the one or more attachment holes 115. Thus, accessories (for example, the accessories 121 illustrated in FIG. 19, the accessory 131 illustrated in FIG. 20, or the like) can be attached to the loading surface SF1. As a result, a load (for example, a round load, a tall load) that is difficult to prevent from falling off only with the flanges 63, 65, 67 around the loading surface SF1 can be placed.

[Modification of Support Structure for Rear Seat Bottom]

Next, a modification of the support structure for supporting the rear seat bottom is described with reference to FIGS.

Figure 21:
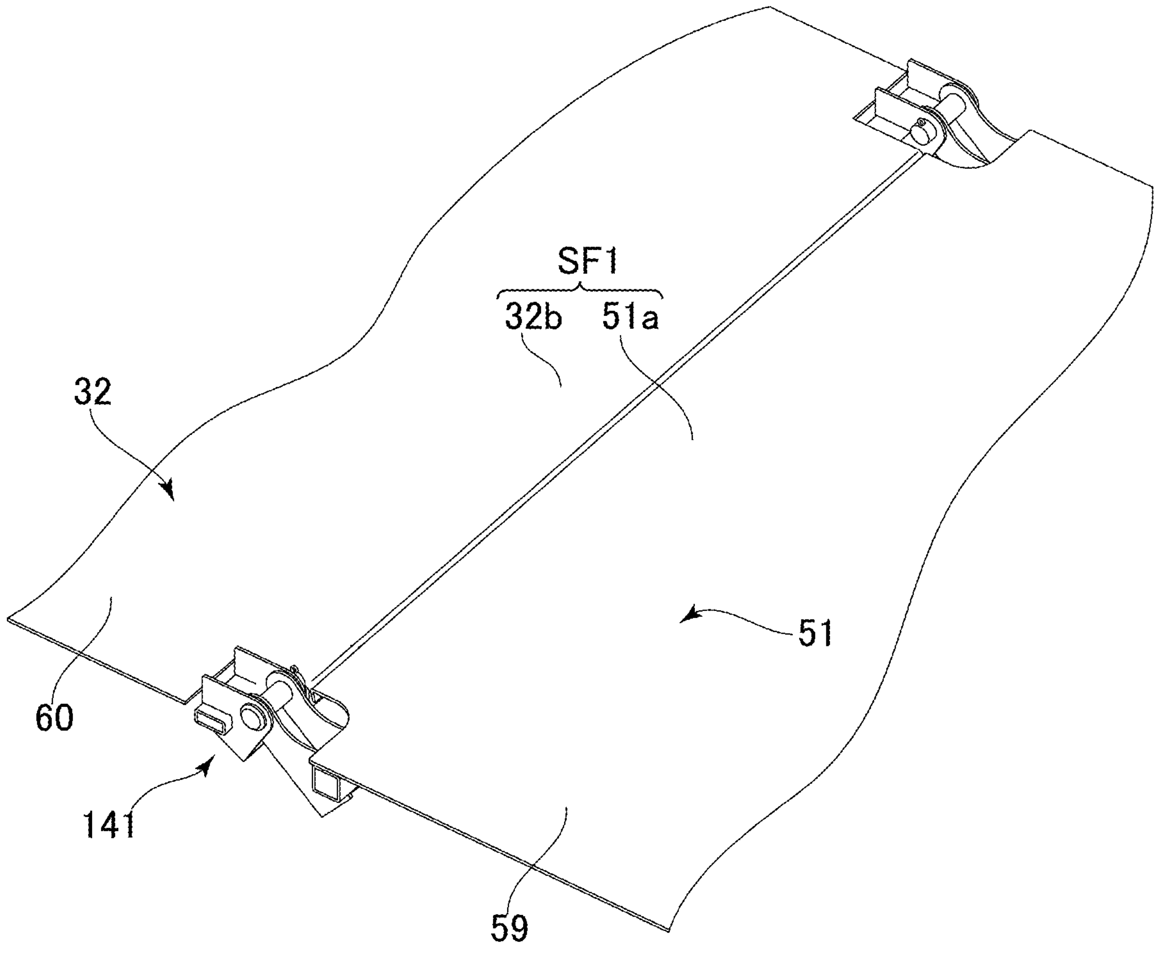
FIG. 21 is a diagram illustrating a modification of the support structure for the rear seat bottom.

21 to 23. FIG. 21 is a diagram illustrating a modification of the support structure for supporting the rear seat bottom, FIG. 22 is an enlarged perspective view of part of FIG. 21, and FIG. 23 is an enlarged side view of part of FIG. 21.

In first and second embodiments described above, a case has been described in which the hinge 69 is provided over substantially the entire width of the front end of the upper surface 51*a* of the rear seat base 51 (see FIG. 7), and the rear seat bottom 32 is rotatably attached to the rear seat base 51 via the hinge 69. However, the disclosure is not limited thereto. For example, as in the modification of FIGS. 21 to 23, rotation support parts 141 may be provided at both left and right ends of the front end portion of the upper surface 51*a* of the rear seat base 51 and the rear seat bottom 32 may be rotatably attached to the rear seat base 51 via the rotation support parts 141.

Figure 22:
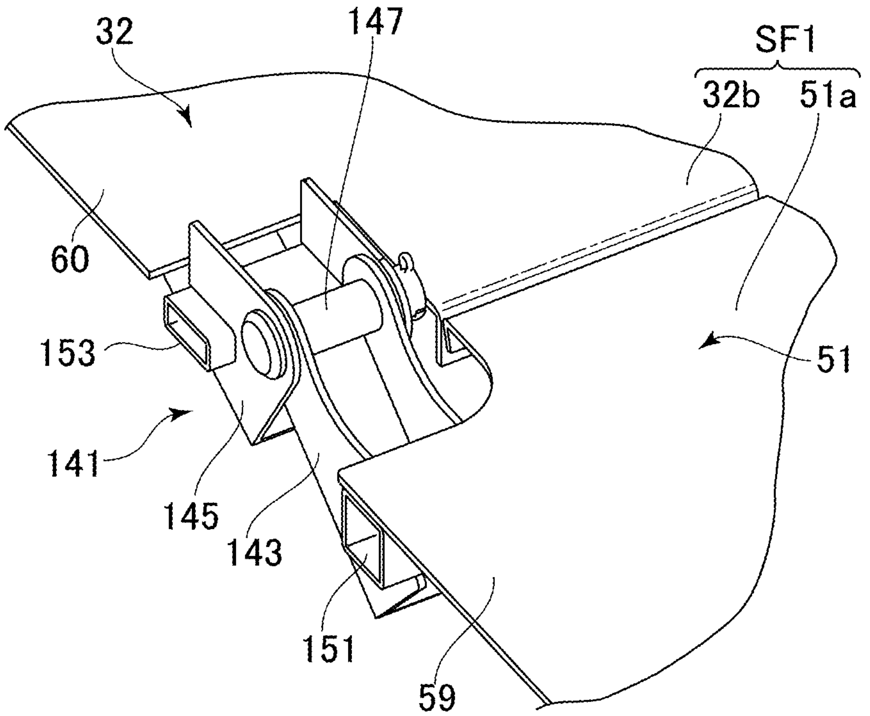
FIG. 22 is an enlarged perspective view of a portion of FIG. 21.
Figure 23:
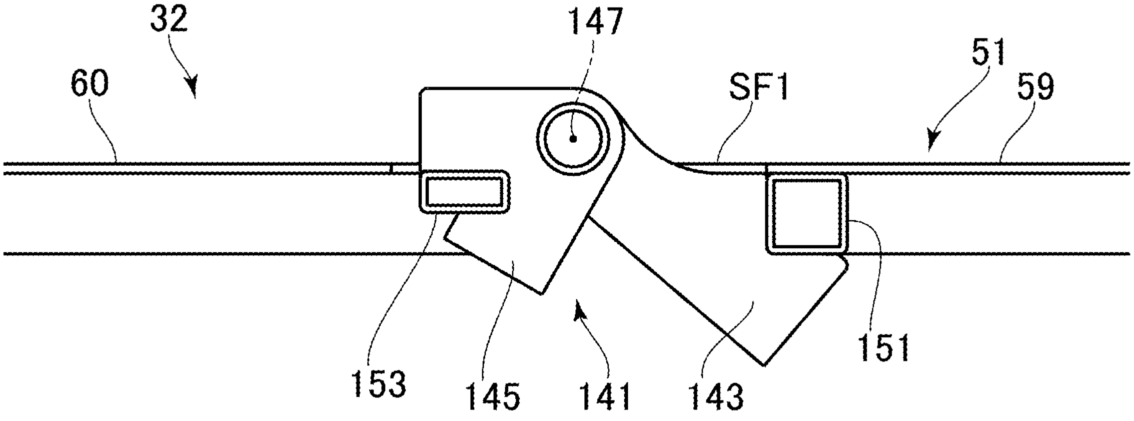
FIG. 23 is an enlarged side view of a portion of FIG. 21.

As illustrated in FIGS. 22 and 23, each rotation support part 141 includes: a bracket 143 attached to the panel member 59 forming the upper surface 51*a* of the rear seat base 51; a bracket 145 attached to the panel member 60 forming the bottom surface 32*b* of the rear seat bottom 32; and a rotation shaft 147 connecting these brackets 143 and 145.

More specifically, a reinforcement member 151 having a closed cross-sectional structure extending in the vehicle width direction is attached to the panel member 59 forming the upper surface 51*a* of the rear seat base 51 at the vicinity of the front end of the panel member 59. The brackets 143 are attached to both end portions of the reinforcement member 151 in the vehicle width direction. Also, a reinforcement member 153 having a closed cross-sectional structure extending in the vehicle width direction is attached to the panel member 60 forming the bottom surface 32*b* of the rear seat bottom 32 at the vicinity of the front end portion of the panel member 60. The brackets 145 are attached to both end portions of the reinforcement member 153 in the vehicle width direction.

The brackets 143 and 145 are provided with through-holes respectively, and the rotation shaft 147 is inserted into the through-holes so that the bracket 145 can rotate relative to the bracket 143 about the rotation shaft 147. That is, the rear seat bottom 32 is rotatable with respect to the rear seat base 51 about the rotation shaft 147.

Further, as illustrated in FIG. 23, the center of the rotation shaft 147 is not aligned with the loading surface SF1 and is provided above the loading surface SF1.

In the modification illustrated in FIGS. 21 to 23, since the substantially entire width of the front end of the upper surface 51*a* of the rear seat base 51 is not provided with unevenness due to the hinge 69, the boundary between the upper surface 51*a* of the rear seat base 51 and the bottom surface 32*b* of the seat bottom 32 becomes a smooth boundary.

[Modifications of Armrest]

Figure 24:
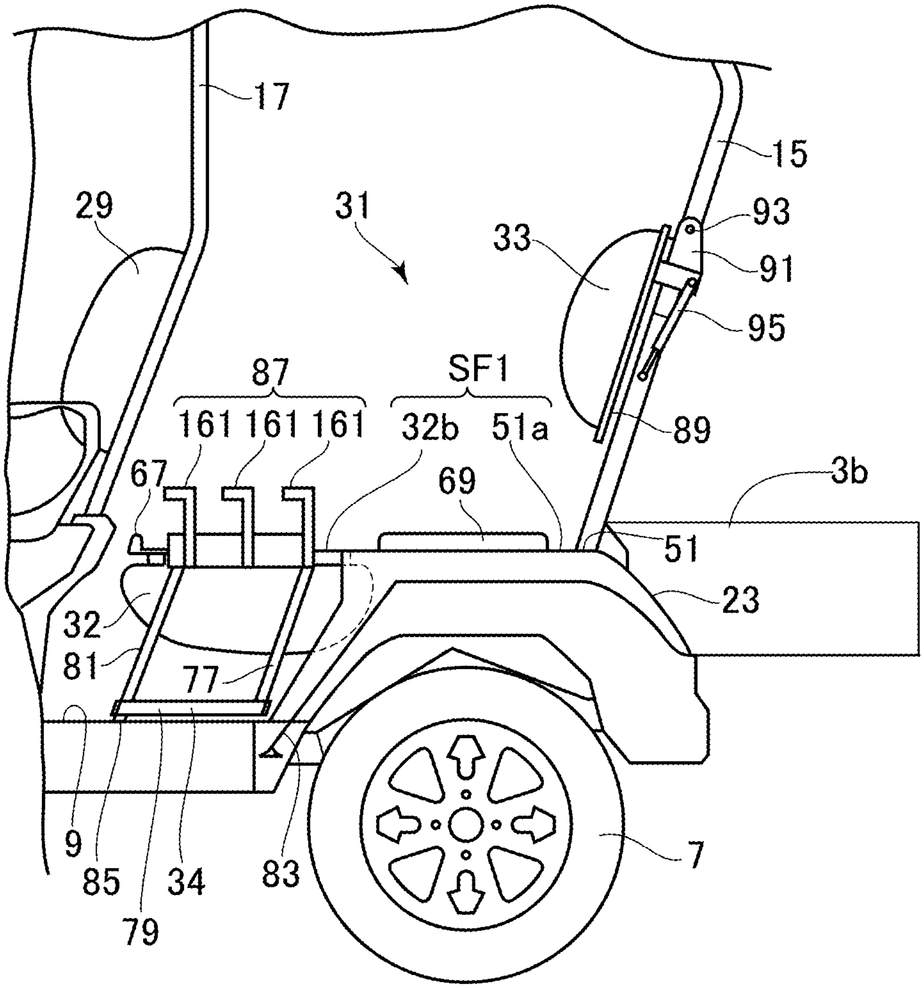
FIG. 24 is a diagram illustrating a first modification of an armrest fixed to the rear seat bottom according to a second embodiment.
Figure 25:
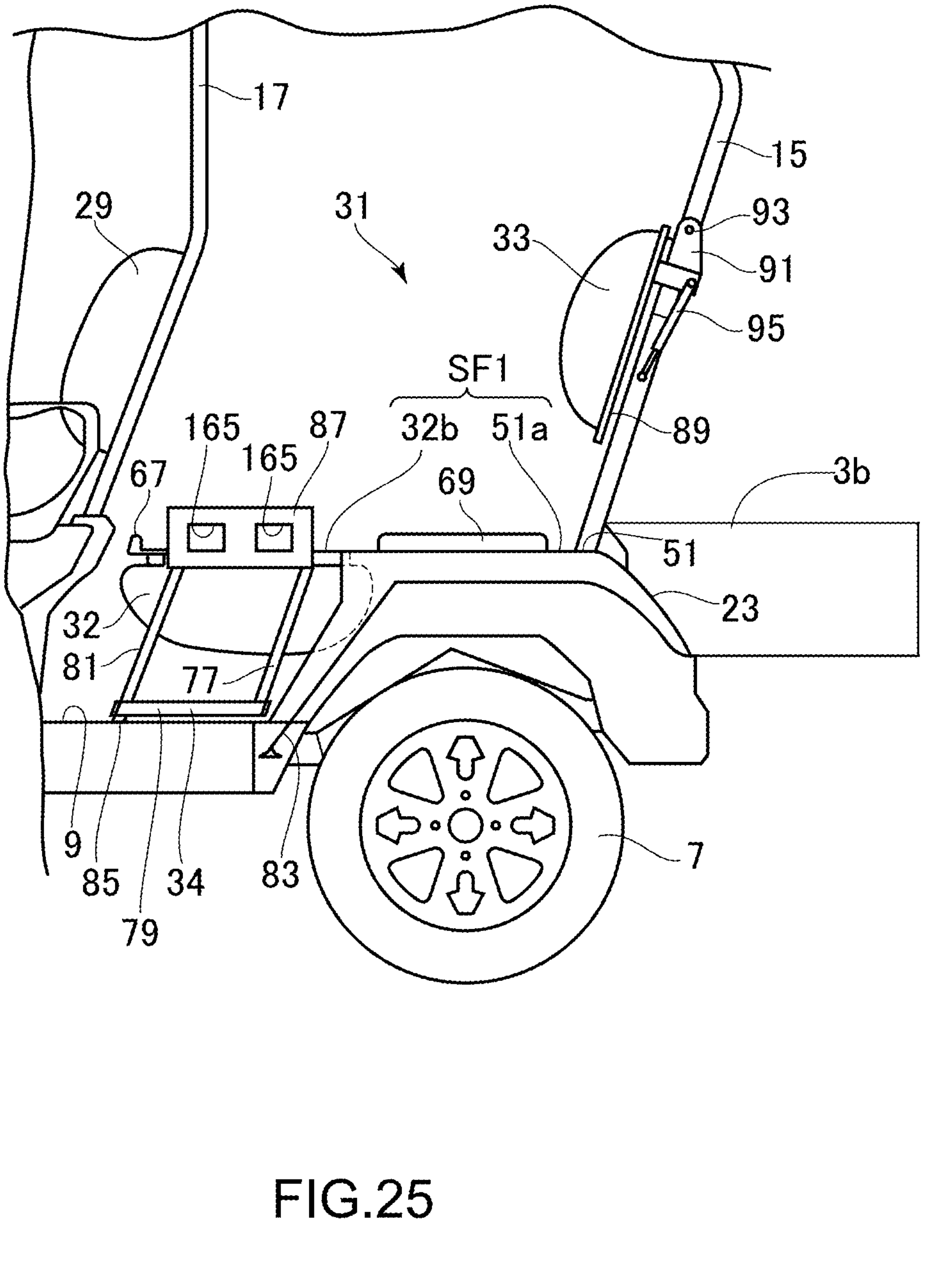
FIG. 25 is a diagram illustrating a second modification of an armrest fixed to the rear seat bottom according to a second embodiment.

Next, modifications of the armrest 34 according to a second embodiment are described below with reference to FIGS. 24 to 25. FIG. 24 is a diagram illustrating a first modification of the armrest 34 fixed to the rear seat bottom 32. FIG. 25 is a diagram illustrating a second modification of the armrest 34 fixed to the rear seat bottom 32.

In the armrest 34 according to a first modification illustrated in FIG. 24, a flange portion 87 protruding from the armrest base is provided with a plurality of hook portions 161, and the hook portions 161 can be used to hook a luggage or a string for tying the luggage. In the armrest 34 according to a second modification illustrated in FIG. 25, a plurality of holes 165 are provided in the flange portion 87 projecting from the armrest base, and these holes 165 can be used to hook a luggage or a string for tying the luggage to the flange portion 87.

As described above, in the first modification illustrated in FIG. 24 and the second modification illustrated in FIG. 25, the flange portion 87 of the armrest 34 can be used to hook luggage or a string for tying the luggage, which further increases convenience.

Other Modifications

Note that in first and second embodiments described above, a case has been described in which the intermediate pillar 17 functions as a front seat back support member that supports the front seat back 29. However, the disclosure is not limited thereto. For example, the vehicle body 3 may include a seat back support member without including the intermediate pillar 17, or may separately include a front seat back support member in addition to the intermediate pillar 17.

Further, in first and second embodiments described above, a case has been described in which the rear pillars 15 function as rear seat back support members that support the rear seat back 33. However, the disclosure is not limited thereto. For example, the vehicle body 3 may be provided with a rear seat back support member(s) without including the rear pillars 15 or may separately include a rear seat back support member(s) in addition to the rear pillars 15.

Further, in first and second embodiments described above, a case has been described in which the rear seat bottom 32 is rotatably supported by the rear seat base 51. However, the disclosure is not limited thereto. For example, the rear seat bottom 32 may be supported by a portion of the vehicle body other than the rear seat base 51 in such a manner that the rear seat bottom 32 is movable from the normal use position to the developed position.

Further, in first and second embodiments, a case has been described in which the rear seat bottom 32 is rotatably supported with respect to the vehicle body 3 via the hinge 69 and the like. However, the disclosure is not limited thereto. For example, the rear seat bottom 32 may be supported on the vehicle body using a rotary arm(s), a plurality of links, or other structures in such a manner that the rear seat bottom 32 is movable from the normal use position to the developed position. In addition, various variation or modifications can be made to first and second embodiments and modifications described above.

Third Embodiment

Figure 26:
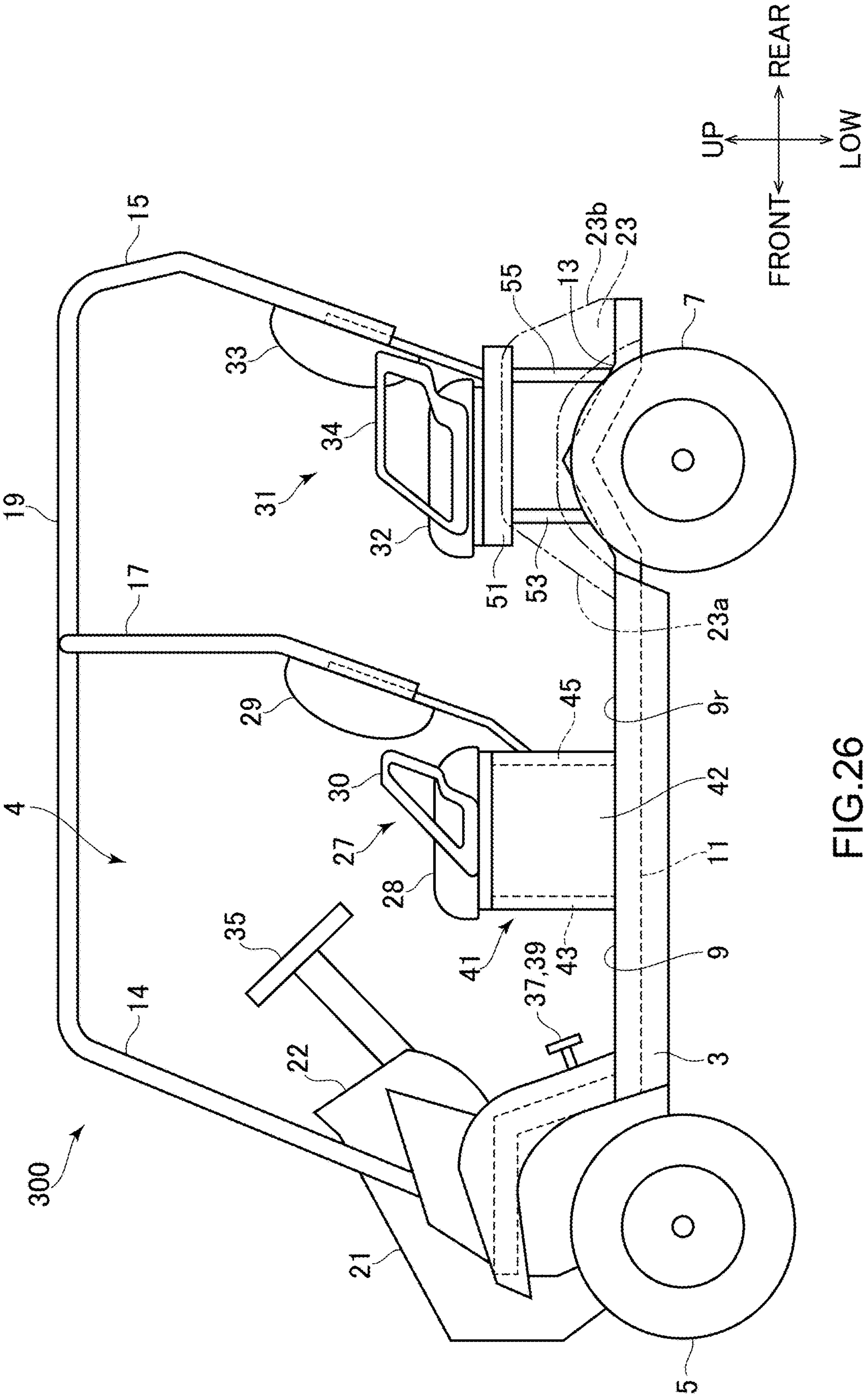
FIG. 26 is a side view of an electric cart according to a third embodiment.
Figure 27:
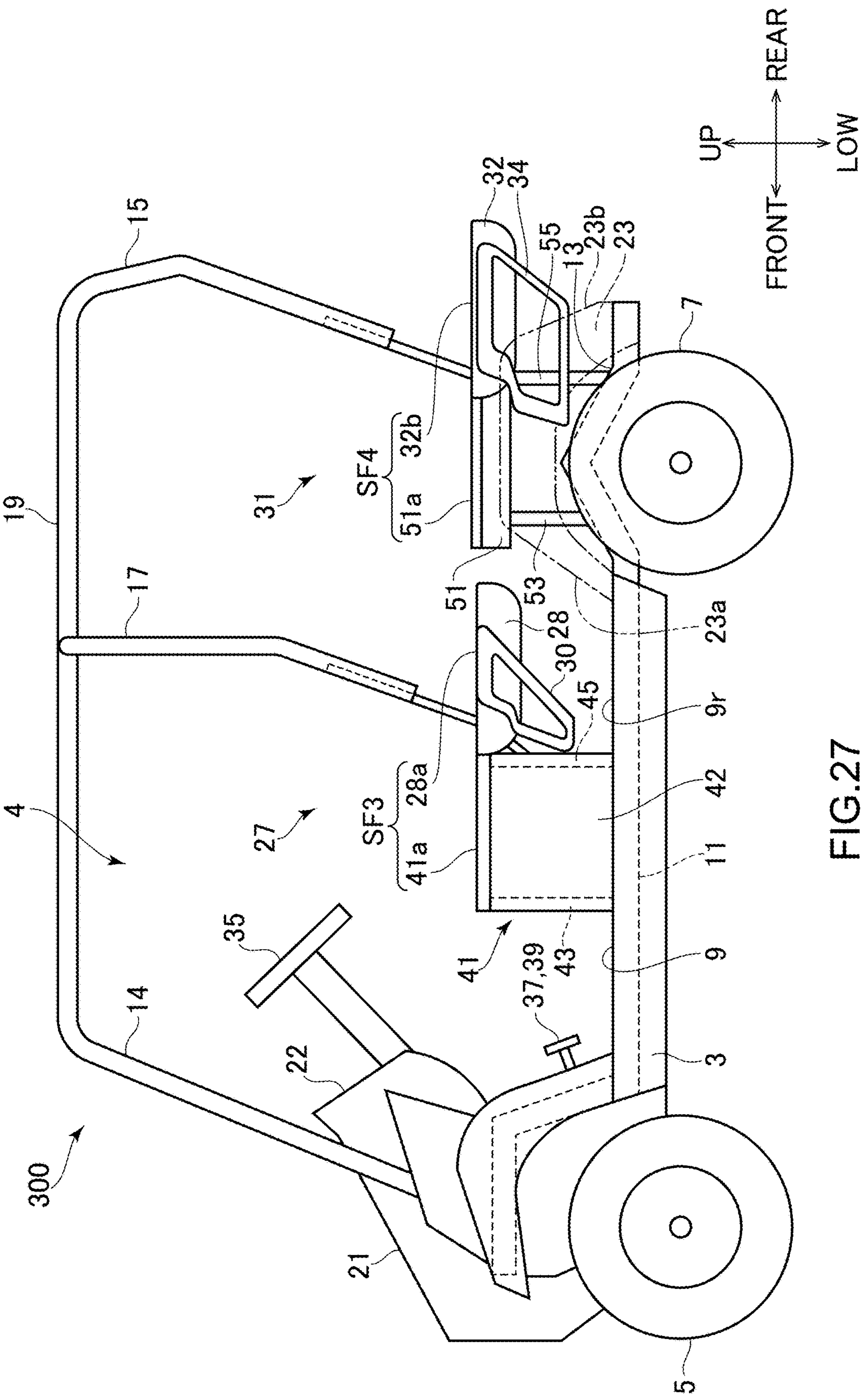
FIG. 27 is a side view of the electric cart according to a third embodiment, illustrating a state where loading sections are formed by removing a front seat back and a rear seat back and developing (turning over) a front seat bottom and a rear seat bottom to the rear side thereof.

Next, a third embodiment of the disclosure is described with reference to FIGS. 26 and 27. FIG. 26 is a schematic side view of an electric cart 300 according to a third embodiment. FIG. 27 is a schematic side view of the electric cart 300 according to a third embodiment, illustrating a state where loading sections (loading surfaces SF3, SF4) is formed by detaching the front seat back 29 and the rear seat back 33 and developing the front seat bottom 28 and the rear seat bottom 32 to the rear side thereof.

In the electric cart 300 according to a third embodiment, a front seat back support bar 301 that supports the front seat back 29 is detachably attached to the front seat base 41. Further, the rear seat back 33 is detachably attached to the rear pillars 15 via, for example, a structure such as being illustrated in FIG. 17. Note that the electric cart 300 according to a third embodiment includes no cargo bed (3*b*) in the back of the vehicle body 3.

In addition, the front seat bottom 28 can be developed (turned over) to the rear side thereof in a state where the front seat back 29 is removed from the front seat base 41. Specifically, the front seat bottom 28 is attached to the front seat base 41 via, for example, a hinge, a rotary arm, or the like.

In addition, the rear seat back 33 can be developed (turned over) to the rear side thereof in a state where the rear seat back 33 is removed from the rear pillars 15. Specifically, the rear seat back 33 is attached to the rear seat base 51 or the rear pillars 15 with a support structure such as a hinge, a rotary arm, or the like. Note that the support structure can use a structure disclosed in embodiments and modifications described above or a well-known structure, so detailed description and illustration may be omitted to avoid redundancy.

With such a configuration, the electric cart 300 according to a third embodiment can form, by developing the front seat bottom 28 to the rear side thereof as illustrated in FIG. 27, the loading section (loading surface SF3) composed of the bottom surface 28*b* of the front seat bottom 28 and the upper surface 41*a* of the front seat base 41. Further, the electric cart 300 according to a third embodiment can form, by developing the rear seat bottom 32 to the rear side, the loading portion (loading surface SF4) composed of the bottom surface 32*b* of the rear seat bottom 32 and the upper surface 51*a* of the rear seat base 51.

Fourth Embodiment

Figure 28:
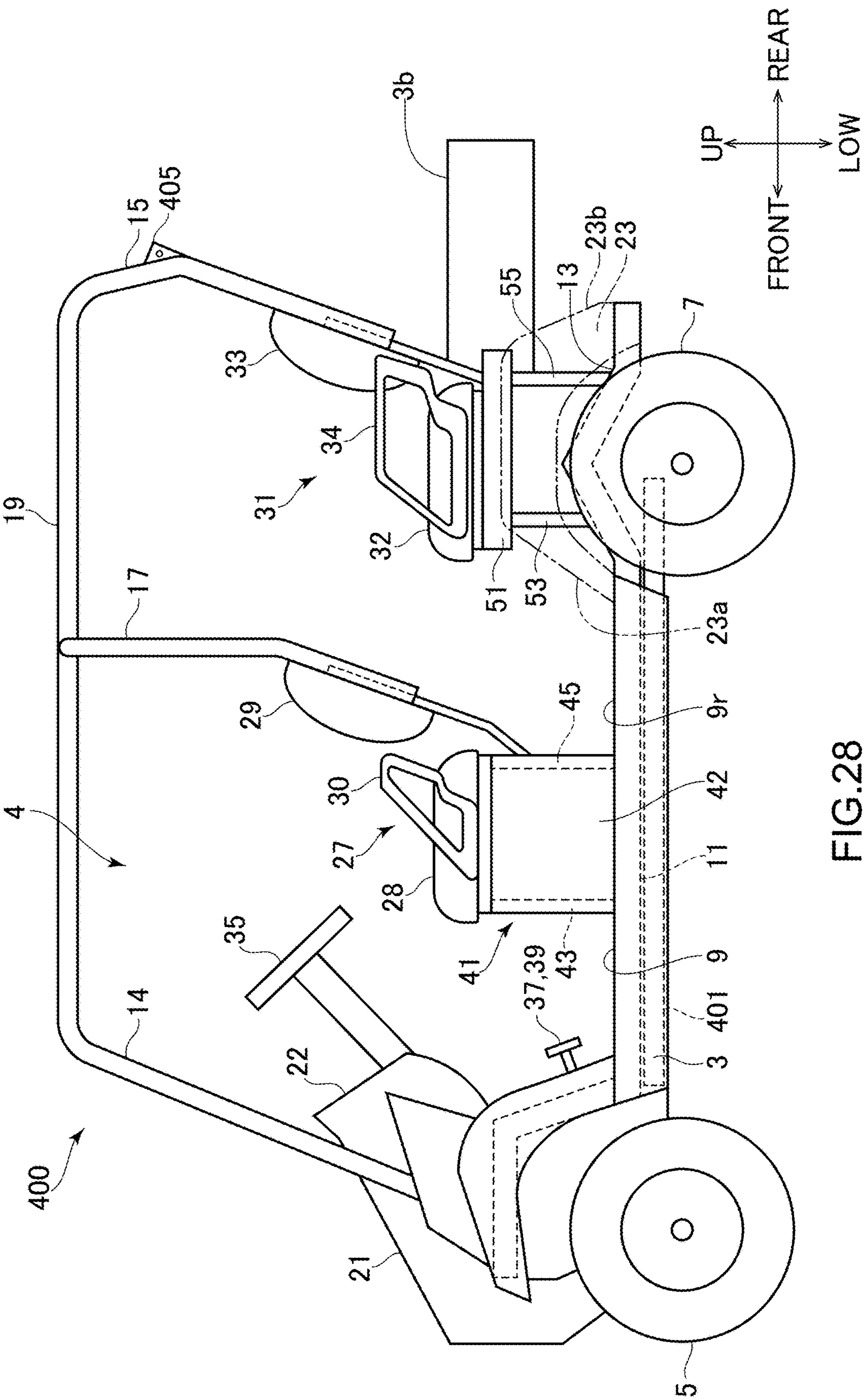
FIG. 28 is a side view of an electric cart according to a fourth embodiment, illustrating a state in which a loading board is accommodated below a vehicle body.
Figure 29:
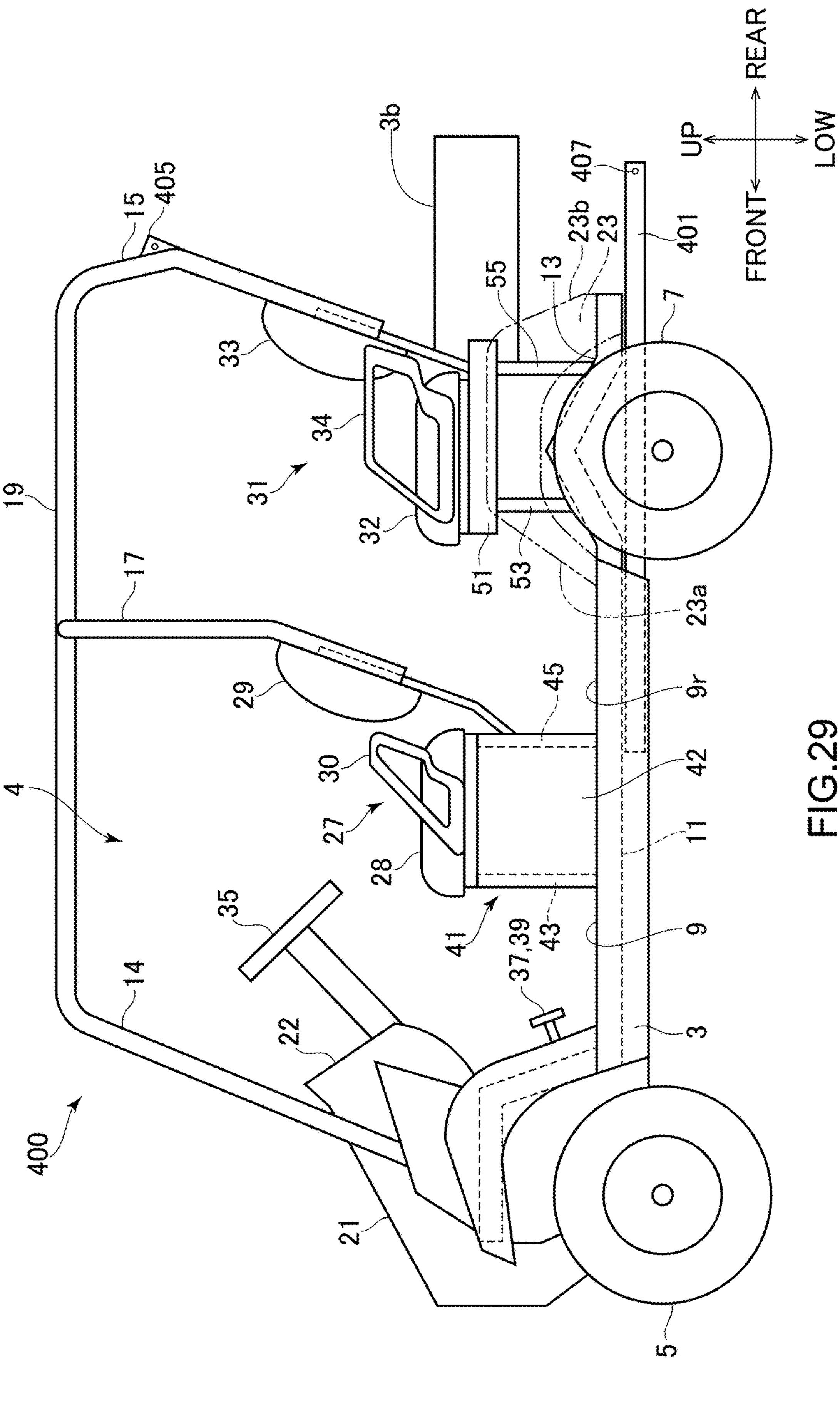
FIG. 29 is a side view of the electric cart according to a fourth embodiment, illustrating a state in which the loading board is protruded to a first protruding position.
Figure 30:
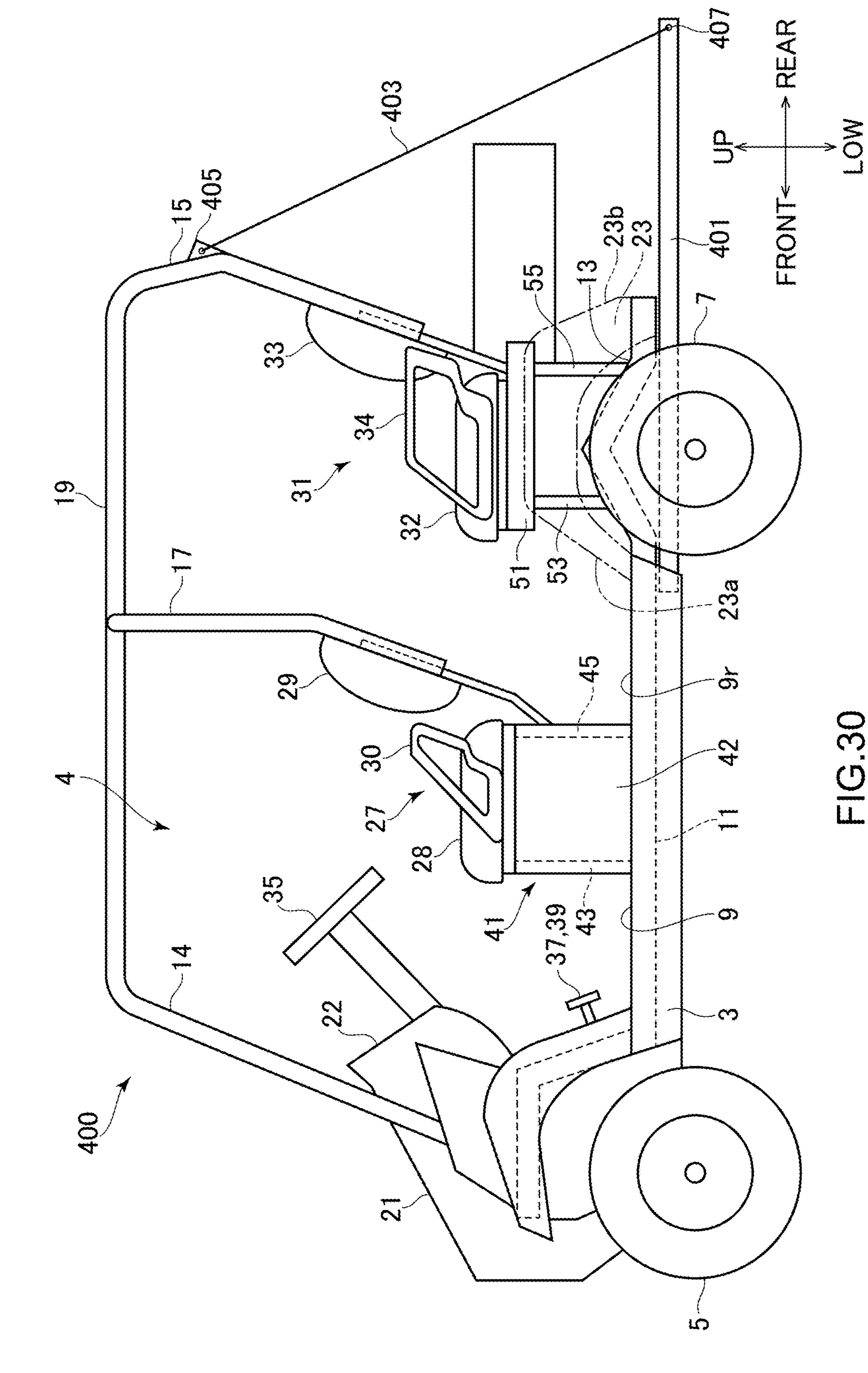
FIG. 30 is a side view of the electric cart according to a fourth embodiment, illustrating a state in which the loading board is protruded to a second protruding position.

Next, a fourth embodiment of the disclosure is described with reference to FIGS. 28 to 30. FIG. 28 is a side view of an electric cart 400 according to a fourth embodiment. FIG. 29 is a side view of the electric cart 400 according to a fourth embodiment, illustrating a state in which a loading board 401 is protruded to a first protruding position. FIG. 30 is a side view of the electric cart 400 according to a fourth embodiment, illustrating a state in which the loading board 401 is protruded to a second protruding position.

As illustrated in FIG. 28, the electric cart 400 according to a fourth embodiment differs from first and second embodiments described above in that the loading board 401 is provided below the vehicle body 3, that is, below the floor 9. The loading board 401 is supported by the main frame 11 (not illustrated in FIGS. 28 to 30) provided under the vehicle body 3 so as to be slidable in the longitudinal direction or the travel direction via slide guide portions (not illustrated).

As illustrated in FIG. 28, an entirety or a substantially entirety of the loading board 401 is normally hidden under the vehicle body 3. That is, normally, the entirety or the substantially entirety of the loading board 401 overlaps the vehicle body 3 when viewed in the vertical direction.

When the user wants to use the loading board 401 by protruding the loading board 401 to the rear of the vehicle, the user operates, for example, an operation device such as a switch or the like provided on the dashboard 22 to drive a motor (not illustrated) to move the loading board 401 so as to protrude the loading board 401 to the first protruding position of FIG. 29 or the second protruding position of FIG. 30.

For example, since the loading board 401 at the second protruding position illustrated in FIG. 30 protrudes more than at the first protruding position, the rear end portion of the loading board 401 can be hung by wires 403 hooked on the rear pillars 15, for example. That is, in the electric cart 400 according to a fourth embodiment, the middle portions or the upper end portions of the left and right rear pillars 15 are provided with engagement portions (for example, engagement holes 405) for hooking one end portions of the wires 403. Also, the left and right ends of the rear end portion of the loading board 401 are provided with engagement portions (for example, the engagement holes 407) for hooking lower end portions of the wires 403.

Effects of Fourth Embodiment

According to such a fourth embodiment, the loading board 401 is slidably provided under the floor 9 of the vehicle body 3. Therefore, if necessary, the loading board 401 can be protruded from below the floor 9 toward the rear of the vehicle body and the protruded loading board 401 can be used.

Further, according to a fourth embodiment, the amount of protrusion of the loading board 401 can be adjusted in multiple stages. Accordingly, the amount of protrusion of the loading board 401 can be adjusted appropriately according to the amount of luggage to be placed.

Further, according to a fourth embodiment, the loading board 401 includes at the rear end portion thereof the engagement portions (e.g., the engagement holes 407) for hooking wires 403, springs, rods, or the like. Therefore, even when the loading board 401 protrudes by a large amount, the loading board 401 can be properly supported by the vehicle body 3 without being cantilevered.

Modifications of Fourth Embodiment

Figure 31:
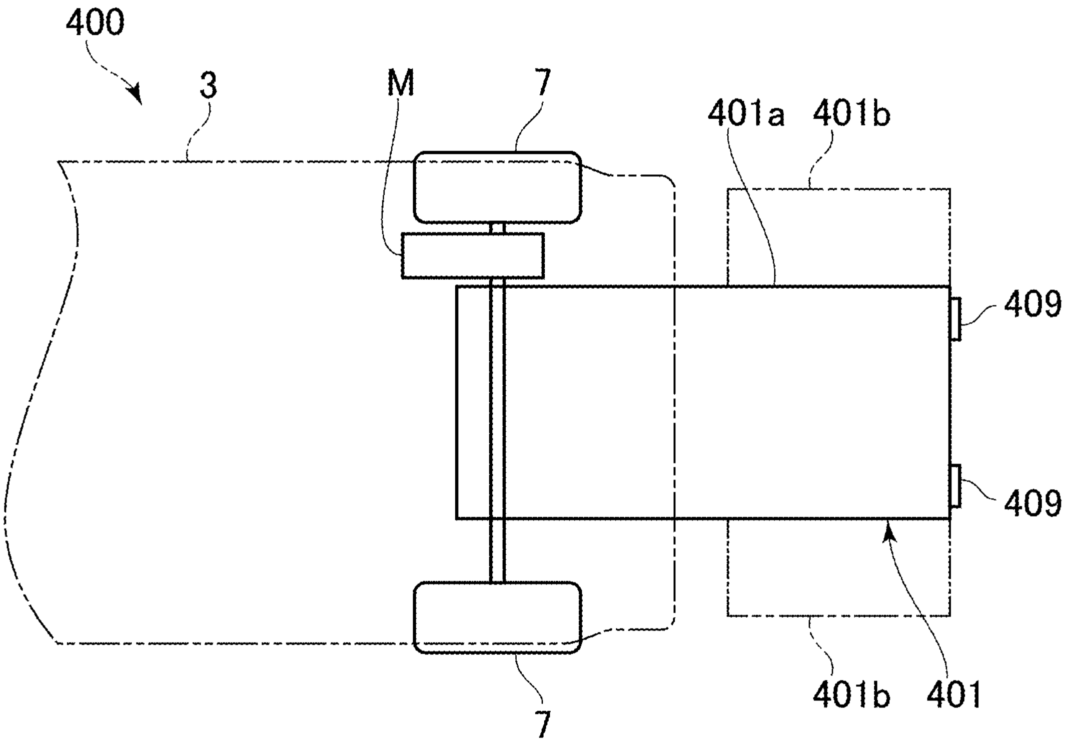
FIG. 31 is a schematic diagram of an electric cart according to a modification of a fourth embodiment, illustrating a positional relationship between a loading board, wheels, and an electric motor.
Figure 32:
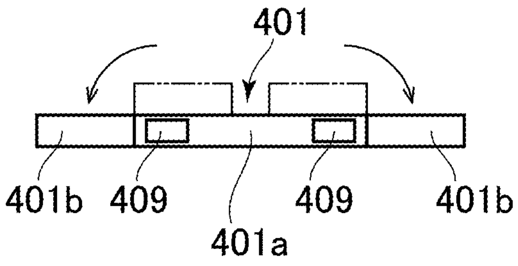
FIG. 32 is a schematic rear view of the loading board of the electric cart according to the modification of a fourth embodiment.

Next, a modification according to a fourth embodiment is described with reference to FIGS. 31 and 32. FIG. 31 is a schematic diagram illustrating a positional relationship between the loading board 401, the rear wheels 7, and the electric motor M of the electric cart 400 according to a modification of a fourth embodiment. FIG. 32 is a schematic diagram illustrating the loading board 401 of the electric cart 400 according to the modification of a fourth embodiment.

In this modification, as illustrated in FIG. 31, the electric motor M for driving the electric cart 400 is arranged at a position off the center in the vehicle width direction. More specifically, the electric motor M is provided at a position close to one of the left and right rear wheels (the right rear wheel in this example), so that the electric motor M and the loading board 401 are not overlapped with each other as seen in the vertical direction. With this, it is possible to dispose the electric motor M and the loading board 401 at positions overlapping each other as seen in the horizontal direction. Therefore, the structure below the floor 9 can be made more compact in the vertical direction than in the case where the electric motor M and the loading board 401 overlap each other as seen in the vertical direction.

Further, as illustrated in FIG. 31, the loading board 401 includes a loading board main body 401*a* and expansion board parts 401*b* each of which is rotatably attached to a rear end portion of the loading board main body 401*a* via a support portion such as a hinge or the like. With this, in the state where the loading board 401 protrudes to the rear side of the vehicle body 3, the expansion board parts 401*b* can be developed from the loading board main body 401*a*, so as to expand the area of the loading board 401.

Further, as illustrated in FIG. 32, the loading board 401 is provided with tail lamps 409 of the electric cart 400 on a rear end surface of the loading board main body 401*a*. Note that although the tail lamps 409 are provided on the loading board main body 401*a* in FIG. 32, the tail lamp(s) 409 may be provided on the expansion board part(s) 401*b*.

Fifth Embodiment

Figure 33:
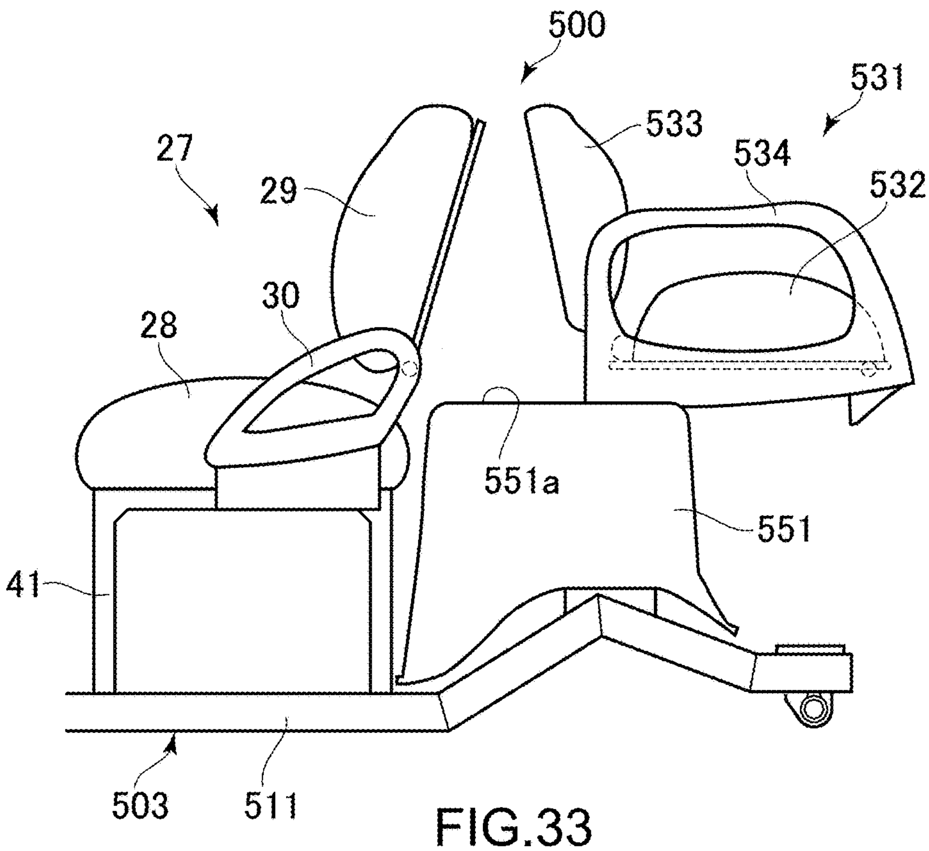
FIG. 33 is a schematic side view illustrating a front seat and a rear seat of an electric cart according to a fifth embodiment.
Figure 34:
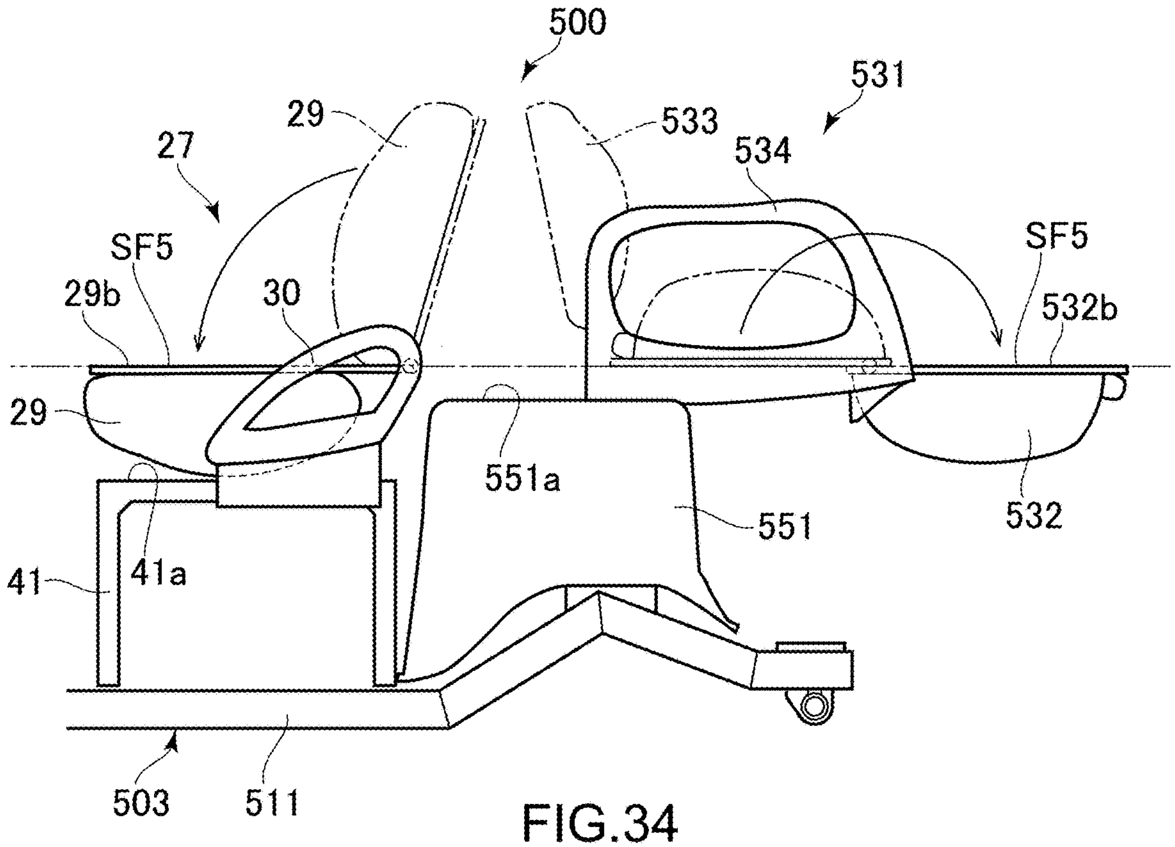
FIG. 34 is a schematic side view illustrating the front and rear seats of the electric cart according to a fifth embodiment, illustrating a state in which a loading section is formed by removing a front seat bottom, folding a front seat back, removing a rear seat back, and developing a rear seat bottom.

Next, an electric cart 500 according to a fifth embodiment of the disclosure is described with reference to FIGS. 33 and 34. FIG. 33 is a schematic side view illustrating the vicinity of front and rear seats of the electric cart 500 according to a fifth embodiment. FIG. 34 is a schematic side view illustrating the front and rear seats of the electric cart 500 according to a fifth embodiment, illustrating a state in which a loading surface SF5 is formed by removing a front seat bottom 28, folding a front seat back 29 of a front seat 27, removing a rear seat back 533, and developing a rear seat bottom 532 of a rear seat 531. Note that FIGS. 33 and 34 illustrate the front seat 27, the front seat base 41, the rear seat 531, a rear seat base 551, and a main frame 511 of the electric cart 500, other configurations may be omitted from illustration and description to avoid redundancy.

In first to fourth embodiments described above, the rear seat 31 is provided behind the front seat 27 across the rear seat passenger passage 9*r* and faces forward of the vehicle. However, in a fifth embodiment, the rear seat 531 is provided behind the front seat 27 with no rear seat passenger passage therebetween and faces the rear direction of the vehicle. Further, in a fifth embodiment, a vehicle body 503 and the main frame 511 are shorter in the longitudinal direction or the travel direction than the vehicle bodies 3 and the main frames 11 of first to fourth embodiments described above.

Further, in a fifth embodiment, the front seat bottom 28 is detachably attached to the front seat base 41. In addition, the front seat back 29 is attached to the vehicle body 503 (for example, the front seat base 41, the intermediate pillars (not illustrated), or the like) via a rotation support structure such as a hinge, a rotary arm, or the like, so as to be folded forward. (See FIG. 34).

Therefore, as illustrated in FIG. 34, the front seat back 29 can be folded forward with the front seat bottom 28 removed from the front seat base 41. As illustrated in FIG. 34, in the state where the front seat back 29 is folded forward, a back surface 29*b* of the front seat back 29 is substantially horizontal and faces upward.

Further, in a fifth embodiment, the rear seat back 533 is detachably attached to the vehicle body 503 (for example, the rear seat base 551, intermediate pillars (not illustrated), or the like). Also, the rear seat bottom 532 is attached to the vehicle body 503 (for example, the rear seat base 551, the intermediate pillars (not illustrated), or the like) via a rotation support structure such as a hinge, a rotary arm, or the like so as to be developed (turned over) to the rear side thereof.

Therefore, as illustrated in FIG. 34, with the rear seat back 533 removed from the vehicle body 503, the rear seat bottom 532 can be developed (turned over) to the rear side. As illustrated in FIG. 34, in the state where the rear seat bottom 532 is developed (turned over) to the rear side, a bottom surface 532*b* of the rear seat bottom 532 is substantially horizontal and faces upward and is substantially flush with (at the same height as) the back surface 29*b* of the front seat back 29 that is folded to the front side. As a result, the back surface 29*b* of the front seat back 29 and the bottom surface 532*b* of the rear seat bottom 532, which are substantially flush with each other, form the discontinuous loading surface SF5.

As described above, in a fifth embodiment, similarly to first and second embodiments described above, the convenience of the vehicle can be improved by forming the loading surface SF5 as necessary.

Modifications of Fifth Embodiment

Figure 35:
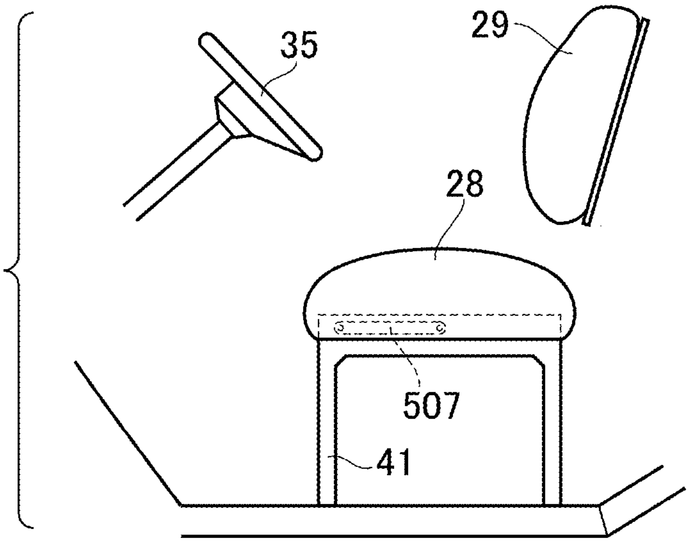
FIG. 35 is a schematic side view illustrating a support structure for supporting a front seat bottom according to a modification of a fifth embodiment.
Figure 36:
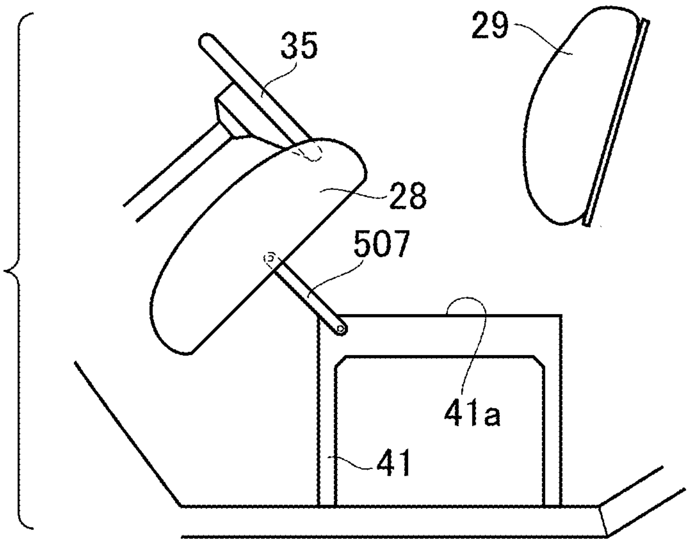
FIG. 36 is a schematic side view of the support structure for the front seat bottom according to the modification of a fifth embodiment.
Figure 37:
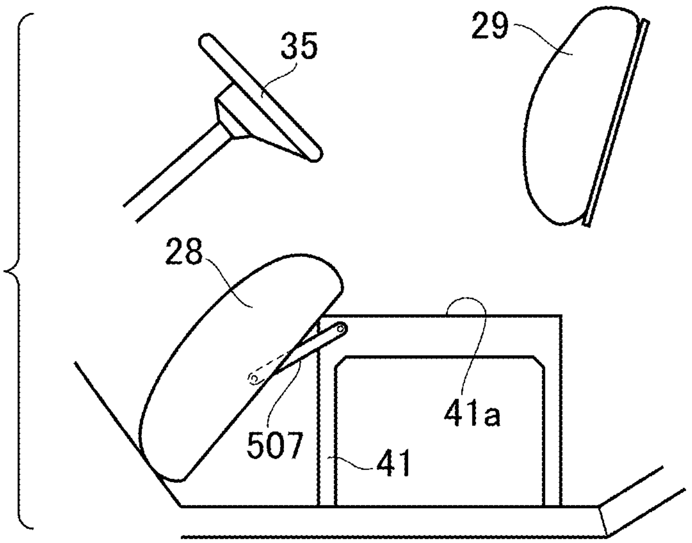
FIG. 37 is a schematic side view of the support structure for the front seat bottom according to the modification of a fifth embodiment.
Figure 38:
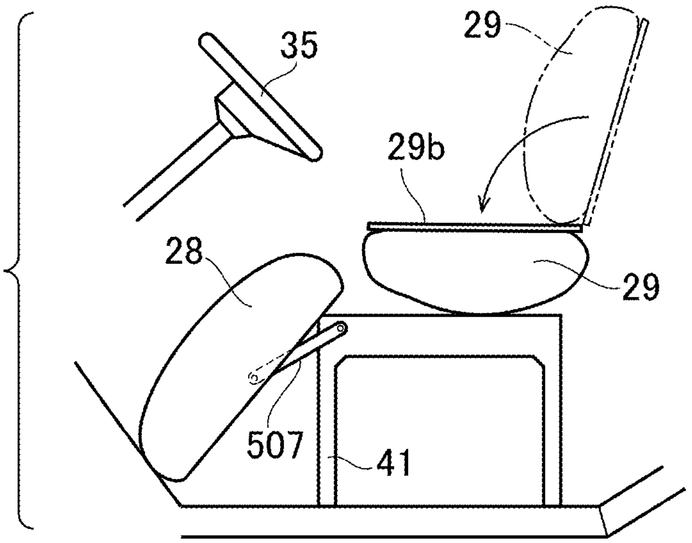
FIG. 38 is a schematic side view of the support structure for the front seat bottom according to the modification of a fifth embodiment.

Next, a modification of a fifth embodiment is described with reference to FIGS. 35 to 38. FIGS. 35 to 38 are schematic side views illustrating a support structure for the front seat bottom 28 according to a modification of a fifth embodiment, wherein FIG. 35 illustrates a normal use position of the front seat bottom, FIG. 38 illustrates a retracted position of the front seat bottom, and FIGS. 36 and 37 illustrate states in the middle of movement of the front seat bottom from the normal use position to the retracted position.

In a fifth embodiment described above, the front seat bottom 28 is configured to be detachable from the vehicle body 503, but in this modification, the front seat bottom 28 is configured to be removable from the upper surface 41*a* of the front seat base 41 so as to be retracted to the front side of the front seat base 41 while the front seat bottom 28 is supported by the front seat base 41 via the rotary arm 507.

According to this modification, even when the front seat bottom 28 is removed from the normal use position (FIG. 35), the front seat bottom 28 is kept to be held on the vehicle body 503 (in this example, the front seat base 41). Therefore, the loss of the front seat bottom 28 can be prevented.

Sixth Embodiment

Figure 39:
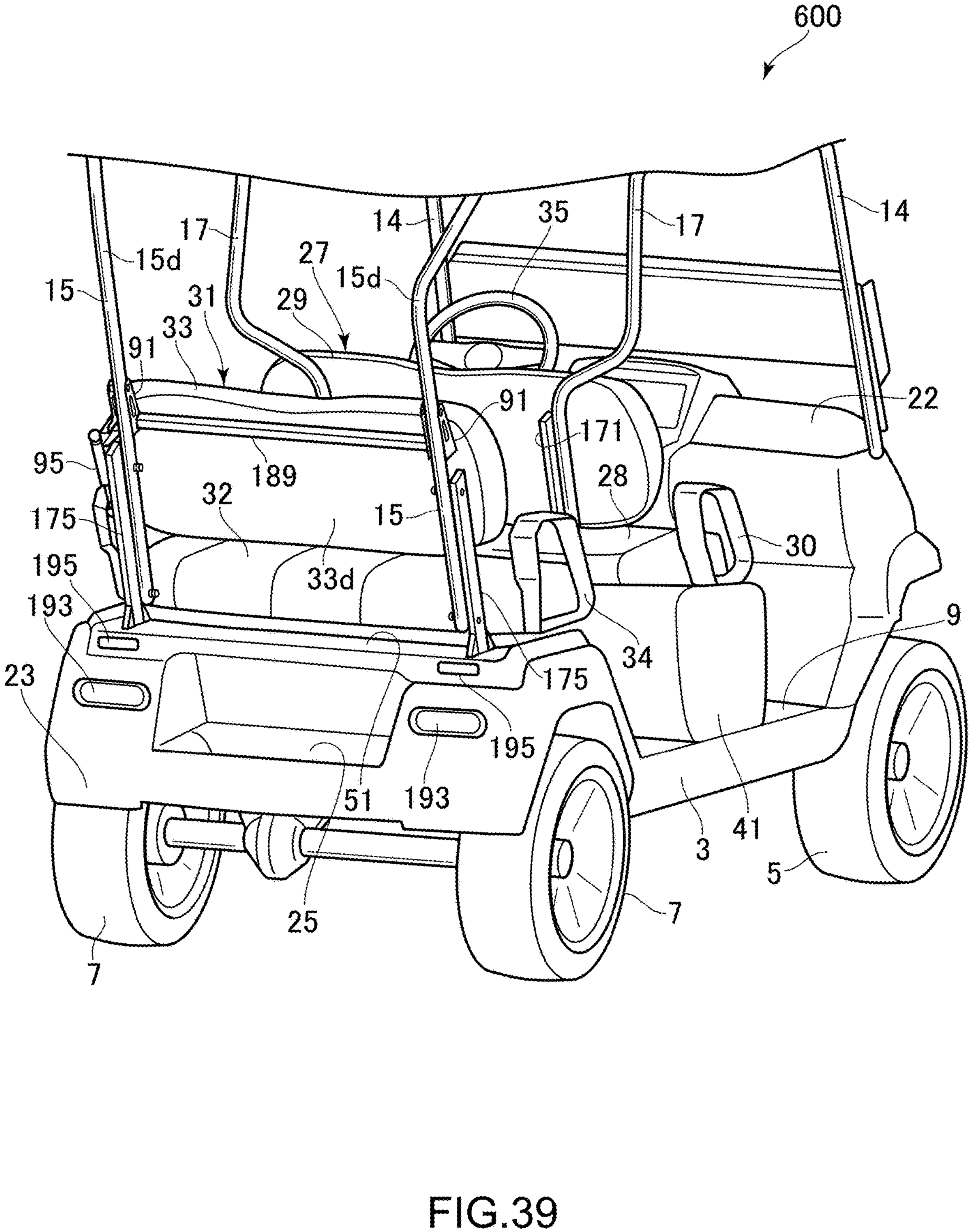
FIG. 39 is a schematic perspective view of an electric cart as a vehicle according to a sixth embodiment.
Figure 40:
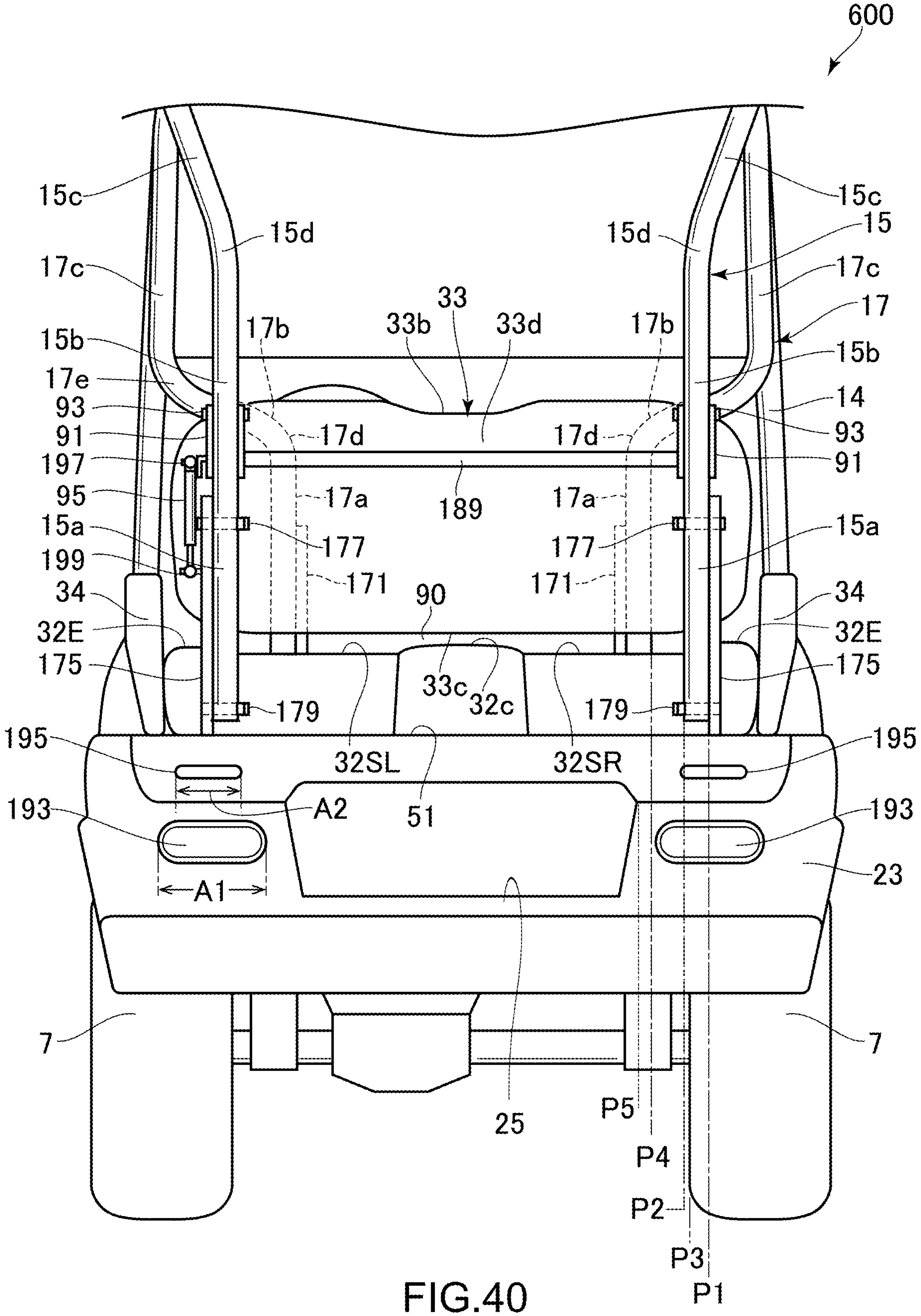
FIG. 40 is a schematic rear view of the electric cart according to a sixth embodiment.
Figure 41:
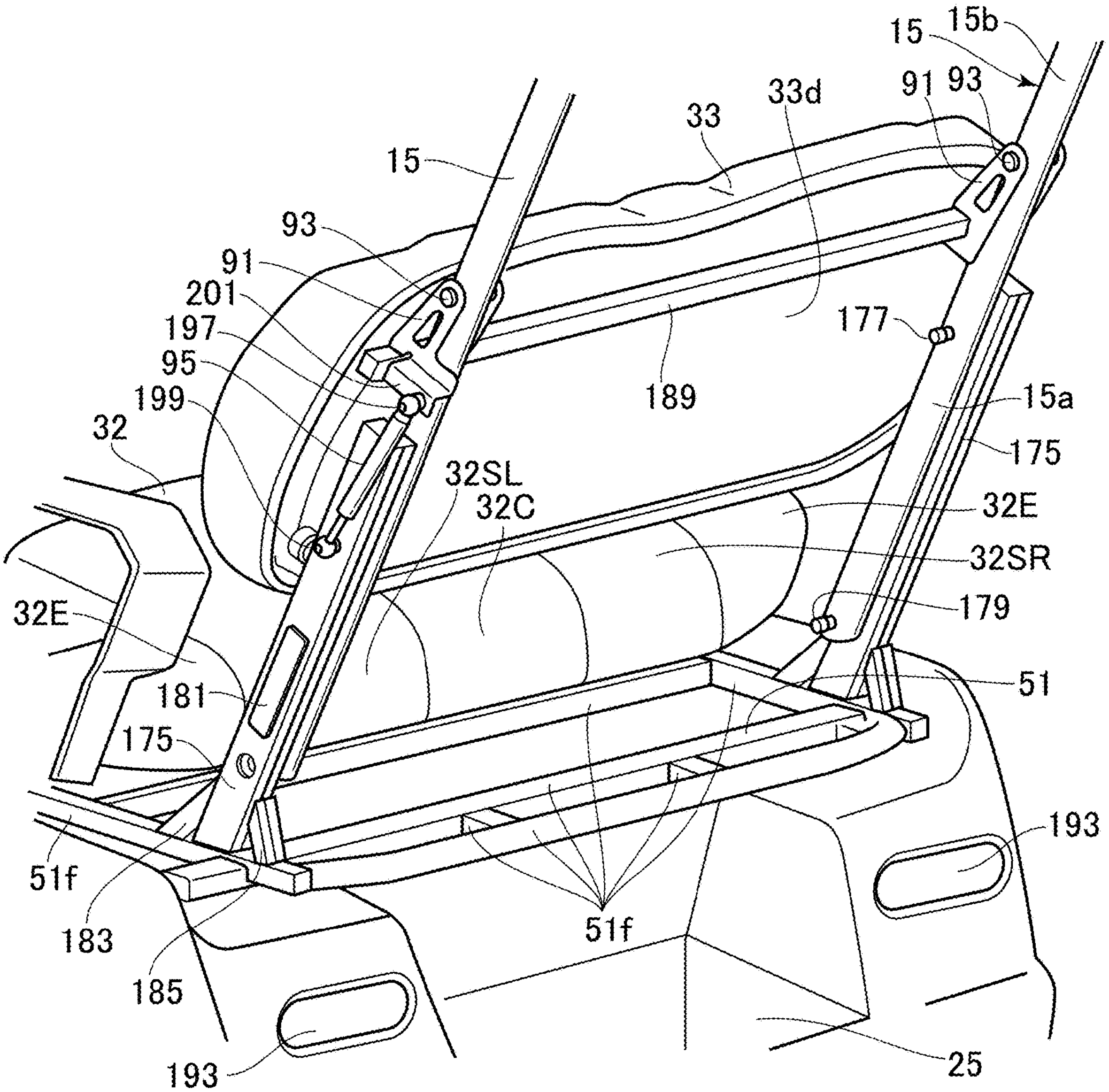
FIG. 41 is a schematic perspective view of the vicinity of a rear seat of the electric cart according to a sixth embodiment.
Figure 42:
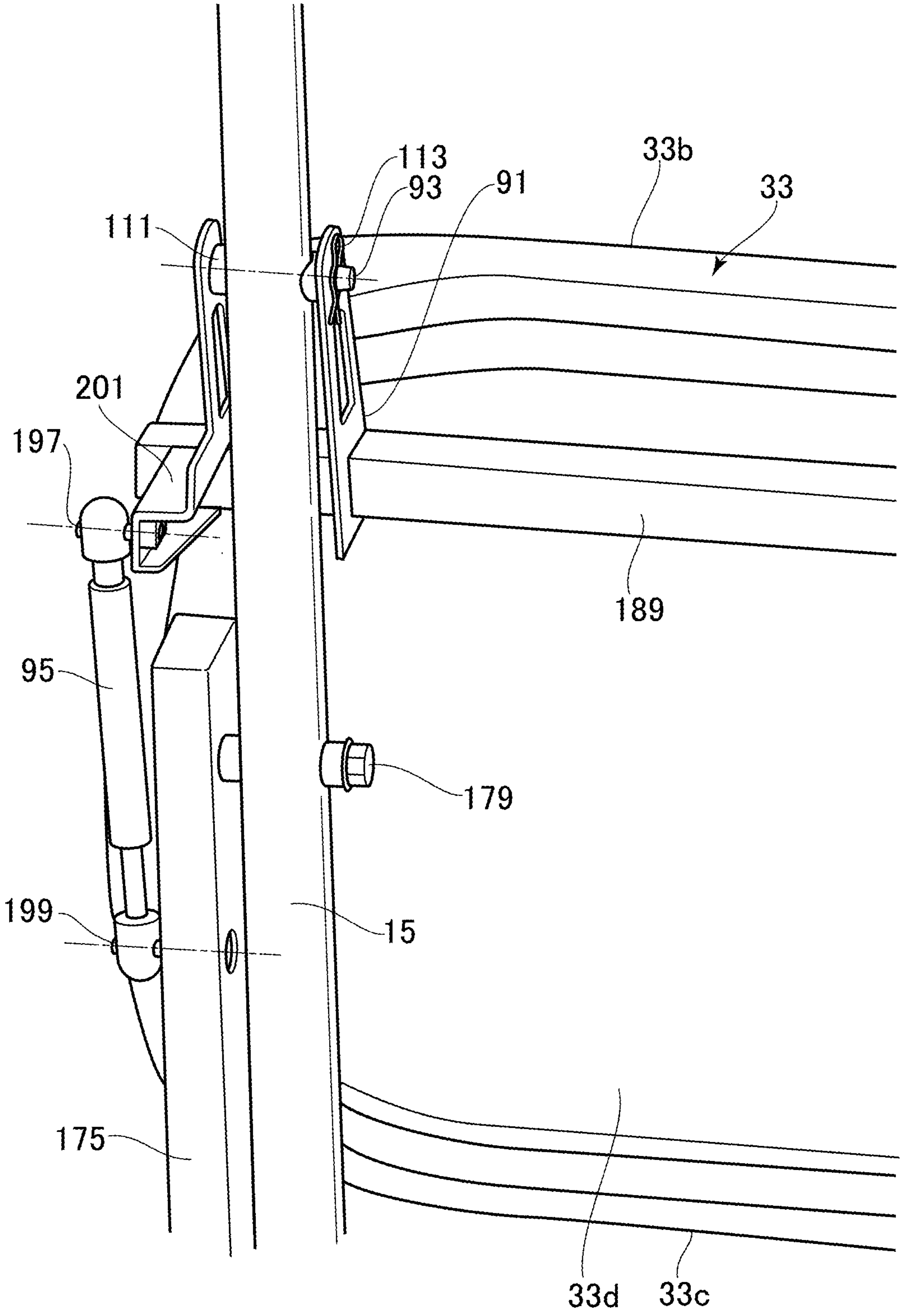
FIG. 42 is a schematic perspective view of a support structure for supporting a rear seat back according to a sixth embodiment.
Figure 43:
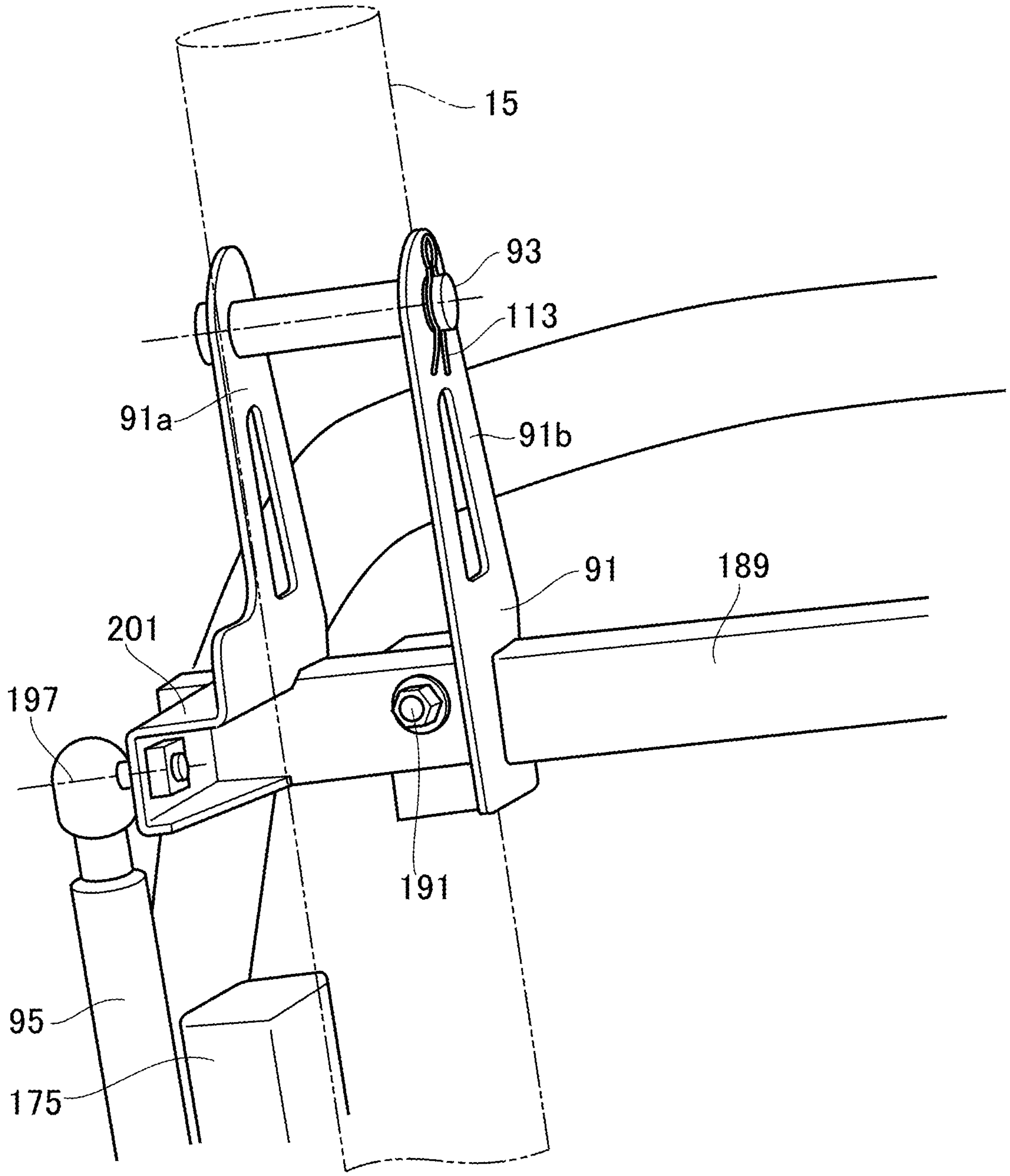
FIG. 43 is a schematic perspective view of the support structure for the rear seat back, with the rear pillar is illustrated by a phantom line.
Figure 44:
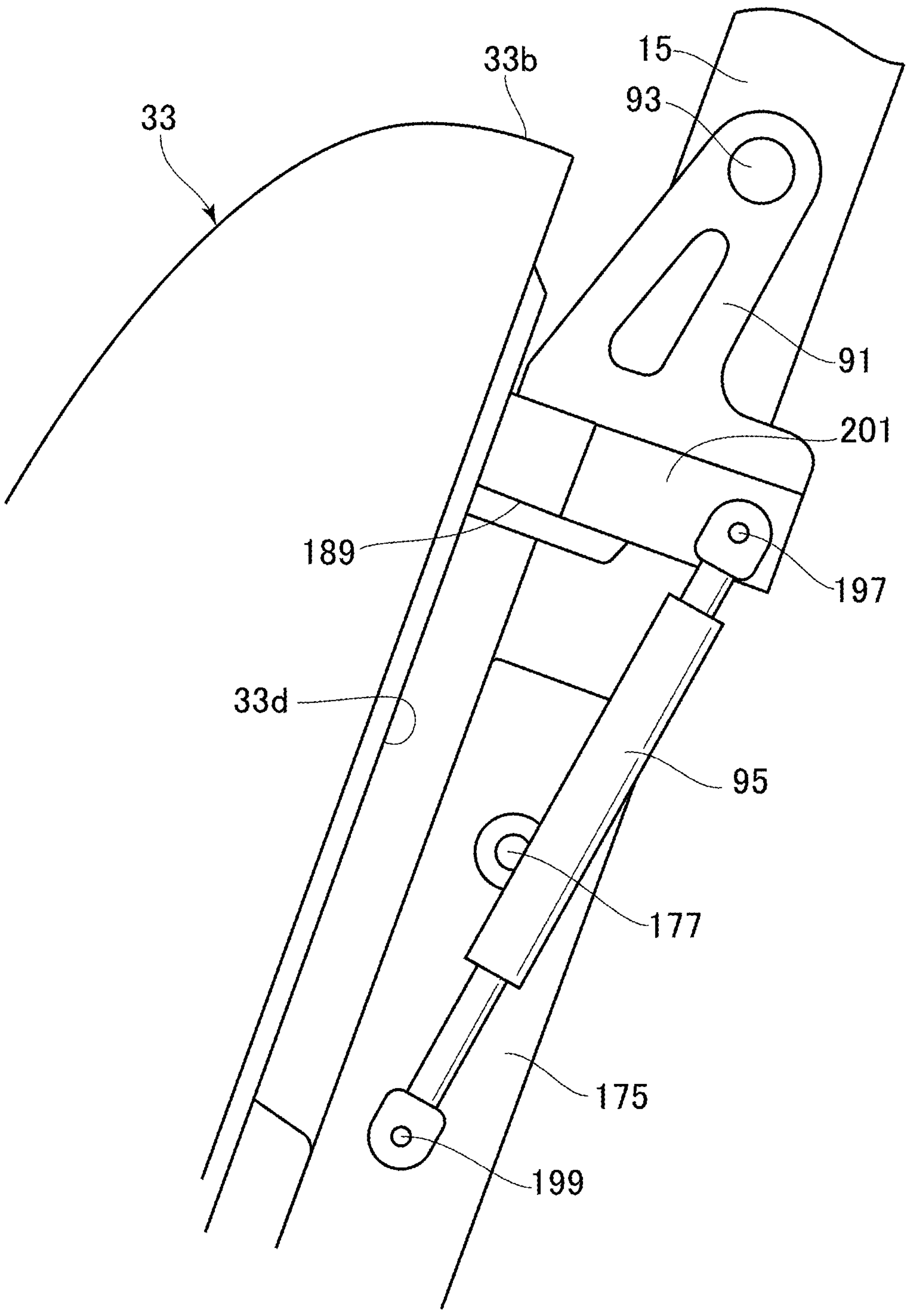
FIG. 44 is a schematic side view of the support structure for the rear seat back.
Figure 45:
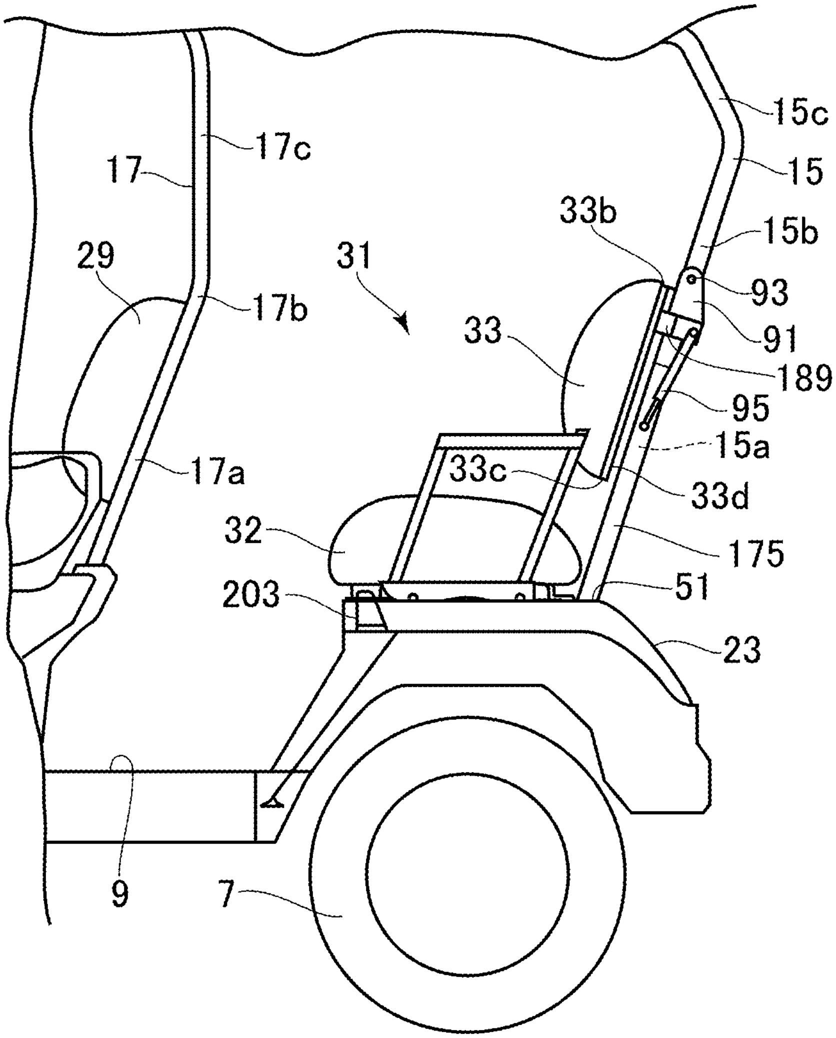
FIG. 45 is a schematic side view of the vicinity of the rear seat in a state in which the rear seat bottom and the rear seat back are in the normal use position.
Figure 46:
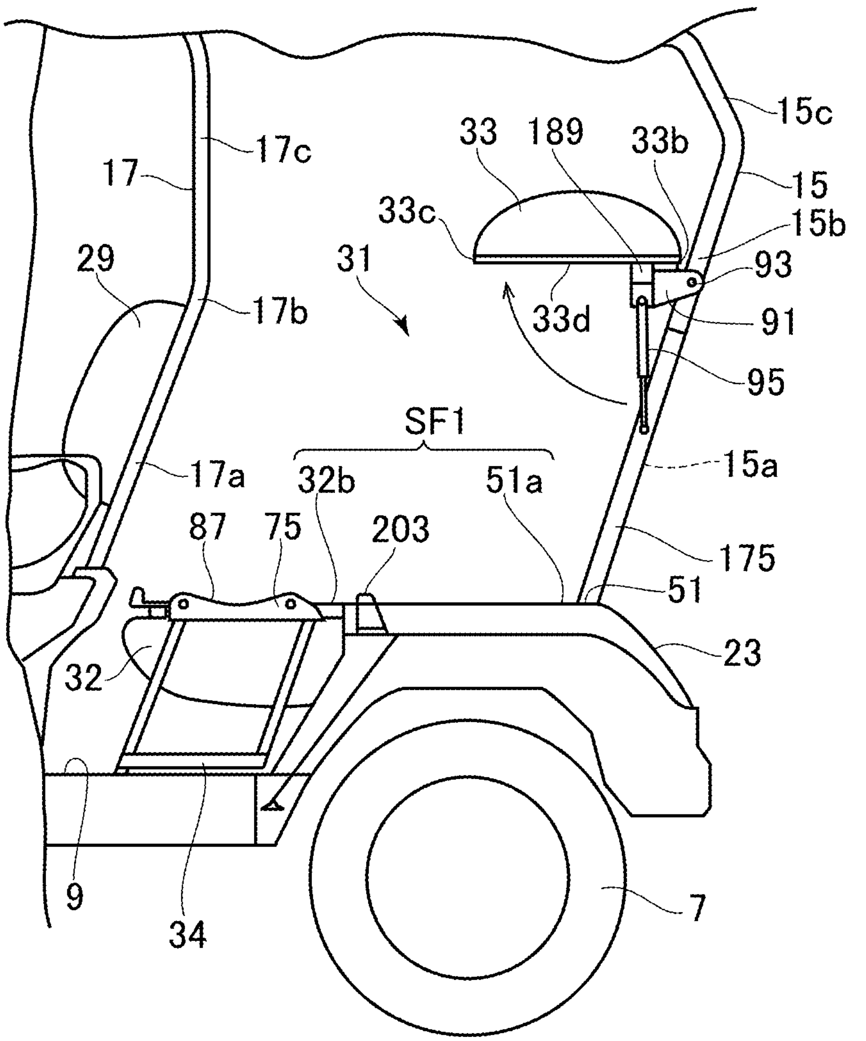
FIG. 46 is a schematic side view of the vicinity of the rear seat in a state in which the rear seat bottom is in the developed position so as to form the loading section and the rear seat back is in the retracted position.

Next, an electric cart 600 as a vehicle according to a sixth embodiment is described with reference to FIGS. 39 to 46. FIG. 39 is a schematic perspective view illustrating the electric cart 600 according to a sixth embodiment. FIG. 40 is a schematic rear view illustrating the electric cart 600. FIG. 41 is a schematic perspective view illustrating the vicinity of a rear seat 31 of the electric cart 600, with the panel members 59 and 60 such as being illustrated in FIG. 21 attached to the frame members 51*f* of the rear seat base 51 are removed. FIG. 42 is a schematic perspective view illustrating a support structure for supporting a rear seat back 33 of the rear seat 31, in a state where the rear seat back 33 is in a normal use position thereof. FIG. 43 is a schematic perspective view illustrating the support structure for supporting the rear seat back 33 with the rear pillar 15 being illustrated by a chain double-dashed line. FIG. 44 is a schematic side view illustrating the support structure for supporting the rear seat back 33. FIG. 45 is a schematic side view illustrating the vicinity of the rear seat 31 in a state in which the rear seat bottom 32 and the rear seat back 33 are in the normal use position. FIG. 46 is a schematic side view of the vicinity of the rear seat 31, in a state in which the rear seat bottom 32 is in the developed position so as to form the loading section SF1 and the rear seat back 33 is in the retracted position.

The electric cart 600 according to a sixth embodiment is similar to a second embodiment illustrated in FIGS. 12 and 13, and most of the configurations in the electric cart 600 according to a sixth embodiment is same as those in the electric cart according to a second embodiment illustrated in FIGS. 12 and 13.

In the electric cart 600 according to a sixth embodiment, as illustrated in FIGS. 45 and 46, the rear seat bottom 32 is supported directly or indirectly by the main frame 3 (e.g., supported by the rear seat base 51 via the hinge 69 (see FIG.

6)), to be transitionable from the normal use position (FIG. 45) of the rear seat bottom 32 to the developed position (FIG. 46) of the rear seat bottom 32 in which the bottom surface 32*b* of the rear seat bottom 32 is substantially flush with the upper surface 51*a* of the rear seat base 51 to form the loading surface SF1.

Further, in the electric cart 600 according to a sixth embodiment, as illustrated in FIGS. 45 and 46, the rear seat back 33 is supported directly or indirectly by the main frame 11 to be transitionable between (i) the normal use position (FIG. 45) in which the rear seat back 33 stands to function as the backrest of the rear seat 31 and blocks a part of a rear opening formed between the left and right rear pillars 15 and (ii) the retracted position (FIG. 46) in which the rear seat back 33 is moved forwardly-upward away from the normal use position and opens the part of the rear opening that was blocked by the rear seat back 33 in the normal use position.

As illustrated in FIGS. 39 and 40, the intermediate pillars 17 are provided, each of which is directly or indirectly fixed to the main frame 11 (see FIG. 2). Specifically, the intermediate pillar 17 is fixed to a pillar support member 175, such as a pipe member, which is fixed to the front seat base 41. The intermediate pillar 17 may be fixed to the pillar support member 175 by means of securing members such as bolts, screws, rivets, or the like. As illustrated in FIG. 40, the pillar support member 175 is provided on the inner side in the widthwise direction than a lower portion 17*a* of the intermediate pillar 17 and extends upwardly in parallel with the lower portion 17*a* of the intermediate pillar 17. The lower end (not illustrated in FIGS. 39 and 40) of the pillar support member 175 is fixed to one or more of frame members (the cross members and the bars) of the front seat base 41.

As illustrated in FIG. 40, the intermediate pillar 17 includes the lower portion 17*a*, a middle portion 17*b*, and an upper portion 17*c* in the height direction and also is bent at a first bent portion 17*d* provided between the lower portion 17*a* and the middle portion 17*b* and bent at a second bent portion 17*e* provided between the middle portion 17*b* and the upper portion 17*c*. In the rear view as illustrated in FIG. 40, the lower portion 17*a* and the upper portion 17*c* extends in parallel in the vertical direction, and the lower portion 17*a* is provided on the inner side in the widthwise direction than the upper portion 17*c* such that the middle portion 17*b* diagonally extends and is inclined with respect to the vertical direction. The middle portion 17*b* of the intermediate pillar 17 extends outwardly in the widthwise direction as the middle portion 17*b* extends upwardly.

Note that in the side view such as being illustrated in FIGS. 45 and 46, the lower portion 17*a*, the middle portion 17*b*, and the upper portion 17*c* may be inclined with respect to the vertical direction. For example, in the side view as illustrated in FIGS. 45 and 46, the lower portion 17*a* and at least a part of the middle portion 17*b* of the intermediate pillar 17 are inclined with respect to the vertical direction and extends along the back surface of the front seat back 29 to support the back surface of the front seat back 29.

As illustrated in FIG. 40, the rear pillars 15 are provided, each of which is directly or indirectly fixed to the main frame 11 (see FIG. 2). Specifically, each of the rear pillars 15 is fixed to a pillar support member 175 fixed to the rear seat base 51. The rear pillar 15 may be fixed to the pillar support member 175 by means of securing members 177 and 179, such as bolts, screws, rivets, or the like. As illustrated in FIG. 40, the rear pillar 15 includes a lower portion 15*a*, a middle portion 15*b*, an upper portion 15*c*, and a bent portion 15*d* provided in the vicinity of the boundary between the middle portion 15*b* and the upper portion 15*c* or in the upper portion 15*c*.

In the rear view as illustrated in FIG. 40, the lower portion 15*a* and the middle portion 15*b* of the rear pillar 15 continuously extend in the vertical direction and the upper portion 15*c* of the rear pillar 15 extends diagonally and is inclined with respect to the vertical direction. In the side view as illustrated in FIGS. 45 and 46, the lower portion 15*a* and the middle portion 15*b* of the rear pillar 15 are inclined with respect to the vertical direction and extends along the back surface 33*d* of the rear seat back 33 to support the back surface 33*d* of the rear seat back 33. Also, in the side view as illustrated in FIGS. 45 and 46, the upper portion 15*c* of the rear pillar 15 is inclined forwardly with respect to the vertical direction. In other words, as illustrated in FIGS. 39 and 40, the upper portion 15*c* of the rear pillar 15 extends forwardly and outwardly as the upper portion 15*c* extends upwardly. That is, even though the upper end of the rear pillar 15 is positioned on the front side and the widthwise outer side with respect to the middle portion 15*b*, the rear pillar 15 includes only one bent portion 15*d*, which is bent forwardly and outwardly.

As illustrated in FIG. 40, the rear pillar support member 175 is provided outer in the widthwise direction than the rear pillar 15 and extends upwardly in parallel with the lower portion 15*a* of the rear pillar 15. The lower portion 15*a* of the rear pillar 15 is in contact with and fixed to the rear pillar support member 175 by means of securing members 177 and 179, such as a bolt, screw, rivet, or the like, at the upper end portion and the lower end portion of the rear pillar support member 175.

Each of the pillar support members 175 is a pipe member, specifically, a rectangle pipe a cross section of which is rectangle, as illustrated in FIG. 41. Each of the rectangle pipes 175 includes a front surface, a rear surface, a widthwise inner side surface, and a widthwise outer side surface. On the widthwise outer side surface of the rectangle pipe 175, a reflector 181 (e.g., a reflector plate, a reflector sheet, or the like) is attached which faces the widthwise outside direction, for increase the lateral safety for the vehicle, as illustrated in FIG. 41.

Upon moving the rear seat back 33 from one of the normal use position and the retracted position to the other, the force applied to the rear seat back 33 or the stress caused by the force may be applied to the rectangle pipes 175 via the rear pillars 15. Accordingly, as illustrated in FIG. 41, each of the rectangle pipes 175 is reinforced at the lower end portion of the rectangle pipe 175 from the front side and the rear side thereof by gusset members 183 and 185.

As illustrated in FIGS. 39 to 41, in the electric cart 600 according to a sixth embodiment, a cross member 189 is provided that extends in the widthwise direction from one of the widthwise end portions of the rear seat back 33 to the other, and is fixed to and supports the back surface 33*d* of the rear seat back 33 so as to reinforce the rear seat back 33.

The cross member 189 is connected directly or indirectly to the left and right rear pillars 15. Specifically, as illustrated in FIGS. 39 to 41, the cross member 189 is supported by the rear pillars 15 via the brackets 91 that is rotatably supported about the rotation axis 93 by the rear pillars 15. That is, the cross member 189 is connected, at the widthwise end portion thereof, to the rotatable brackets 91. Accordingly, the rear seat back 33 is supported by the rear pillars 15 via the rotatable brackets 91 so that the rear seat back 33 is rotatable about the rotation axis 93 of the brackets 91. The rotation axis 93 of the brackets 91 function as the pivot axis 93 of the rear seat back 33. As illustrated in FIGS. 40 and 41, the pivot axis 93 of the rear seat back 33 is located overlapping with the upper end portion of the rear seat back 33 or higher than the rear seat back 33 in the normal use position in the height direction.

As illustrated in FIGS. 39 to 41, the cross member 189 is overlapped with an upper portion or an upper end portion of the rear seat back 33. The cross member 189 is fixed to the rear seat back 33 by means of a securing member 191 at each of the widthwise end portions of the seat back 33, as illustrated in FIG. 43. The securing member 191, such as a bolt, screw, rivet, or the like, is provided between a pair of plate portions 91*a* and 91*b* of each bracket 91 at the widthwise end portion of the rear seat back 33 and connects the seat back 33 and the cross member 189 with each other, as illustrated in FIG. 43. The securing member 191 is located in front of and opposed to the corresponding rear pillar 15, so that the securing member 191 cannot been seen behind the rear pillar 15 in the rear view, so as to improve the appearance of the electric cart 600.

As described above, the rotatable brackets 91, which are fixed to or integrally formed with the cross member 189 at the widthwise end portions of the cross member 189, are respectively supported by the rear pillars 15 via the pins 93 serving as the pivot axis of the rear seat back 33. As illustrated in FIGS. 39 to 41, one of the rotatable brackets 91 (e.g., the left rotatable bracket 91) is connected to the rear pillar support member 175 for the corresponding rear pillar 15 (e.g., the left rear pillar 15) by means of the biasing device 95. That is, the biasing device 95 is provided between the one of the rear pillars 15 (e.g., the left rear pillar 15) and the rear seat back 33, so as to bias the rear seat back 33 toward at least one of the normal use position (see FIG. 45) and the retracted position (see FIG. 46).

Like a second embodiment illustrated in FIGS. 12 and 13, the biasing device 95 is configured to bias the rear seat back 33 toward the normal use position (see FIG. 45) when the rear seat back 33 is closer to the normal use position than the change point and to bias the rear seat back 33 toward the retracted position (see FIG. 46) when the back 33 is closer to the retracted position than the change point. Accordingly, the rear seat back 33 can be stabilized at the normal use position (see FIG. 45) or the retracted position (see FIG. 46) with such a relatively simple structure.

As illustrated in FIGS. 40 to 42, the side on which the biasing device 95 is provided in the widthwise direction in the cart 600 (e.g., the left side in a sixth embodiment) is same as the side on which the driver's seat or the steering handle 35 is provided in the widthwise direction in the cart 600 (e.g., the left side in a sixth embodiment).

As illustrated in FIGS. 40 to 42, the biasing device 95 is provided on the outer side than the rear pillar 15 in the widthwise direction. Further, the biasing device 95 is provided at a position different from the reflector 181 attached to the rectangle pipe 175 in the height direction, as illustrated in FIG. 41. Therefore, the biasing device 95 is not overlapped with and does not hide the reflector 181 attached on the rectangle pipe 175.

The biasing device 95 is rotatably connected to the left bracket 91 with a first pivot pin 197 at an upper end portion of the biasing device 95 and is rotatably connected to the left rear pillar support member 175 with a second pivot pin 199 at a lower end portion of the biasing device 95, as illustrated in FIGS. 40 and 41. Note that the left bracket 91 is formed with a mounting portion 201 to which the biasing device is rotatably attached with the first pivot pin 197, as illustrated in FIGS. 41 and 42. The mounting portion 201 is also connected to the cross member 189 and has a U-shape in the cross section thereof.

Next, a positional relationship between the rear pillars 15 and other components is described below. As illustrated in FIG. 40, the rear pillars 15 are provided at positions overlapping widthwise end portions of the rear seat back 33 in the rear view (in view of the front-rear direction of the cart 600). With this structure, the rear opening between the left and right rear pillars 15 is wider than a comparative structure in which the rear pillars 15 are provided at positions overlapping the widthwise center area of the rear seat back 33 to support the widthwise center area of the rear seat back 33. Therefore, when the rear seat back 33 is in the retracted position as illustrated in FIG. 46, the user can easily load a luggage through such a wider rear opening onto a space above the rear seat base 51 (the space above the rear seat bottom 32 in the normal position or the space SP1 above the loading surface SF1 formed by the upper surface 51*a* of the rear seat base 51 and the bottom surface 32*b* of the rear seat bottom 32 in the developed position).

More specifically, as illustrated in FIG. 40, in the widthwise direction, a position (P1) of the widthwise outer end of the lower end portion 15*a* of each rear pillar 15 is located on the outer side than a widthwise inner end (P3) of the corresponding one of the left and right rear wheels 7. Further, in the widthwise direction, a position (P2) of a widthwise inner end of the lower end portion 15*a* of each rear pillar 15 is located on the outer side than the lower end portion 17*a* (P4) of the corresponding one of the left and right intermediate pillars 17. Further, in the widthwise direction, the position (P2) of the widthwise inner end of the lower end portion 15*a* of each rear pillar 15 is located on the outer side than the widthwise outer end (P5) of the rear storage 25. Further, in the widthwise direction, each rear pillar 15 (the entirety of each rear pillar 15) is located on the outer side than the widthwise outer end (P5) of the rear storage 25. Further, in the widthwise direction, the position (P2) of the widthwise inner end of the lower end portion 15*a* of the rear pillar 15 is located on the outer side than the first bent portion 17*d* of the corresponding one of the left and right intermediate pillars 17. Further, the widthwise position (P2) of the widthwise inner end of the lower end portion 15*a* of each rear pillar 15 is located in the outermost one of three sections into which the rear seat back 33 is equally divided in the widthwise direction. Further, the widthwise position (P2) of the widthwise inner end of the lower end portion 15*a* of each rear pillar 15 is located in the outermost one of four sections into which the rear seat back 33 is equally divided in the widthwise direction. Further, the widthwise position (P2) of the widthwise inner end of the lower end portion of each rear pillar 15 is located in the outermost one of five sections into which the rear seat back 33 is equally divided in the widthwise direction. Note that the rear seat bottom 32 includes: left and right seating surfaces 32SL and 32SR; a widthwise center portion 32C provided between the left and right seating surfaces 32SL and 32SR and projected upwardly than the seating surfaces 32SL and 32SR; and widthwise end portions 32E located outer in the widthwise direction than the seating surfaces 32SL and 32SR and projected upwardly than the seating surfaces 32SL and 32SR. Further, in the widthwise direction, the position (P2) of the widthwise inner end of the lower end portion 15*a* of each rear pillar 15 is located on the outer side than the widthwise center of the corresponding one of the left and right seating surfaces 32SL and 32SR. Further, in the widthwise direction, the position (P2) of the widthwise inner end of the lower end portion 15*a* of each rear pillar 15 is located on the outer side than the lowermost portion (not illustrated) of the corresponding one of the left and right seating surfaces 32SL and 32SR.

Further, as illustrated in FIG. 40, the widthwise positions of the lower ends of the left and right rear pillars 15 are at least partially overlapped with the widthwise positions of the left and right tail lamps 193 that are provided at the left and right end portions of the back of the electric cart 600. In a sixth embodiment, in the rear view as illustrated in FIG. 40, each of the lower ends of the left and right rear pillars 15 is provided within an area A1 in the widthwise direction in which the corresponding one of the left and right tail lamps 193 is provided. Further, as illustrated in FIG. 40, the widthwise positions of the lower ends of the left and right rear pillars 15 are at least partially overlapped with the widthwise positions of the left and right reflectors 195 that are provided at the left and right end portions of the back of the electric cart 600. In a sixth embodiment, in the rear view as illustrated in FIG. 40, each of the lower ends of the left and right rear pillars 15 is provided within an area A2 in the widthwise direction in which the corresponding one of the left and right reflectors 195 is provided.

Next, a positional relationship between the rear seat back 33 in the normal use position or the retracted position and other components according to a sixth embodiment is described below with reference to FIGS. 45 and 46. When the rear seat back 33 is in the retracted position as illustrated in FIG. 46, the lower end 33*c* of the rear seat back 33 in the normal use position is located upper than the pivot axis 93 of the rear seat back 33. Further, when the rear seat back 33 is in the retracted position as illustrated in FIG. 46, the lower end 33*c* of the rear seat back 33 in the normal use position is located upper than the upper end 33*b* of the rear seat back 33 in the normal use position. Further, when the rear seat back 33 is in the retracted position as illustrated in FIG. 46, the back surface 33*d* of the rear seat back 33 is located upper than the pivot axis 93 of the rear seat back 33. Furthermore, the rear seat back 33 is in the retracted position as illustrated in FIG. 46, the cross member 189 fixed to the back surface 33*d* of the rear seat back 33 is located upper than the pivot axis 93 of the rear seat back 33.

Next, a structure for hooking a string or the like for tying the luggage on the rear seat bottom 32 or on the loading surface SF1 formed by the bottom surface 32*b* of the rear seat bottom 32 in the development position (see FIG. 46) and the upper surface 51*a* of the rear seat base 51 is described below. In a sixth embodiment, as illustrated in FIGS. 45 and 46, each of both widthwise end portions of the rear seat base 51 is formed with a hook member 203. The hook member 203 is formed of a rigid material such as a steel or the like and may be formed in a U-shape or the like. When the rear seat bottom 32 is in the normal use position as illustrated in FIG. 45, the U-shaped hook member 203 may be provided under the rear seat bottom 32 or the armrest 34. When the rear seat bottom 32 is in the development position as illustrated in FIG. 46, the U-shaped hook member 203 is exposed from the loading surface SF1. With this configuration, when the luggage is placed on the loading surface SF1 (see FIG. 46), the hook member 203 can be used to hook a string for tying the luggage.

Effects of Sixth Embodiment

Next, effects of a sixth embodiment mat be described below. Note that descriptions of the same or similar effects based on the same or similar configurations as in first to fifth embodiments and modifications thereof may be omitted in order to avoid redundancy.

In a sixth embodiment, the left and right rear pillars 15 are directly or indirectly fixed to the main frame 11 and extends upwardly, and the rear pillars 15 are provided at positions overlapping widthwise end portions of the rear seat back 33 in view of the front-rear direction of the electric cart 600. With this configuration, the rear opening between the left and right rear pillars 15 become wide. Accordingly, the user can easily load a luggage through such a wider rear opening to the space above the rear seat base 51 (the space above the rear seat bottom 32 or the space above the loading surface SF1).

In a sixth embodiment, the rear seat back 33 is configured to be movable between: (i) the normal use position (see FIG. 45) in which the rear seat back 33 stands to function as the backrest of the rear seat 31 and blocks a part of the rear opening formed between the left and right rear pillars 15 and (ii) the retracted position (see FIG. 46) in which the rear seat back 33 is moved away from the normal use position and opens the part of the rear opening in which the rear seat back 33 was placed in the normal use position. With this configuration, by moving the rear seat back 33 to the retracted position in which the rear seat back 33 opens the part of the rear opening, a luggage can be put through the opened part of the rear opening from the rear side of the electric cart 1 to the space above the rear seat base 51 (the space above the rear seat bottom 32 or the space above the loading surface SF1).

In a sixth embodiment, the rear seat back 33 is moved away upwardly from the normal position to the retracted position thereof such that, when the rear seat back 33 is in the retracted position, the lower end 33*c* of the rear seat back 33 in the normal position is located higher than the pivot axis 93 of the rear seat back 33 or the upper end 33*b* of the rear seat back 33 in the normal position, as illustrated in FIG. 46. With this configuration, an area that is opened by the rear seat back 33 in the retracted position becomes large so that it is easier for the user to put the language from the rear side of the electric cart 1 into the space above the rear seat base 51 (the space above the rear seat bottom 32 or the space above the loading surface SF1).

In a sixth embodiment, the pivot axis 93 of the rear seat back 33 is located overlapping in height or located higher than the upper end portion of the rear seat back 33 in the normal use position. With this configuration, the part of the rear opening that is opened by the rear seat back 33 in the retracted position becomes larger.

In a sixth embodiment, the rear pillars 15 are provided with the rotatable brackets 91, respectively, such that the rotatable brackets 91 support directly or indirectly the rear seat back 33. With this configuration, the rear seat back 33 can be rotatably supported by the rear pillars 15 to be movable between the normal use position and the retracted position with such a simple structure.

In a sixth embodiment, the electric cart 600 includes the cross member 189 that extends in the widthwise direction and is fixed to and supports the back surface 33*d* of the rear seat back 33. With this configuration, even though the rear pillars 15 are overlapped with and supports the rear seat back 33 only at the widthwise end portions of the rear seat back 33, the rear seat back 33 can be reinforced by the cross member 189.

In a sixth embodiment, the cross member 189 extends from one of the widthwise end portions of the rear seat back 33 to the other. With this configuration, the cross member 189 can reinforce substantially the entire width of the rear seat back 33.

In a sixth embodiment, the cross member 189 is connected to the rotatable brackets 91 that are rotatably supported by the left and right rear pillars 15, and is fixed to and supports the back surface 33*d* of the rear seat back 33. That is, the rear seat back 33 is rotatably supported by the rear pillars 15 via the rotatable brackets 91 and the cross member 189. With this configuration, the rear seat back 32 can be movable (rotatable) between (i) the normal use position thereof and (ii) the retracted position thereof with such a simple structure.

In a sixth embodiment, the cross member 189 is overlapped with and supports the upper end portion of the rear seat back 33 (see FIG. 40). With this configuration, it is possible to shorten a distance from the pivot axis 93 to the cross member 189 so as to downsize the rotatable brackets 91.

In a sixth embodiment, the cross member 189 is fixed to the back surface 33*d* of the rear seat back 33 with the securing members 191 that are positioned in front of and opposed to the rear pillars 15 (see FIG. 43). With this configuration, the securing member 191 behind the rear pillar 15 cannot been seen in the rear view and this improves the appearance of the electric cart 600.

In a sixth embodiment, the electric cart 600 includes the rear pillar support members 175, which are directly or indirectly fixed to the main frame 11, provided on the outer side than the rear pillars in the widthwise direction, and extend upward along the lower end portions of the rear pillars 15 such that the lower end portions of the rear pillars 15 are fixed to the rear pillar support members 175. With this configuration, the rear pillars 15, which support the weight of the rear seat back 33, are securely reinforced.

In a sixth embodiment, each of the rear pillars 15 is fixed to the respective rear pillar support member 175 at a first portion (177) and a second portion (179) that are spaced apart from each other. With this configuration, the rear pillars 15 can be securely fixed to the rear pillar support member members 175.

In a sixth embodiment, each of the rear pillars 15 is fixed to the respective rear pillar support member 175 at the upper end portion (177) and the lower end portion (179) of the respective rear pillar support member 175 that are spaced apart from each other. With this configuration, the rear pillars 15 can be securely fixed to the rear pillar support members 175.

In a sixth embodiment, each of the rear pillar support member 175 is the rectangle pipe including the front surface, the rear surface, the widthwise inner side surface, and the widthwise outer side surface. With this configuration, the rear pillar 15 can be easily and securely fixed to the pillar support member 175 along any one of the flat surfaces thereof compared to a comparative structure in which the rear pillar support member 175 is a round pipe or the like.

In a sixth embodiment, the reflector 181 is provided on the widthwise outer side surface of each rectangle pipe 175. With this configuration, the lateral safety of the electric cart 600 can be increased by means of the reflectors 181 attached on the widthwise outer side surfaces of the rectangle pipes 175.

In a sixth embodiment, the electric cart 600 includes the biasing device 95 that is configured, when the rear seat back 33 is positioned on a side closer to the normal use position (see FIG. 45) than the change point located between the normal use position and the retracted position (FIG. 46), to bias the rear seat back 33 toward the normal use position, and configured, when the rear seat back 33 is positioned on a side closer to the retracted position than the change point, to bias the rear seat back toward the retracted position. With this configuration, the rear seat back 33 is biased to the normal use position or the retracted position and thus the rear seat back 33 become stable at either the normal use position or the retracted position.

In a sixth embodiment, the biasing device 95 is provided on the outer side than the rear pillar 15 in the widthwise direction. With this configuration, it is possible to prevent the biasing device 95 from decreasing the area that is opened by the rear seat back 33 when the rear seat back 33 is in the retracted position.

In a sixth embodiment, the biasing device 95 is provided to only one of the rear pillars 15 (e.g., only the left rear pillar 15 in an embodiment). With this configuration, the number of parts of the electric cart 600 can be reduced.

Note that when the user (e.g., the driver) moves the rear seat back 33 from the normal use position (FIG. 45) to the retracted position (FIG. 46) or visa verse, it may be better to move the rear seat back 33 by grabbing one of the widthwise end portions of the rear seat back 33 on which the biasing device 95 is provided, for avoiding a large stress from being applied to the biasing device 95, the rotatable brackets 91, the rear seat back 33, or the like. In a sixth embodiment, the side on which the biasing device 95 is provided (e.g., the left side) in the electric cart 600 is the same as the side on which the steering handle 35 is provided in the electric cart 600 is provided (e.g., the left side). With this configuration, it is possible to prevent the driver from operating one of the widthwise end portions of the rear seat back 33 on which the biasing device 95 is not provided. Thus, it is possible to avoid a large stress from being applied to the biasing device 95, the rotatable brackets 91, the rear seat back 33, or the like.

In a sixth embodiment, the rear pillars 15 extend upwardly from the lower ends thereof, and each rear pillar 15 includes the bent portion 15*d* at the middle portion or the upper portion of the rear pillar 15 such that the upper end portion of the rear pillar 15 is provided outer in the widthwise direction than the lower end portion of the rear pillar 15. With this configuration, a distance between the upper end portions of the rear pillars become large so that the roof of the electric cart 600 can be stably supported by the rear pillars 15.

In a sixth embodiment, the rear pillars 15 extend upwardly from the lower ends thereof, and each rear pillar 15 includes the bent portion 15*d* at the middle portion or the upper portion of the rear pillar 15 such that the upper end portion of the rear pillar 15 is provided on the outer side in the widthwise direction than the lower end portion of the rear pillar 15 and provided on the front side than the lower end portion of the rear pillar 15. With this configuration, the rear pillar 15 can be bent outwardly and forwardly at the one bent portion 15*d*, which may reduce the number of bents in the rear pillar 15 and thus reduce the manufacturing cost of the electric cart 600.

Modifications of Sixth Embodiment

Next, modifications of a sixth embodiment are described below.

In a sixth embodiment described above, the biasing device 95 is provided on only one side in the widthwise direction of the rear seat back 33 (e.g., the left side of the rear seat back 33). However, the disclosure is not limited thereto.

For example, in a modification of a sixth embodiment, the biasing device 95 may be provided on each of both sides in the widthwise direction of the rear seat back 33.

In a sixth embodiment described above, the biasing device 95 is provided between and connects the pillar support member 175 and the bracket 91. However, the disclosure is not limited thereto. For example, the biasing device 95 may be provided between and connects parts other than the pillar support member 175 and the bracket 91. That is, in a modification of a sixth embodiment, the biasing device 95 may be provided between and connects (i) the rear pillar 15, the pillar support member 175, the rear seat base 51, or a portion of the vehicle body and (ii) the bracket 91, the cross member 189, or the rear seat back 33.

In a sixth embodiment described above, the biasing device 95 is provided to bias the rear seat back 33. However, the disclosure is not limited thereto. For example, in a modification of a sixth embodiment, the biasing device 95 may not be provided.

In a sixth embodiment described above, the biasing device 95 is provided on the outer side than the rear pillar 15 in the widthwise direction. However, the disclosure is not limited thereto. For example, in a modification of a sixth embodiment, the biasing device 95 may be provided on the inner side than the rear pillar 15 in the widthwise direction.

In a sixth embodiment described above, the side on which the biasing device 95 is provided in the widthwise direction in the cart 600 (e.g., the right side) is same as the side on which the driver's seat or the steering handle 35 is provided in the widthwise direction in the cart 600 (e.g., the right side). However, the disclosure is not limited thereto. For example, in a modification of a sixth embodiment, the side (left or right) on which the biasing device 95 is provided in the widthwise direction in the cart 600 may be opposite to the side (right or left) on which the driver's seat or the steering handle 35 is provided in the widthwise direction in the cart 600.

In a sixth embodiment described above, the securing members 191 are positioned in front of and opposed to the rear pillars 15. However, the disclosure is not limited thereto.

In a sixth embodiment described above, the pivot axis 93 of the rear seat back 33 is located overlapping the upper end portion of the rear seat back 33 in height or located higher than the upper end of the rear seat back 33. However, in the disclosure, the pivot axis 93 of the rear seat back 33 may be located at a position different from a sixth embodiment described above. For example, in modifications of a sixth embodiment, the pivot axis 93 of the rear seat back 33 may be located lower than the upper end portion of the rear seat back 33. More specifically, the pivot axis 93 of the rear seat back 33 may be located overlapping the lower end portion of the rear seat back 33 in height or located lower than the lower end of the rear seat back 33 such the rear seat back 33 is moveable (rotatable) forwardly-downward from the normal use position to a retracted position. Further, in modifications of a sixth embodiment, the pivot axis 93 of the rear seat back 33 may be provided at only one of the widthwise end portions of the seat back 33 and extends vertically such that the rear seat back 33 may be rotatable about the vertical pivot axis 93 in the horizontal direction.

Further, in a modification of a sixth embodiment describe above, the rear seat back 33 may be configured to be removable from the vehicle body 3 (for example, from the rear pillars 15). Further, in a modification of a sixth embodiment describe above, the rear seat back 33 may be configured to move along with the rear seat bottom 32.

In a sixth embodiment described above, the cross member 189 is overlapped with and fixed to the upper portion of the back surface of the rear seat back 33. However, the cross member 189 may be overlapped with and fixed to a portion of the rear seat back 33 other than the upper portion of the rear seat back 33. For example, in a modification of a sixth embodiment, the cross member 189 may be overlapped with and fixed to the lower end portion or the middle portion in height of the back surface of the rear seat back 33. Further, in a sixth embodiment described above, the cross member 189 is provided to reinforce the rear seat back 33. However, the disclosure is not limited thereto. For example, in a modification of a sixth embodiment, the cross member 189 may not be provided.

In a sixth embodiment described above, the front pillars 14, the intermediate pillars 17, and the rear pillars 15 are provided. However, the disclosure is not limited thereto. For example, in a modification of a sixth embodiment, the front pillars 14 or the intermediate pillars 17 may not be provided.

Other Modifications of First to Sixth Embodiments

In one or more embodiments described above, a case has been described in which the vehicle body includes the floor panel, the main frame under the floor panel, the cross members, the cross beams, the pillars, and etc. However, the disclosure is not limited thereto and a vehicle body may have a structure other than that.

Further, in one or more embodiments described above, a case has been described in which the vehicle including two rows of the seats. However, the disclosure is not limited thereto. That is, a vehicle according to the disclosure may include three or more rows of seats.

Further, in one or more embodiments described above, a case has been described in which the front seat 27 is the first seat and the rear seat 31 is the second seat. However, the disclosure is not limited thereto. For example, in the disclosure, second and third row seats may correspond to first and second seats in the claims, respectively, and third and fourth row seats may correspond to first and second seats in the claims, respectively. Also, other interpretations may be also possible.

Further, in one or more embodiments described above, the vehicle is the electric cart driven by the electric motor. However, the disclosure is not limited thereto. For example, the vehicle may be driven by a driving source other than the electric motor in the disclosure. Examples of the driving source other than the electric motor may include an internal combustion engine, a hybrid (a combination) of an internal combustion engine and an electric motor, and the like. The fuel for the internal combustion engine may be gasoline, diesel, methanol, hydrocarbon, hydrogen, etc.

Further, in one or more embodiments described above, a case has been described in which the vehicle is a passenger transport vehicle ("PTV"). However, the disclosure is not limited thereto. For example, the vehicle may be a vehicle other than the passenger transport vehicle, such as an LSV, a golf cart, a utility vehicle, or the like.

Figure 47:
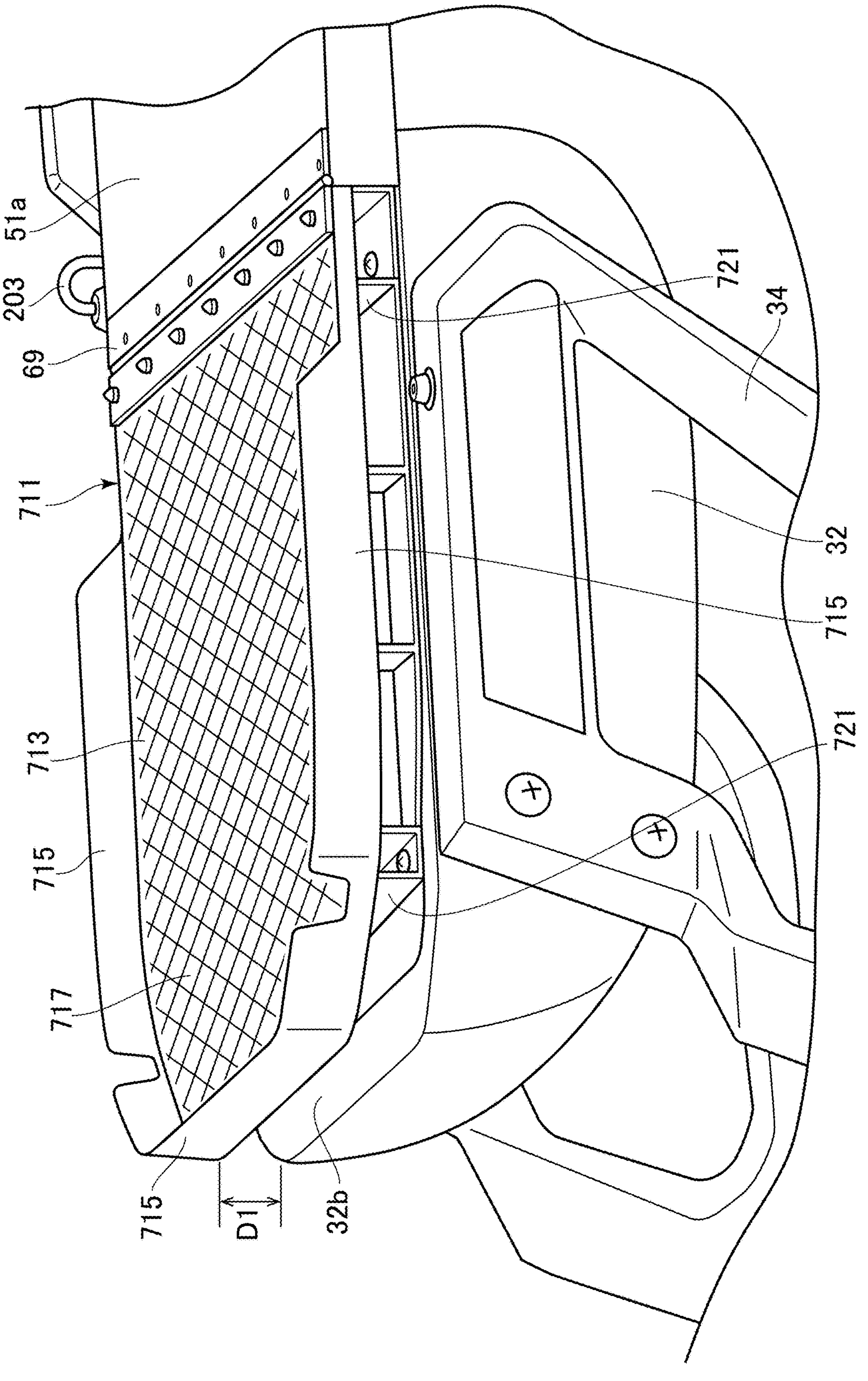
FIG. 47 is a schematic side view of a rear seat in a state in which a rear seat bottom is in a developed position so as to form a loading section according to a modification.

Further, in one or more embodiments described above, a case has been described in which in the state where the rear seat bottom 32 is in the development position thereof such as being illustrated in FIG. 3, the bottom surface **32*b* of the rear seat bottom 32 functions as the loading surface. However, the disclosure is not limited thereto. For example, a panel member or the like may be attached to the bottom surface 32*b* of the rear seat bottom 32 such that the panel member or the like functions as a loading surface in the state where the rear seat bottom 32 is in the development position thereof. In a modification illustrated in FIG. 47, a panel member 711 is attached to the bottom surface 32***b* of the rear seat bottom 32 via reinforcement members 721 such as brackets, pipes, or the like with fastening members such as screws, bolts, rivets, welding, or the like, with a gap D1 between the panel member 711 and the bottom surface 32*b* of the rear seat bottom 32 in the vertical direction or a thickness direction of the rear seat bottom 32. In the modification illustrated in FIG. 47, the panel member 711 includes: a flat plate portion 713 functioning as a loading surface in the state where the rear seat bottom 32 is in the development position; an anti-slip structure 717 such as unevenness or the like on the flat plate portion 713; and a flange portion (rim portion) 715 protruding from the periphery of the plate portion 713 away from the bottom surface 32*b* in the thickness direction of the plate portion 713 or in the direction substantially orthogonal to the plate portion 713, wherein the flange portion 715 can prevent the luggage placed on the panel member 711 (the loading surface) from falling off the panel member 711.

Figure 48:
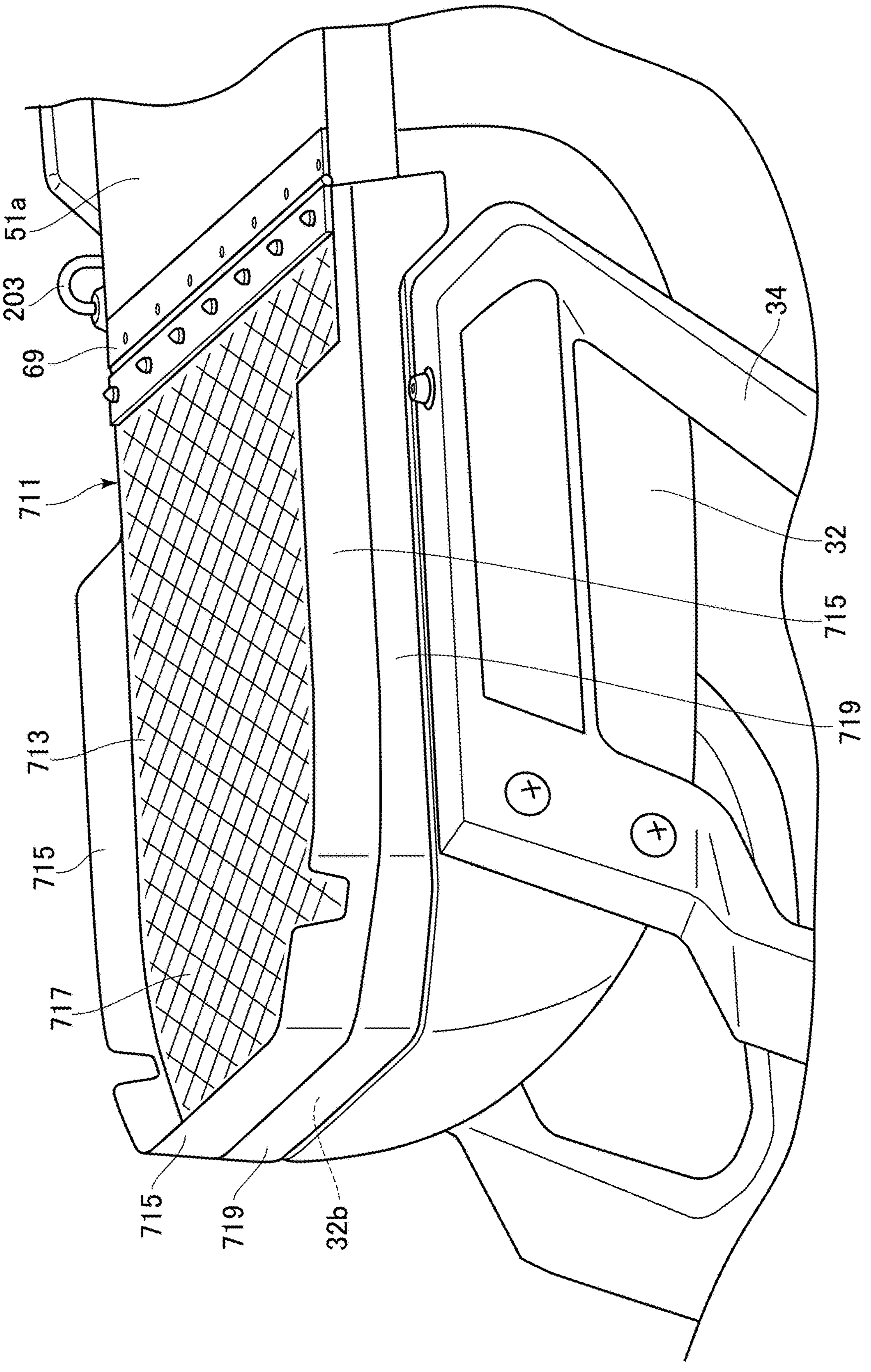
FIG. 48 is a schematic side view of a rear seat in a state in which a rear seat bottom is in a developed position so as to form a loading section according to another modification.

In the case where the panel member 711 is attached to the bottom surface 32*b* of the rear seat bottom 32 via the reinforcement members 721 or the like, with the gap D1 between the plate portion 713 of the panel member 711 and the bottom surface 32*b* of the rear seat bottom 32, the back structure of the rear seat bottom 32 including the reinforcement members 721 or the like and the fastening members or the like may be exposed so as to be seen by the user. In another modification illustrated in FIG. 48, the panel member 711 further includes a flange portion (rim portion) 719 protruding from the plate portion 713 or the flange portion 713 in the direction toward the bottom surface 32*b* of the rear seat bottom 32 (for example, the direction opposite to the protruding direction of the flange portion 713), so that the flange portion 719 minimizes or hides the gap D1 (see FIG. 47) between the panel member 711 and the bottom surface 32*b*, that is, functions as a cover portion to hide the back structure of the rear seat bottom 32 including the reinforcement member 721 or the like and the fastening members or the like, so as to improve the appearance of the rear seat. The flange portion 719 may extend toward and be in close proximity to or contact the bottom surface 32*b* of the rear seat bottom 32. The flange portion 719 may extend further than the position of the bottom surface 32*b* of the rear seat bottom 32 toward the seating surface (upper surface) of the rear seat bottom 32.

Further, in one or more embodiments described above, a case has been described in the rear seat bottom 32 may be supported to the rear seat base 51 by means of the hinge 69 only. However, the disclosure is not limited thereto. For example, the rear seat bottom 32 may be rotatably supported to the rear seat base 51 by means of a supporting device or part other than the hinge 9. Also the rear seat bottom 32 may be rotatably supported to the rear seat base 51 by means of a hinge as well as a supporting device or part other than the hinge.

Further, in one or more embodiments described above, a case has been described in which each of the front seat 27 and the rear seat 31 is the bench-type seat which continuously extends in the widthwise direction (the left-right direction) and on which two passengers can be ridden. However, the disclosure is not limited thereto. For example, each of the front seat 27 and the rear seat 31 may include two or more independent seat portions separated from each other in the widthwise direction (the left-right direction). In such a case, each of the seat portions of the seat back may be rotatably supported about a rotational axis of a hinge or the like. With this structure, one or more of the seating sections can be used for seating a passenger(s) and the other(s) can be used as a loading platform.

Further, in one or more embodiments described above, a case has been described in which the flanges (e.g., 63, 65, 67) are provided at the periphery of the loading surface 51*a*, 32*b* to prevent the luggage placed on the loading surface from falling off in the state where the loading surface is formed, such as being illustrated in FIG. 7. However, the disclosure is not limited thereto. For example, in the disclosure, such flanges may not be provided.

Further, in one or more embodiments described above, a case has been described in which in the developed position of the rear seat bottom 32 such as being illustrated in FIGS. 3 and 7, the bottom surface 32*b* of the rear seat bottom 32 and the upper surface 51*a* of the rear seat base 51 are substantially parallel to and flushed with each other in the horizontal direction without a step therebetween. However, the disclosure is not limited thereto. For example, the bottom surface 32*b* of the rear seat bottom 32 and the upper surface 51*a* of the rear seat base 51 may not be substantially flush with each other or may be provide with a step therebetween. Also, one of the bottom surface 32*b* and the upper surface 51*a* may be inclined with respect to the other.

Further, in one or more embodiments described above, a case has been described in which each of the bottom surface 32*b* of the rear seat bottom 32 and the upper surface 51*a* of the rear seat base 51 are formed as a smooth flat surface. However, the disclosure is not limited thereto. For example, one of or each of the bottom surface 32*b* of the rear seat bottom 32 and the upper surface 51*a* of the rear seat base 51 may not formed as a smooth flat surface, and may be provided with unevenness (or an anti-slip structure) that restricts movements of the language thereon.

Further, in one or more embodiments described above, a case has been described in which the vehicle is not provided with doors on side surfaces of the vehicle body 3. However, the disclosure is not limited thereto. For example, the vehicle may be provided with a door or doors.

Further, in one or more embodiments described above, a case has been described in which the vehicle 1 includes the cargo bed 3 in the back of the vehicle body. However, in the disclosure, a vehicle may not include a cargo bed in the back of the vehicle body or a vehicle may be configured such that a rear seat back or a rear seat bottom is configured to be flip down to the rear side to form a loading platform in the back of the vehicle body.

Furthermore, in the disclosure, a part or all of any one of embodiments or modifications described above and a part or all of another one of embodiments or modifications described above may be combined. Also in the disclosure, a part of any one of embodiments or modifications described above may be extracted. For example, the armrest supporting structure disclosed in a first embodiment and the rear seat back supporting structure described in a second embodiment may be combined.

The invention includes other embodiments or modifications in addition to one or more embodiments and modifications described above without departing from the spirit of the invention. The one or more embodiments and modifications described above are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A vehicle comprising:

a vehicle body including a main frame, a floor panel directly or indirectly fixed to the main frame and provided above the main frame, a front seat base and a rear seat base which are directly or indirectly fixed to the main frame and protruded above the floor panel;

a rear seat including a rear seat bottom attached to the rear seat base and a rear seat back; and left and right rear pillars directly or indirectly fixed to the main frame and extending upwardly, wherein the rear pillars are provided at positions overlapping widthwise end portions of the rear seat back in view of a front-rear direction of the vehicle, and the rear seat back is configured to be transitionable between a normal use position in which the rear seat back stands to function as a backrest of the rear seat and blocks at least a part of a rear opening formed between the left and right rear pillars and a retracted position in which the rear seat back opens the part of the rear opening.

2. The vehicle according to claim 1, further comprising a cross member that extends in the widthwise direction, is connected directly or indirectly to the left and right rear pillars, and supports a back surface of the rear seat back.

3. The vehicle according to claim 2, wherein the cross member is overlapped with and supports an upper end portion of the rear seat back.

4. The vehicle according to claim 1, further comprising pillar support members that are directly or indirectly fixed to the main frame, provided on the outer side than the rear pillars in the widthwise direction, and extend upwardly along lower portions of the rear pillars such that the lower portions of the rear pillars are fixed to the pillar support members, respectively.

5. The vehicle according to claim 4, wherein each of the rear pillars is fixed to the respective pillar support member at a first portion and a second portion of the respective pillar support member that are spaced apart from each other.

6. The vehicle according to claim 4, wherein each of the rear pillars is fixed to the respective pillar support member at an upper end portion and a lower end portion of the respective pillar support member.

7. The vehicle according to claim 4, wherein each of the pillar support members is a rectangle pipe a cross section of which is rectangle, wherein each of the rectangle pipes includes a front surface, a rear surface, a widthwise inner side surface, and a widthwise outer side surface, and a reflector is provided on the widthwise outer side surface of the rectangle pipe.

8. The vehicle according to claim 1, further comprising a biasing device configured to:

when the rear seat back is positioned on a side closer to the normal use position than a change point located between the normal use position and the retracted position, bias the rear seat back toward the normal use position, and when the rear seat back is positioned on a side closer to the retracted position than the change point, bias the rear seat back toward the retracted position.

9. The vehicle according to claim 8, wherein the biasing device is provided in the vicinity of one of the rear pillars and provided outer in the widthwise direction than the one of the rear pillars.

10. The vehicle according to claim 8, wherein a side on which the biasing device is provided in the widthwise direction in the vehicle is same as a side on which a steering handle or a driver's seat is provided in the widthwise direction in the vehicle.

11. The vehicle according to claim 2, wherein the cross member is fixed to the back surface of the rear seat back with securing members, wherein the securing members are positioned in front of and opposed to the rear pillars.

12. The vehicle according to claim 1, wherein the rear pillars extend upwardly from the lower ends thereof, wherein each of the rear pillars includes a bent portion at a middle portion or an upper portion in a height of the rear pillar, such that an upper end portion of the rear pillar is provided on the outer side than a lower end portion of the rear pillar in the widthwise direction.

13. The vehicle according to claim 1, wherein the rear pillars extend upwardly from the lower ends thereof, wherein each of the rear pillars includes a bent portion at a middle portion or an upper portion in a height of the rear pillar, such that an upper end portion of the rear pillar is provided on an outer side than a lower end portion of the rear pillar in the widthwise direction and provided on a front side than the lower end portion of the rear pillar.

14. The vehicle according to claim 1, further comprising:

left and right tail lamps provided at left and right end portions of a back of the vehicle, wherein widthwise positions of lower ends of the left and right rear pillars are at least partially overlapped with the left and right tail lamps.

15. The vehicle according to claim 1, further comprising:

left and right front pillars directly or indirectly fixed to the main frame and extending upwardly; and left and right intermediate pillars directly or indirectly fixed to the main frame and extending upwardly, the left and right intermediate pillars being provided between the front pillars and the rear pillars in the front-rear direction, wherein lower end portions of the rear pillars are provided outer in the widthwise direction than lower end portions of the intermediate pillars.

16. A vehicle comprising:

a vehicle body including a main frame, a floor panel directly or indirectly fixed to the main frame and provided above the main frame, a front seat base and a rear seat base which are directly or indirectly fixed to the main frame and protruded above the floor panel;

a rear seat including a rear seat bottom attached to the rear seat base and a rear seat back; and left and right rear pillars directly or indirectly fixed to the main frame and extending upwardly, wherein the rear pillars are provided at positions overlapping widthwise end portions of the rear seat back in view of a front-rear direction of the vehicle, and the rear pillars are provided with rotatable brackets, respectively, such that the rotatable brackets are rotatably supported by the rear pillars and support directly or indirectly the rear seat back.

17. The vehicle according to claim 16, further comprising a cross member that extends in the widthwise direction, connects the rotatable brackets with each other, and supports the rear seat back such that the rear seat back is rotatably supported by the rear pillars via the rotatable brackets.

18. The vehicle according to claim 16, wherein the rotatable brackets are rotatable integrally with the rear seat back between a normal use position in which the rear seat back stands to function as a backrest of the rear seat and blocks at least a part of a rear opening formed between the left and right rear pillars and a retracted position in which the rear seat back opens the part of the rear opening.

19. A vehicle comprising:

a vehicle body including a main frame, a floor panel directly or indirectly fixed to the main frame and provided above the main frame, a front seat base and a rear seat base which are directly or indirectly fixed to the main frame and protruded above the floor panel;

a front seat including a front seat bottom attached to the front seat base and a front seat back functioning as a backrest of the front seat;

a rear seat including a rear seat bottom attached to the rear seat base and a rear seat back functioning as a backrest of the rear seat; and left and right rear pillars directly or indirectly fixed to the main frame and extending upwardly, wherein the rear pillars are provided at positions overlapping widthwise end portions of the rear seat back in view of a front-rear direction of the vehicle, and the rear seat back is provided movable between a normal use position in which the rear seat back stands to function as the backrest of the rear seat and blocks at least a part of a rear opening formed between the left and right rear pillars and a retracted position in which the rear seat back opens the part of the rear opening.

* * * * *